United States Patent
Graefe et al.

(10) Patent No.: US 11,153,721 B2
(45) Date of Patent: Oct. 19, 2021

(54) SENSOR NETWORK ENHANCEMENT MECHANISMS

(71) Applicant: Intel Corporation, Santa Clara, CA (US)

(72) Inventors: Ralf Graefe, Haar (DE); Florian Geissler, Munich (DE); Rainer Makowitz, Munich (DE)

(73) Assignee: Intel Corporation, Santa Clara, CA (US)

(*) Notice: Subject to any disclaimer, the term of this patent is extended or adjusted under 35 U.S.C. 154(b) by 9 days.

(21) Appl. No.: 16/234,260

(22) Filed: Dec. 27, 2018

(65) Prior Publication Data

US 2019/0132709 A1    May 2, 2019

(51) Int. Cl.
*H04W 4/06*    (2009.01)
*H04W 4/38*    (2018.01)
(Continued)

(52) U.S. Cl.
CPC .............. *H04W 4/06* (2013.01); *G05D 1/028* (2013.01); *G08G 1/091* (2013.01); *H04W 4/38* (2018.02);
(Continued)

(58) Field of Classification Search
CPC ... H04L 67/12; H04L 67/125; H04L 12/4608; H04L 12/4616; H04L 12/462; H04L 12/4633; H04L 12/66; H04L 1/16; H04L 41/0893; H04L 43/04; H04L 5/0007; H04L 5/001; H04L 5/0023; H04L 5/14; H04L 67/04; H04L 67/10; H04L 67/1095; H04L 67/306; H04L 67/32; H04L 67/327; H04W 4/40; H04W 4/046; H04W 4/38;
(Continued)

(56) References Cited

U.S. PATENT DOCUMENTS 10,466,716 B1 * 11/2019 Su ......................... G06N 20/00
2017/0024500 A1 *  1/2017 Sebastian ............ G01M 17/007
(Continued)

OTHER PUBLICATIONS

"Intelligent Transport System (ITS); Communication Architecture", Sep. 2010, 44 pages, ETSI EN 302 6665 v1.1.1.
(Continued)

*Primary Examiner* — Golam Sorowar
(74) *Attorney, Agent, or Firm* — Schwabe, Williamson & Wyatt, P.C.

(57) ABSTRACT

Systems, methods, and computer-readable media are provided for wireless sensor networks (WSNs), including vehicle-based WSNs. A road side unit (RSU) includes one or more fixed sensors covering different sectors of a designated coverage area. The RSU uses the sensors to capture sensor data that is representative of objects in the coverage area, tracks objects (e.g., vehicles) in the coverage area, and determines regions in the coverage area that are not adequately covered by the sensors (e.g., "perception gaps"). When the RSU identifies an object that is in or at a perception gap, then the RSU sends a request to that object for sensor data captured by the object's on-board sensors. The RSU obtains the sensor data from the object, and uses the obtained sensor data to complement the knowledge that the RSU (i.e., "filling the perception gaps"). Other embodiments are disclosed and/or claimed.

29 Claims, 12 Drawing Sheets

(51) Int. Cl.
| | |
|---|---|
| *H04W 4/40* | (2018.01) |
| *G08G 1/09* | (2006.01) |
| *G05D 1/02* | (2020.01) |
| *H04W 4/46* | (2018.01) |
| *H04W 84/18* | (2009.01) |
| *G05D 1/00* | (2006.01) |

(52) U.S. Cl.
CPC .............. *H04W 4/40* (2018.02); *H04W 4/46* (2018.02); *G05D 1/0088* (2013.01); *G05D 2201/0213* (2013.01); *H04W 84/18* (2013.01)

(58) Field of Classification Search
CPC ..... H04W 4/46; H04W 84/005; H04W 8/005; H04W 16/32; H04W 24/02; H04W 24/04; H04W 28/14; H04W 36/0083; H04W 40/12; H04W 40/20; H04W 48/12; H04W 48/16; H04W 4/02; H04W 4/021; H04W 4/023; H04W 4/029; H04W 4/12; G08G 1/166; G08G 1/005; G08G 1/012; G08G 1/0129; G08G 1/0141; G08G 1/095; G08G 1/0962; G08G 1/096716; G08G 1/096741; G08G 1/09675; G08G 1/096775; G08G 1/096791; G08G 1/162; G08G 1/164

See application file for complete search history.

(56) References Cited

U.S. PATENT DOCUMENTS

| | | | | |
|---|---|---|---|---|
| 2018/0227726 | A1* | 8/2018 | Futaki | H04W 4/46 |
| 2018/0299274 | A1* | 10/2018 | Moghe | G01C 21/32 |
| 2018/0365909 | A1* | 12/2018 | Cheng | G07C 5/008 |
| 2019/0114921 | A1* | 4/2019 | Cazzoli | G08G 1/166 |
| 2019/0268915 | A1* | 8/2019 | Li | H04W 48/14 |
| 2019/0294966 | A1* | 9/2019 | Khan | G06K 9/6256 |

OTHER PUBLICATIONS

"Intelligent Transport Systems (ITS); Vehicular Communications; Basic Set of Applications; Local Dynamic Map (LDM); Rational for and guidance on standardization", Jun. 2011, 40 pages, ETSI TR 102 863 v1.1.1.

Hitesh A. Patel et al., "Moving Object Tracking Using Kalman Filter", Apr. 2013, 7 pages, IJCSMC, vol. 2, Issue 4.

"Intelligent Transport Systems (ITS); Users and applications requirements; Part 1: Facility layer structure, functional requirements and specifications", Aug. 2013, 56 pages, ETSI TS 102 894-1 v1.1.1.

S. Saravanan et al., "Video Object Detection and Tracking using kalman filter and color histogram-based Matching algorithm", Jan. 2014, 9 pages, International Journal of Engineering Research and Development, vol. 9, Issue 7.

Jose Santa et al., "Experimental evaluation of CAM and DENM messaging services in vehicular communications", Sep. 2014, 33 pages.

"Intelligent Transport Systems (ITS); Vehicular Communications; Basic Set of Applications; Local Dynamic Map (LDM)", Sep. 2014, ETSI EN 302 895 v1.1.1.

"Intelligent Transport Systems (ITS); Vehicular Communications; GeoNetworking; Part 3: Network Architecture", Dec. 2014, 23 pages, ETSI EN 302 636-3 v1.2.1.

Julio A. Sanguesa et al., "Sensing Traffic Density Combining V2V and V2I Wireless Communications", 2015, 17 pages, www.mdpi.com/journal/sensors.

"3rd Generation Partnership Project; Technical Specification Group Services and System Aspects; Study on LTE Support for V2X Services (Release 14)", Sep. 2015, 42 pages, 3GPP TR 22.885 v1.0.0.

"Intelligent Transport Systems (ITS); Radiocommunications equipment operating in the 5 855 MHz to 5 925 MHz frequency band; Harmonised Standard covering the essential requirements of article 3.2 of Directive 2014/53/EU", Feb. 2017, 49 pages, ETSI EN 302 571 v2.1.1.

"Intelligent Transport Systems (ITS); Facilities layer function; Part 1: Services Announcement (SA) specification", May 2017, 17 pages, ETSI TS 102 890-1 v1.1.1.

"Intelligent Transport Systems (ITS); Vehicular Communications; GeoNetworking; Part 4: Geographical addressing and forwarding for point-to-point and point-to-multipoint communications; Sub-part 1: Media-Independent Functionality", Aug. 2017, 97 pages, ETSI EN 302 636-4-1 v1.3.1.

Xi Chen et al., "Tracking Multiple Moving Objects Using Unscented Kalman Filtering Techniques", Feb. 5, 2018, 14 pages.

"Intelligent Transport Systems (ITS); User and applications requirements; Part 2: Applications and facilities layer commmon data dictionary", Aug. 2018, 100 pages, ETSI TS 102 894-2 v1.3.1.

"Intelligent Transport Systems (ITS); Vehicular Communications; Basic Set of Applications; Part 2: Specification of Cooperative Awareness Basic Service", Aug. 2018, 45 pages, ETSI TS 302 637-2 v1.4.0.

"Intelligent Transport Systems (ITS); Vehicular Communications; Basic Set of Applications; Part 3: Specification of Decentralized Environment Notification Basic Service", Aug. 2018, 74 pages, ETSI EN 302 637-3 v1.3.0.

"Multi-access Edge Computing (MEC); Study on MEC Support for V2X Uses Cases", Sep. 2018, 19 pages, ETSI GR MEC 022 v2.1.1.

* cited by examiner

SENSOR NETWORK ENHANCEMENT MECHANISMS

FIELD

Embodiments discussed herein are related to computing, and in particular, to Fog and Edge sensor networks having particular application to vehicle-to-everything (V2X) communications and computer-assisted or autonomous driving (CA/AD) vehicles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Computer-assisted or (semi-)autonomous driving (CA/AD) vehicles may include various technologies for perception, such as camera feeds and sensory information. The European Technology Standards Institute (ETSI) publishes an Intelligent Transport Systems (ITS) standard, which includes telematics and various types of communications between vehicles (e.g., vehicle-to-vehicle (V2V)), between vehicles and fixed locations (e.g., vehicle-to-infrastructure (V2I)), between vehicles and networks (e.g., vehicle-to-network (V2N)), between vehicles and handheld devices (e.g., vehicle-to-pedestrian (V2P)), and the like. Dedicated short-range communications (DSRC) and/or cellular vehicle-to-everything (C-V2X) protocols provide communications between vehicles and the roadside infrastructure. Cooperative-ITS (C-ITS) may support full autonomous driving including wireless short range communications (ITS-G5) dedicated to automotive ITS and road transport and traffic telematics (RTTT). C-ITS may provide connectivity between road participants and infrastructure.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

In particular, FIG. 4 shows map generation process according to various embodiments;

FIG. 5 shows an example handshake procedure according to various embodiments; and FIG. 6 shows a a coverage area region/section selection process according to various embodiments.

DETAILED DESCRIPTION

Figure 1:
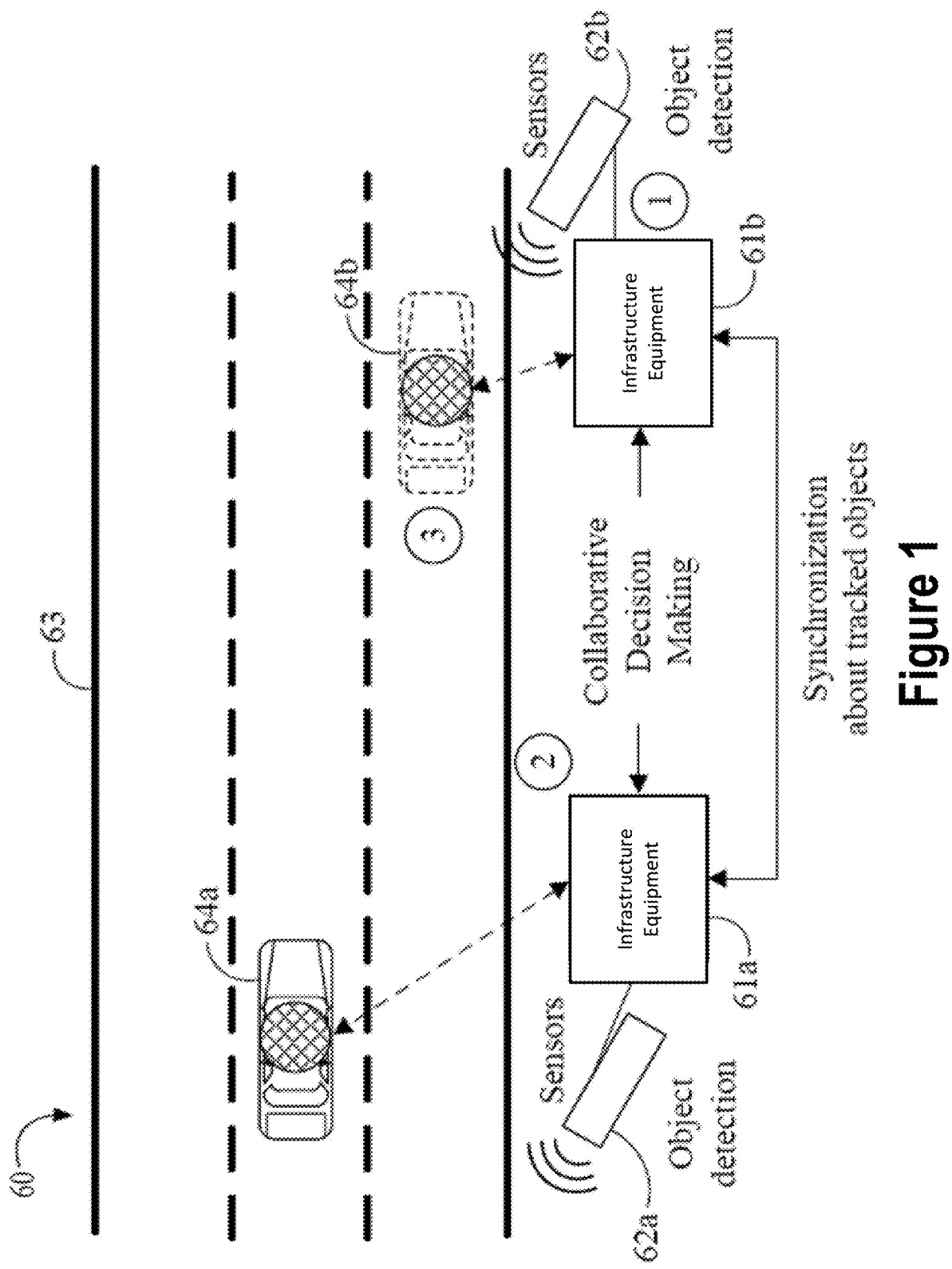
FIG. 1 illustrates an example environment in which various embodiments of the present disclosure may be practiced.

Disclosed embodiments are related to sensor networks, and in particular, sensor networks for vehicular applications. Many vehicular service providers (e.g., mapping, navigation, traffic management, etc.) and communications service providers (e.g., C-V2X, DSRC, etc.) use sensor data to provide accurate and up-to-date services. As an example, the Safespot project includes a Local Dynamic Map (LDM), which is a real-time traffic status map that structures relevant data for driving and provides information about highly dynamic objects, such as vehicles on a road. The sensor data provided to these services include sensor data from fixed sensor arrays, as well as sensor data from vehicle mounted/embedded sensors. However, sensor data may become unavailable at different points in time (i.e., "occlusions"), which may negatively affect the ability for service providers to create maps and/or otherwise provide their services. In order for the infrastructure to be reliable, the data it serves needs to be complete, correct, accurate and timely.

According to various embodiments, the sensor accuracy of an infrastructure-based system is augmented with information from clients (e.g., vehicles) being served by the infrastructure-based system. In various embodiments, the clients only send information when requested by the infrastructure equipment, which is different than current V2X solutions, which typically require constant signaling between user equipment and infrastructure equipment. In this way, the embodiments minimize the communication overhead between the clients and infrastructure equipment. In addition, embodiments include utilizing broadcast and/or multicast communication by the infrastructure equipment to further minimize signaling overhead and wireless spectrum congestion.

In disclosed embodiments, infrastructure equipment (e.g., a roadside unit (RSU)) includes or is communicatively coupled with a sensor array. The sensor array includes one or more sensors mounted on the infrastructure equipment and/or one or more fixed sensors deployed at different locations of a designated coverage area. The infrastructure equipment uses the sensor array to capture sensor data that is representative of objects in the coverage area. The infrastructure equipment also determines regions in the coverage area that are not adequately covered by the sensor array (e.g., "sensor coverage holes" or "occlusions"), for example, by identifying gaps in currently available sensor data (e.g., "perception gaps"). The infrastructure equipment tracks objects (e.g., vehicles) in the coverage area. When the infrastructure equipment identifies an object that is in a perception gap region (or about to enter a perception gap region), then the infrastructure equipment will send a request to that object for sensor data captured by the object's on-board sensors. The infrastructure equipment obtains this sensor data from the object, and uses the obtained sensor data to complement the knowledge that the infrastructure (i.e., "filling the perception gaps"). Other embodiments are described and/or claimed.

I. VEHICLE-TO-EVERYTHING EMBODIMENTS

Turning now to FIG. 1, an example environment 60 in which various embodiments of the present disclosure may be practiced, is shown. Environment 60 includes a system of sensors, compute units, and wireless communication technology. The infrastructure equipment 61a, 61b are communicatively coupled to sensor arrays 62a, 62b, respectively. The sensor arrays 62a, 62b each include one or more sensors positioned along a respective section of a physical coverage area 63. A section of the physical coverage area 63 covered by an individual sensor may be referred to as a "sector." Sensors of the sensor arrays 62a, 62b detect one or more objects 64a, 64b as those objects 64a, 64b travel within or through the respective sectors of the physical coverage area 63. The objects 64a, 64b may include wireless communication technology to communicate with the infrastructure equipment 61a, 61b, and with each other. The sensor array 62a includes one or more sensors that provide object detection information to the infrastructure equipment 61a, while the sensor array 62b includes one or more sensors that provide object detection information to the infrastructure equipment 61b (e.g., via radar, ultrasonic, camera, etc.). The infrastructure equipment 61a, 61b may also exchange information about the vehicles 64a, 64b that they are tracking and may support collaborative decision making.

In this example, the objects 64a, 64b are vehicles (referred to as "vehicles 64a, 64b") that are travelling on a road included in the coverage area 63 (referred to as "road 63"). For illustrative purposes, the following description is provided for deployment scenarios including vehicles in a two dimensional (2D) freeway/highway/roadway environment wherein the vehicles are automobiles. However, the embodiments described herein are also applicable to other types of vehicles, such as trucks, busses, motorboats, motorcycles, electric personal transporters, and/or any other motorized devices capable of transporting people or goods. Also, embodiments described herein may be applicable to three dimensional (3D) deployment scenarios where some or all of the vehicles are implemented as flying objects, such as aircraft, drones, unmanned aerial vehicles (UAVs), and/or to any other like motorized devices.

The vehicles 64a, 64b may be any type of motorized vehicles used for transportation of people or goods, each of which are equipped with an engine, transmission, axles, wheels, as well as control systems used for driving, parking, passenger comfort and/or safety, etc. The terms "motor", "motorized", etc. as used herein refer to devices that convert one form of energy into mechanical energy, and include internal combustion engines (ICE), compression combustion engines (CCE), electric motors, and hybrids (e.g., including an ICE/CCE and electric motor(s)). The vehicles 64a, 64b shown by FIG. 1 may represent motor vehicles of varying makes, models, trim, etc. The wireless communication technology employed by the vehicles 64a, 64b may include V2X communication technology, which may allow the vehicles 64a, 64b to communicate directly with one another and with infrastructure equipment 61a, 61b. The V2X communication technology may refer to Third Generation Partnership Project (3GPP) cellular V2X (C-V2X) technology (e.g., based on Long Term Evolution (LTE), Fifth Generation (5G)/New Radio (NR), and beyond) or Institute of Electrical and Electronics Engineers (IEEE) 802.11p V2X technology (e.g., Dedicated Short-Range Communications (DSRC) in the USA or ITS-G5 in the EU). Some or all of the vehicles 64a, 64b include positioning circuitry to (coarsely) determine their respective geolocations and communicate their current position with the infrastructure equipment 61a, 61b in a secure and reliable manner. This allows the vehicles 64a, 64b to synchronize with the infrastructure 61a, 61b. Additionally, some or all of the vehicles 64a, 64b may be computer-assisted or autonomous driving (CA/AD) vehicles, which may include artificial intelligence (AI) and/or robotics to assist vehicle operation.

The infrastructure equipment 61a, 61b may provide environmental sensing services, and in this example, the infrastructure equipment 61a, 61b may provide environmental sensing services for vehicles 64. The environmental sensing services provided by the infrastructure equipment 61a, 61b may be used for real-time mapping of dynamic environments, such as road 63. The real-time mapping of dynamic environments is used for high-reliability decision-making systems, such as when vehicles 64 are CA/AD vehicles 64. In Intelligent Transport Systems (ITS), the real-time mapping may be used for a real-time traffic status map called the Local Dynamic Map (LDM), that structures all relevant data for vehicle operation and that also provides information about highly dynamic objects, such as vehicles 64 on the road 63. The input for the LDM can be provided by user equipment (UEs) equipped with sensors, such as one or more vehicles 64, or by the fixed sensor arrays 62a, 62b deployed along the road 63. Regardless of the source of the sensor data, the environment model built from sensor data needs to be as complete and accurate as possible in order to reliably provide the real-time mapping services.

Current approaches for providing real-time mapping services rely predominantly on a complex set of sensors in each UE in addition to a non-deterministic family of V2X protocols to augment the understanding of an area of interest. Environmental sensing for autonomous or semi-autonomous driving is currently implemented by combining different types of sensor data including radar, light detection and ranging (LiDAR), infrared (IR), visual (e.g., image and/or video), etc. Differential GNSS (DGNSS) is also used to improve localization based on GNSS systems by providing correction data from fixed stations with known geo-positions. These current approaches include highly complex data fusion techniques, and also require relatively large storage resource utilization and relatively large power consumption.

Some service providers (or application developers) rely on vehicular sensing capabilities to provide the real-time mapping services. However, if the real-time mapping is based only on in-vehicle sensors and computing systems, implementing the requisite sensors and compute power may add considerable weight, cost, and energy consumption to each vehicle 64. Additionally, a single vehicle 64 has a limited view of the road 63 (e.g., as compared to the environmental sensing systems that utilize infrastructure equipment 61a, 61b discussed infra). This means that the real-time mapping may be limited to such an extent that it cannot be used for most autonomous or semi-autonomous driving applications.

To overcome the limited viewing capabilities of individual vehicles 64, some mapping service providers attempt to combine the sensing capabilities of multiple vehicles 64 by enabling the vehicles 64 to exchange in-vehicle sensor data with one another. For example, V2X technologies provide lower level network protocols for direct communication between vehicles 64 (e.g., DSRC links or sidelink communications over the PC5 interface in C-V2X systems) and infrastructure 61a, 61b without specifying higher application logic. Cellular communication systems also include broadcast or multicast protocols (e.g., Evolved Multimedia Broadcast and Multicast Service (eMBMS)) for one-to-many communications. However, most V2X and broadcast/multicast protocols do not include acknowledgement mechanisms, which means that the completeness or timeliness of the reception of these messages cannot be guaranteed. Therefore, real-time mapping services relying on V2X and broadcast/multicast technologies for sensor data sharing among vehicles 64 cannot meet the completeness and accuracy requirements for most autonomous or semi-autonomous driving applications.

ETSI Intelligent Transport Systems (ITS) technology suffers similar drawbacks as V2X and broadcast/multicast technologies mentioned previously. ITS comprises systems to support transportation of goods and humans with information and communication technologies in order to efficiently and safely use transport infrastructure and transport means (e.g., cars, trains, planes, ships, etc.). ITS includes infrastructure that supports the exchange of traffic related events using Cooperative Awareness Messages (CAMs) and Decentralized Environmental Notification Messages (DENMs). CAMs are messages exchanged in the ITS network between ITS stations (ITS-Ss) to create and maintain awareness of each other and to support cooperative performance of vehicles 64. DENMs contain information related to a road hazard or abnormal traffic conditions, such as a type and position of the road hazard and/or abnormal condition. ITS also includes a Local Dynamic Map (LDM), which is a data store located within an ITS-S containing information relevant to the operation of ITS applications and related road safety and traffic efficiency. LDM acts as a repository of information for facilities (e.g., Cooperative Awareness (CA) and Decentralized Environmental Notification (DEN) services) and applications that require information on moving objects such as vehicles nearby or on stationary objects such as traffic road signs. Both CA and DEN services include high frequency data/information about location, speed, and direction of each vehicle 64, among others. However, the ETSI ITS work according to best effort and cannot guarantee that all relevant messages are received in time or at all. Additionally, not all vehicles 64 are equipped with ITS-based V2X communication technology to send these messages. The completeness or timeliness of the reception of CAMs or DENMs cannot be guaranteed because CAMs and DENMs are communicated within a heterogeneous environment from vehicles 64 of different makes and models where the source, location, and time synchronization information is unclear. Currently, ITS does not provide a coordinating authority for ensuring the reliability, timeliness, and accuracy of information. Therefore, real-time mapping services relying on ITS technologies for sensor data sharing among vehicles 64 cannot meet the completeness and accuracy requirements for most autonomous or semi-autonomous driving applications.

Some service providers only use infrastructure equipment 61a, 61b and fixed sensor arrays 62a, 62b to provide the real-time mapping services. However, infrastructure-only systems used to provide real-time mapping services cannot meet the completeness and accuracy requirements for most autonomous or semi-autonomous driving applications, since infrastructure-only solutions suffer from occlusions in the sensed environment due to, for example, objects being disposed in the line of sight of one or more sensors in a sensor array 62a, 62b, especially in light of the practical constraints in the deployment of individual sensing elements at the area of interest.

According to various embodiments, the real-time mapping services are provided by infrastructure equipment 61a, 61b, which monitors objects 64a, 64b using individual sensors in the sensor arrays 62a, 62b. The infrastructure equipment 61a, 61b each include map processing subsystem (e.g., map processing subsystem 309 of FIG. 3), which uses the provided sensor data to determine the position, speed, direction, and other properties about the moving objects 64a, 64b in the coverage area 63, and to generate a real-time dynamic map of the coverage area 63. For example, the infrastructure equipment 61a, 61b is communicatively coupled to sensor array 62a, 62b. Sensors of sensor array 62a, 62b are configured to detect an objects 64a, 64b in coverage area 63. In embodiments, map processing subsystem (e.g., map processing subsystem 309 of FIG. 3) includes an object detector (e.g., object detector 305 of FIG. 3) to perform various logical operations for detecting the objects 64 in the coverage area 63 based on the sensor data. The map processing subsystem (e.g., map processing subsystem 309 of FIG. 3) includes a data fuser (e.g., data fuser 352 of FIG. 3) to perform various logical operations for fusing the collected sensor data together. The sensor data may be fused using any suitable technique (e.g., a combination of Kalman filters, Gaussian Mixture Model, etc.). Sensor data fusion may also involve time synchronization using information about location, direction, speed, and size of each object 64 as identified by the object detector (e.g., object detector 305 of FIG. 3). The map processing subsystem (e.g., map processing subsystem 309 of FIG. 3) also includes a map generator (e.g., map generator 386 of FIG. 3) to perform various logical operations for generating an overall map of the coverage area 63. Any suitable technology may be used to generate the overall map of the coverage area 63. Information about the moving objects 64 may be extracted and combined to one overall map including all moving objects 64 in the coverage area 63 that are in the detection range of the sensors communicatively coupled to the infrastructure equipment 61. The result may be represented as an overall map of the coverage area 63. In some embodiments, the object detector (e.g., object detector 305 of FIG. 3) may use the relative movement between objects 64 and the sensors of sensor array 62 to help remove sensor blind spots, which may be based on the constantly changing viewing angles of objects 64 as those objects 64 pass by the stationary sensors. Some embodiments may attempt to achieve as complete as possible/practical coverage by combining different sensor types, sensor positions, and sensing directions. Stationary sensors suitable for detecting moving objects 64 may be deployed along the coverage area 63 in a way such that few or no blind spots may remain under most traffic conditions. This is made possible because most constraints that might exist for vehicle mounted sensors (e.g., weight constraints, space constraints, power consumption constraints, etc.) do not necessarily apply to sensors in stationary sensor arrays 62 deployed at or around the coverage area 63. Even with these proactive measures, some occlusions in the coverage area 63 may still exist due to, for example, objects being disposed in the line of sight of one or more sensors in a sensor array 62.

In embodiments, the infrastructure equipment 61a, 61b also include wireless communication circuitry (not shown by FIG. 1), which is used to obtain sensor data from individual objects 64a, 64b, and provide real-time mapping data to the individual objects 64a, 64b. In particular, properties of objects 64a, 64b under observation are made available as a concise and time-synced map, which the objects 64a, 64b can use to aid their trajectory planning or for other applications/services.

According to various embodiments, the map processing circuitry detects gaps in the coverage area 63 (referred to as "perception gaps") based on the provided sensor data. Additionally, the map processing circuitry determines object capabilities by analyzing acknowledgements sent by selected objects 64a, 64b in the coverage area 63. The map processing circuitry may augment and verify the sensor data obtained from the fixed sensors of the sensor arrays 62a, 62b by requesting position data and sensor data from selected moving objects 64a, 64b in the observed area 63. The position of the objects 64a, 64b is identified before sending the requests for sensor and/or position data by tracking the objects 64a, 64b with the sensors of the sensor arrays 62a, 62b. This allows the responses obtained from the objects 64a, 64b to be mapped to a geolocation in the coverage area 63. This also allows the infrastructure equipment 61a, 61b to request sensor data and/or position information from localized objects 64a, 64b, which helps reduce spectrum crowding and keeps signaling overhead to a minimum. These, and other aspects of the embodiments of the present disclosure, are further described infra.

Figure 2:
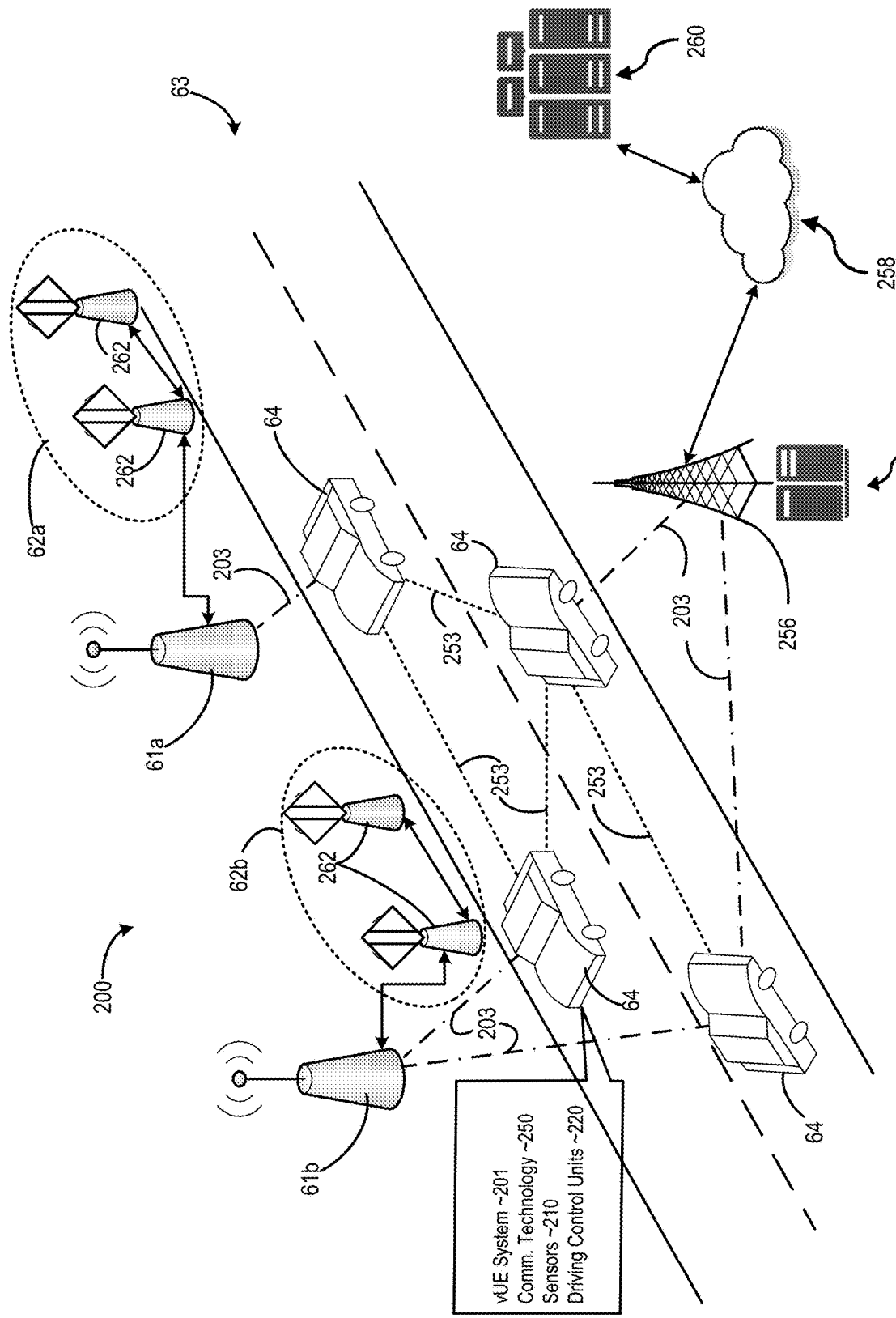
FIG. 2 illustrates an example environment for incorporating and using the sensor network technology of the present disclosure.

Referring now to FIG. 2, wherein an overview of an environment 200 for incorporating and using the sensor network technology of the present disclosure, is illustrated. As shown, for the illustrated embodiments, example environment 200 includes a plurality of vehicles 64 (including vehicles 64a, 64b of FIG. 1), infrastructure equipment 61a, 61b, MEC host 257, and access node 256, network 258, and one or more servers 260.

The environment 200 may be considered to be a type of wireless sensor network (WSN), where the entities in the environment 200 may be considered "network nodes" or "nodes" that communicate among themselves in multi-hop fashion. The term "hop" may refer to an individual node or intermediary device through which data packets traverse a path between a source device and a destination device. Intermediate nodes (i.e., nodes that are located between a source device and a destination device along a path) forward packets to a next node in the path, and in some cases, may modify or repackage the packet contents so that data from a source node can be combined/aggregated/compressed on the way to its final destination. In the example of FIG. 2, the architecture of environment 200 is a de-centralized V2X network comprising vehicles 64 with one or multiple network interfaces, where infrastructure equipment 61a, 61b act as road side units (RSUs). As used herein, the terms "vehicle-to-everything" and "V2X" may refer to any communication involving a vehicle as a source or destination of a message, and may also encompass or be equivalent to vehicle-to-vehicle communications (V2V), vehicle-to-infrastructure communications (V2I), vehicle-to-network communications (V2N), vehicle-to-pedestrian communications (V2P), enhanced V2X communications (eV2X), or the like. These V2X applications can use "cooperative awareness" to provide more intelligent services for end-users. For example, the vehicles 64, radio access nodes, pedestrian UEs, etc., may collect knowledge of their local environment (e.g., information received from other vehicles or sensor equipment in proximity) to process and share that knowledge in order to provide more intelligent services, such as cooperative collision warning, autonomous driving, and the like. The V2X cooperative awareness mechanisms are similar to the CA services provided by ITS system as discussed previously.

The plurality of vehicles 64 shown by FIG. 2 may be the same or similar as vehicles 64a, 64b discussed previously, and may be collectively referred to as a "vehicle 64" or "vehicles 64." Some or all of the vehicles 64 may include vehicular user equipment (vUE) system 201, one or more sensors 220, and one or more driving control units (DCUs) 220. The vUE system 201 is a computing device or system that is physically mounted on, built in, embedded or otherwise included in a vehicle 64. The vUE system 201 includes a number of user or client subsystems or applications, such as an in-vehicle infotainment (IVI) system, an in-car entertainment (ICE) devices, an Instrument Cluster (IC), a head-up display (HUD) system, onboard diagnostic (OBD) systems, dashtop mobile equipment (DME), mobile data terminals (MDTs), a navigation subsystem/application, a vehicle status subsystem/application, and/or the like. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a communications interface, such as the communication technology 250. Moreover, where ITS technology is used, the vUE system 201 and/or the communication technology 250 may be referred to as a "vehicle ITS-S" or simply as an "ITS-S."

The DCUs 220 include hardware elements that control various subsystems of the vehicles 64, such as the operation of the engine, the transmission, steering, braking, etc., and include hardware elements, such as Electronic Engine Management System (EEMS), electronic/engine control units (ECUs), electronic/engine control modules (ECMs), embedded systems, microcontrollers, control modules, engine management systems (EMS), and the like. The sensors 220 are configured to provide various sensor data to the DCUs 220 and/or other vehicle subsystems to enable the DCUs 220 and/or one or more other vehicle subsystems to control respective systems of the vehicles 64. The sensing capabilities of the sensors 220 may include magnetic, thermal, infrared, acoustic, radar, and/or other like sensing capabilities.

Further, the vUE system 201 includes or is coupled with a communication technology 250, which allow the vehicles 64 to, among other things, share information with one another and with infrastructure equipment 261. For example, the communication technology 250 utilizes connections (also referred to as "channels" or "links") 203, each of which comprises a physical communications interface or layer. In this example, the connections 203 are illustrated as air interfaces to enable communicative couplings, and can be consistent with wireless area network (WAN), wireless local area network (WLAN), or any other IEEE 802.11 protocols (e.g., WiFi®, DSRC/WAVE, etc.); cellular communications protocols (e.g., a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, a Worldwide Interoperability for Microwave Access (WiMAX) protocol, etc.), and/or any of the other communications protocols, such as those discussed herein. The communication technology 250 may also enable the vehicles 64 to directly exchange communication data using direct links 253, which may include DSRC interfaces, 3GPP interfaces (Proximity Services (ProSe), sidelink (SL), or device-to-device (D2D) interfaces), Bluetooth® interfaces, and/or some other suitable direct communication technology, such as one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT/ANT+ protocols; Z-Wave; UPnP; and/or the like). As alluded to previously, the communication technology 250 may include or incorporate ITS technology, which provides an abstraction from the implementation details of the underlying communication technology 250. As discussed in more detail infra, the communication technology 250 enables the vehicles 64 to provide acknowledgments (ACKs), position data, and/or sensor data from local sensors 220 to the infrastructure equipment 61a, 61b via channels 203. In some embodiments, the ACKs, positions data, and/or sensor data from local sensors 220 may be relayed to the infrastructure equipment 61a, 61b via one or more vehicles 64 over respective direct links 253.

The communication technology 250 is configured to connect, for example, communicatively couple, the vehicles 64 with one or more access networks (ANs) or radio access networks (RANs). The (R)ANs can include one or more (R)AN nodes, such as infrastructure equipment 61a, 61b, and RAN node 256 shown by FIG. 2, which enable connections with corresponding networks. As used herein, the terms "access node," "access point," or the like may describe network elements or other like equipment that provides the radio baseband functions and/or wire-based functions for data and/or voice connectivity between a network and one or more users. As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host one or more virtual machines. The AN nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell). The ANs are configured to fulfill various radio network controller (RNC) functions such as radio bearer management, uplink and downlink dynamic radio resource management and data packet scheduling, mobility management, and the like. An example implementation of the ANs is shown and described with regard to FIG. S2.

In the example shown by FIG. 2, the infrastructure equipment 61a, 61b are road side units or Roadside ITS-Ss, and the (R)AN node 256 is a cellular base station. The term "Road Side Unit" or "RSU" refers to any transportation infrastructure entity implemented in or by an gNB/eNB/TRP/RAN node or a stationary (or relatively stationary) UE, and the term "Roadside ITS Station" refers to an ITS sub-system in the context of roadside ITS equipment. The infrastructure equipment 61a, 61b may be located at a roadside to provide network connectivity services and transport-based services, such as the real-time mapping services discussed herein, to passing vehicles 64. Each infrastructure equipment 61a, 61b include a computing system communicatively coupled with individual sensors 262 via interface circuitry and/or communication circuitry. In ITS-based embodiments, the interface circuitry and/or communication circuitry of the infrastructure equipment 61a, 61b may be a road equipment data gateway, which is a specific gateway to the road side equipment (e.g., including sensor arrays 62a, 62b, traffic lights, gates or barriers, electronic signage, etc.) from which the infrastructure equipment 61a, 61b may obtain sensor data and other data (e.g., traffic regulation data, electronic signage data, etc.). In these embodiments, a known communication standard may be used for communicating between the infrastructure equipment 61a, 61b and the road side equipment, such as DIASER or the like. The infrastructure equipment 61a, 61b may also include internal data storage circuitry to store coverage area 63 map geometry and related data, traffic statistics, media, as well as applications/software to sense and control on-going vehicular and pedestrian traffic.

The interface circuitry communicatively couples the infrastructure equipment 61a, 61b with individual sensors 262 within the sensor arrays 62a, 62b. Individual sensors 262 cover respective sectors of the physical coverage area 63. The individual sensors 262 may include various sensing capabilities, such as visual (e.g., image or video), radar, LiDAR, IR, ambient light, ultrasonic sensing; sound; etc. In embodiments, consecutive infrastructure equipment 61a, 61b may be deployed in such a way that the respective sectors of the physical coverage area 63 partially overlap, which may allow a continuous and substantially complete map of the coverage area 63 to be generated. The interface circuitry obtains sensor data from the individual sensors 262, which is representative of the respective sectors covered by the individual sensors 262 and objects 64 within or moving through the respective sectors. The coverage area 63 for tracking/monitoring activity is bounded by the observable or sensing range of the individual sensors 262, and other existing objects such as roads, buildings, geographic features, and the like, which may or may not limit the movement of the objects 64. The sensor data may indicate or represent, inter alia, location, direction, and speed of the objects 64. The computing system in the RSE 61 uses the obtained sensor data for real-time mapping services, which may involve computing or generating a dynamic map of the coverage area 63 including representations of the dynamic objects 64 and their movements. The dynamic map, or data for generating the dynamic map, may be communicated to individual objects 64.

In some embodiments, the computing system of the infrastructure equipment 61a, 61b logically divides the observation area 63, or individual sectors, into a grid of two dimensional (2D) cells or three dimensional (3D) cubes. In an example, 2D cells may be used when the observation area 63 is a 2D field or one plane (e.g., a roadway), and 3D cubes may be used when the coverage area 63 includes multiple planes (e.g., overlapping highway intersections or bridges. In some embodiments, each grid cell has the same size with dimensions defined in terms of absolute geolocation coordinates. In any of these embodiments, the computing system of the infrastructure equipment 61a, 61b calculates a grid-based environment model that is overlaid on top of the observed coverage area 63. The grid-based environment model allows the computing system of the infrastructure equipment 61a, 61b to target particular objects 64 in specific grid cells for purposes of requesting data from those targeted objects 64.

In embodiments, the real-time mapping services involves detecting occlusions in the sensed/observed environment (e.g., coverage area 63), and requesting sensor data from selected vehicles 64. In these embodiments, the infrastructure equipment 61a, 61b assign a unique identifier (ID) to each object 64 during a handshake procedure (see e.g., FIG. X2). The infrastructure equipment 61a, 61b use the unique ID assigned during initial handshake procedure (see e.g., FIG. X2) to identify each object 64 at any point in time. The infrastructure equipment 61a, 61b may perform the handshake procedure should object 64 be occluded temporarily. The knowledge of the unique ID, location, direction, and speed of each object 64 enables the infrastructure equipment 61a, 61b to request sensor information for specific locations from selected object 64.

The communication circuitry of the infrastructure equipment 61 may operate on the 5.9 GHz DSRC band to provide very low latency communications required for high speed events, such as crash avoidance, traffic warnings, and the like. Additionally, the communication circuitry of the infrastructure equipment 61 may provide a WiFi hotspot (2.4 GHz band) and/or provide connectivity to one or more cellular networks to provide uplink and downlink communications. The computing system and some or all of the communication circuitry of the infrastructure equipment 61 may be packaged in a weatherproof enclosure suitable for outdoor installation, and may include a network interface controller to provide a wired (e.g., Ethernet) connection to a traffic signal controller and/or a backhaul network. The communication circuitry of the infrastructure equipment 61 may be used for broadcasting V2X messages to vehicles 64 or other objects 64 such as pedestrians or other UEs (not shown by FIG. 2). Broadcasting may be enabled using a suitable broadcast or multicast mechanism such as evolved multimedia broadcast multicast service for LTE (eMBMS). In these embodiments, the infrastructure equipment 61 may include or access several functionalities such as a local gateway (LGW), a V2X application server (V2X-AS), a broadcast multicast service center (BM-SC), and a multimedia broadcast multicast service gateway (MBMS-GW) functionality. In some implementations, the infrastructure equipment 61 may also include a traffic-offloading function (TOF) to offload computational tasks for the LGW, V2X-AS, BM-SC, MBMS-GW, and/or other functions to a local MEC host 257.

As mentioned previously, in the illustrative embodiment, the RAN node 256 is a cellular base station. The RAN node 256 may be a next generation (NG) RAN node that operates in an NR or 5G system (e.g., a next generation NodeB (gNB)), an Evolved UMTS Terrestrial Radio Access Network (E-UTRAN) that operates in an LTE or 4G system (e.g., an evolved NodeB (eNB)), a legacy RAN such as a UMTS Terrestrial Radio Access Network (UTRAN) or GERAN (GSM EDGE Radio Access Network), a WiMAX RAN node, or some other cellular base station. The RAN node 256 may be implemented as one or more of a dedicated physical device such as a macrocell base station and/or a low power (LP) base station for providing femtocells, picocells or other like cells having smaller coverage areas, smaller user capacity, or higher bandwidth compared to macrocells. In other embodiments, the RAN node 256 may be implemented as one or more software entities running on server computers as part of a virtual network, which may be referred to as a cloud RAN (CRAN), virtual RAN, virtual baseband (BB) unit, cloud-based or virtual BB pool, and/or the like. In other embodiments, the RAN node 256 may represent individual gNB-distributed units (DUs) that are connected to a gNB-centralized unit (CU) via an F1 interface (not shown).

Still referring to FIG. 2, the Multi-access Edge Computing (MEC) host 257 (also referred to as a "Mobile Edge Computing Host" or the like) is virtual or physical computing system that hosts various MEC applications and provides MEC services to the MEC applications. MEC provides application developers and content providers with cloud-computing capabilities and an information technology (IT) service environment at the edge of the network. MEC is a network architecture that allows cloud computing capabilities and computing services to be performed at the edge of a network. MEC provides mechanisms that allow applications to be run and to perform related processing tasks closer to network subscribers (also referred to as "edge users" and the like). In this way, network congestion may be reduced and applications may have better performance.

Where the MEC host 257 is implemented as one or more virtual machines (VMs) or the like, the physical devices that implement or operate the MEC host 257 may be referred to as "edge servers." The edge servers may be or include virtualization infrastructure that provides virtualized computing environments and virtualized resources (e.g., "virtualized infrastructure") for the MEC host 257. The MEC applications may run as VMs on top of the virtualized infrastructure. In FIG. 2, the MEC host 257 is co-located with the RAN 256. This implementation may be referred to as a small-cell cloud (SCC) when the RAN 256 is a small cell base station (e.g., pico-cell, femto-cell, etc.) or a WiFi AP, or may referred to as a mobile micro cloud (MCC) when the RAN 256 is a macro-cell base station (e.g., an eNB, gNB, etc.). The MEC host 257 may be deployed in a multitude of arrangements other than as shown by FIG. 2. In a first example, the MEC host 257 may be co-located or operated by an RNC, which may be the case for legacy network deployments, such as 3G networks. In a second example, the MEC host 257 may be deployed at cell aggregation sites or at multi-RAT aggregation points that can be located either within an enterprise or used in public coverage areas. In a third example, the MEC host 257 may be deployed at the edge of a cellular core network. These implementations may be used in follow-me clouds (FMC), where cloud services running at distributed data centers follow the CA/AD vehicles 64 as they roam throughout the network.

In V2X contexts, MEC may be used for advanced driving assistance applications, including real-time situational awareness, see-through sensor sharing services, and high definition local mapping including the dynamic real-time mapping services discussed herein. The MEC host 257 hosts MEC applications running different types of workloads, such as Machine Learning (ML), Augmented Reality (AR), Virtual Reality (VR), Artificial Intelligence (AI), data analytics, sensor measurement fusion from vehicles and the environment, privacy enforcement for data streams destined to a cloud, etc. Different MEC applications can either share data directly, and/or share data through a MEC V2X application programming interface (API).

According to various embodiments, the MEC host 257 is used for real-time mapping application computation offloading, wherein the MEC host 257 executes compute-intensive tasks of these applications, while less computationally intensive functionalities are executed by the vUE system 201 of the vehicles 64. In embodiments, the communication technology 250 of the vehicles 64 may transmit their locally available traffic data and sensor data to the MEC host 257, and the MEC host 257 may aggregate and distribute this data in real time to the vehicles 64 via RAN node 256 and infrastructure equipment 61a, 61b. The compute-intensive tasks are offloaded to the MEC host 257 since MEC host 257 has higher/greater performance capabilities as compared to the vUE system 201 of the vehicles 64. Example use cases of application computation offloading using MEC may also include, inter alia, offloading computationally hungry applications or portions thereof, offloading intermediate data processing applications or portions thereof, and offloading moderate data processing applications or portions thereof. Computation-hungry applications are applications with relatively huge data processing requirements and huge data transfer requirements, such as graphics/video processing/rendering applications, high-speed (low latency) browser applications, artificial/augmented reality applications, low latency cloud based gaming applications, three-dimensional (3D) gaming, and the like. Intermediate data processing applications are applications with large data processing and/or large data transfer requirements that are less stringent than computation-hungry applications including, for example, sensor data cleansing (e.g., pre-processing, normalization), video analysis, and value-added services (e.g., translation, log analytics, and the like). Moderate data processing applications have smaller data processing and/or data transfer requirements than intermediate data processing applications, such as antivirus applications. As examples, the compute-intensive tasks of the real-time mapping services may include some or all the tasks used for sensor data gathering, some or all tasks used for sensor data fusion, and tasks related to map generation and/or segmentation.

For computation offloading, a new instance of an application is started at the MEC host 257 in response to requests from one or more users of the vehicles 64. The MEC host 257 may be selected by a MEC system (e.g., included in the server(s) 260) to start the instance of the application based on a set of requirements (e.g., latency, processing resources, storage resources, network resources, location, network capability, security conditions/capabilities, etc.) that need to be fulfilled for the application. In response to the requests from the user(s), connectivity is established between the vehicles 64 and the instance of the already running application at the MEC host 257 via the communication technology 250. The application instance is terminated when all users connected to the specific instance of the application have disconnected.

Still referring to FIG. 2, the network 258 comprises computers, network connections among the computers, and software routines to enable communication between the computers over network connections. In this regard, the network 258 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without radio frequency (RF) communications circuitry), routers, switches, hubs, radio beacons, base stations, picocell or small cell base stations, and/or any other like network device. Connection to the network 258 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 258 may require that the computers execute software routines which enable, for example, the seven layers of the OSI model of computer networking or equivalent in a wireless (cellular) phone network. Network 258 may be used to enable relatively long-range communication such as, for example, between the one or more server(s) 260 and one or more vehicles 64. The network 258 may represent the Internet, one or more cellular networks, local area networks, or wide area networks including proprietary and/or enterprise networks, Transfer Control Protocol (TCP)/Internet Protocol (IP)-based network, or combinations thereof. In such embodiments, the network 258 may be associated with network operator who owns or controls equipment and other elements necessary to provide network-related services, such as one or more base stations or access points, one or more servers for routing digital data or telephone calls (for example, a core network or backbone network), etc.

Still referring to FIG. 2, the one or more server(s) 260 comprise one or more physical and/or virtualized systems for providing functionality (or services) to one or more clients (e.g., vehicles 64) over a network (e.g., network 258). The server(s) 260 may include various computer devices with rack computing architecture component(s), tower computing architecture component(s), blade computing architecture component(s), and/or the like. The server(s) 260 may represent a cluster of servers, a server farm, a cloud computing service, or other grouping or pool of servers, which may be located in one or more datacenters. The server(s) 260 may also be connected to, or otherwise associated with one or more data storage devices (not shown). Moreover, the server(s) 260 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

Generally, the server(s) 260 offer applications or services that use IP/network resources. As examples, the server(s) 260 may provide traffic management services, cloud analytics, content streaming services, immersive gaming experiences, social networking and/or microblogging services, and/or other like services. In addition, the various services provided by the server(s) 260 may include initiating and controlling software and/or firmware updates for applications or individual components implemented by the vehicles 64. The server(s) 260 could also be configured to support communication services such as Voice-over-Internet Protocol (VoIP) sessions, PTT sessions, group communication sessions, and the like for the vehicles 64 via the network 258. In various embodiments, the server(s) 260 may include or may operate as a central ITS-S, which provides centralized ITS applications. In these embodiments, the central ITS-S may play the role of traffic operator, road operator, services provider, and/or content provider. Furthermore, the central ITS-S may require further connection with other backend systems via a network, such as network 258. For deployment and performances needs, specific instances of central ITS-S may contain grouping of Applications or Facilities layer entities.

One example of the environments 60 and 200 of FIGS. 1-2 is the Kooperative Radarsensoren für das digitale Testfeld ("KoRA9", translated in English as "cooperative radar sensors for the digital test field A9"). KoRA9 involves adaptation and transfer of automotive radar applications in the field of infrastructure sensors 62 for the field of use of the motorway. In this example use case, 77 GHz chipsets used in current automotive sensors are adapted to the requirements of the infrastructure sensors 62. KoRA9 also involves the aggregation, processing, and transmission of sensor data into the vehicles 64 or to a central database (e.g., associated with servers 260) via an upstream "Infrastructure Fog Appliance" or other like local computing platform (e.g., MEC host 257).

Figure 3:
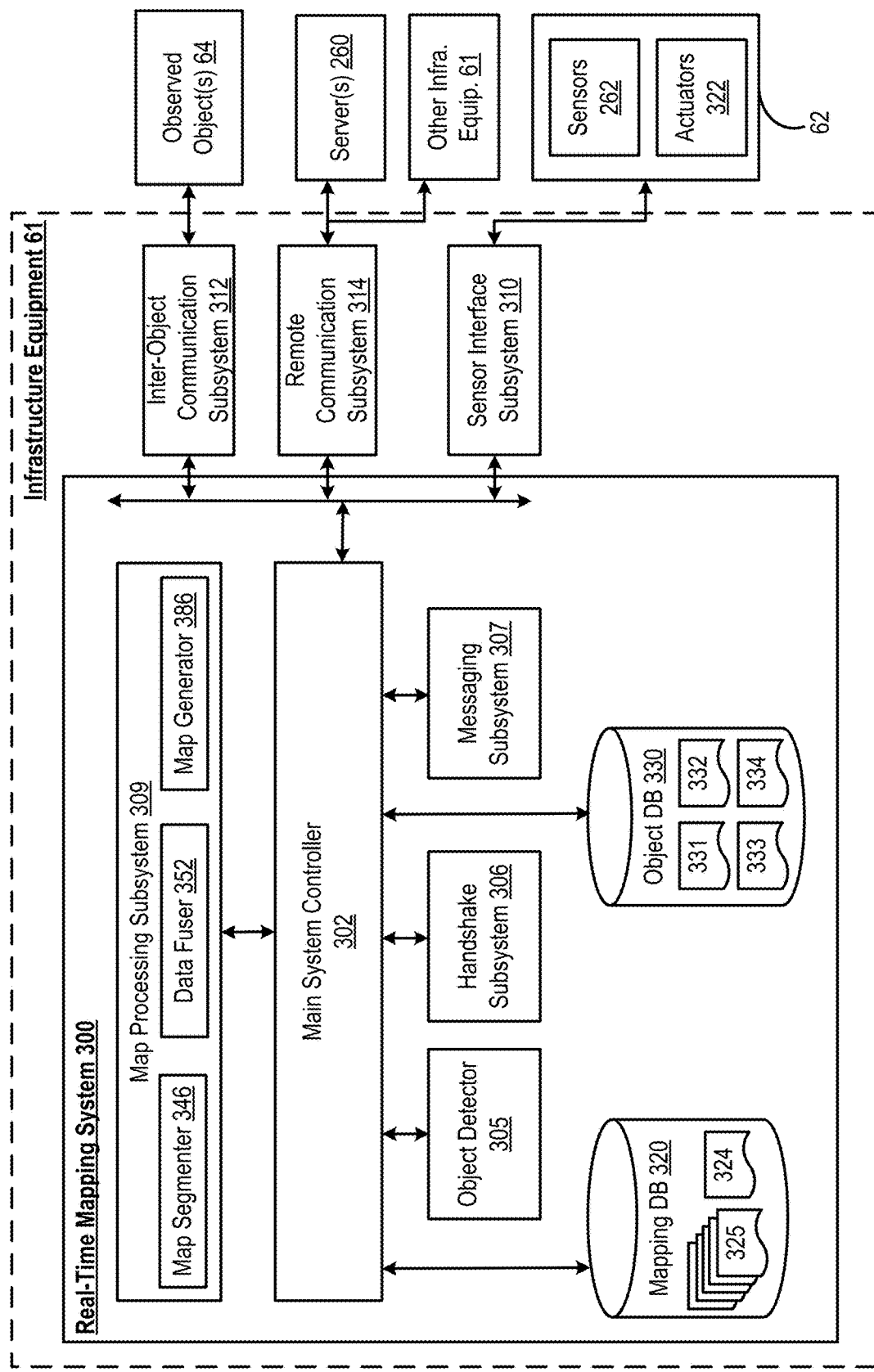
FIG. 3 illustrates a component view of an infrastructure equipment including a Real-Time Mapping Service (RTMS) according to various embodiments.

Referring now to FIG. 3, wherein a component view of an infrastructure equipment 61 including a Real-Time Mapping Service (RTMS) 300, according to various embodiments, is illustrated. In some embodiments, the RTMS 300 may be included in infrastructure equipment 61a, 61b (hereinafter "infrastructure equipment 61"), RAN node 256, or some other suitable system or device. In other embodiments, some or all of the aspects of the RTMS 300 may be hosted by a cloud computing service, which interacts with individual equipment 61 or one or more deployed RMTS appliances or gateways. As shown, the RTMS 300 includes main system controller 302, object detector 305, handshake subsystem 306, messaging subsystem 307, map processing subsystem 309, mapping database (DB) 320, and object DB 330. The map processing subsystem 309 includes a map segmenter 346, a data fuser 352, and a map generator 386. Additionally, the infrastructure equipment 61 includes a sensor interface subsystem 310, inter-object communication subsystem 312, and remote communication subsystem 314. In other embodiments, the RTMS 300 and/or infrastructure equipment 61 may include more or less subsystems than are shown by FIG. 3.

The main system controller 302 is configured to manage the RTMS 300, such as by scheduling tasks for execution, managing memory/storage resource allocations, routing inputs/outputs to/from various entities, and the like. The main system controller 302 may schedule tasks according to a suitable scheduling algorithm, and/or may implement a suitable message passing scheme to allocate resources. In some embodiments, the main system controller 302 may operate an operating system (OS) to allocate computing, memory/storage, and networking/signaling resources, such as those discussed herein. In some embodiments, the main system controller 302 is configured to facilitate intra-subsystem communication between the various subsystems of the RTMS 300 using suitable drivers, libraries, application programming interfaces (APIs), middleware, software connectors, software glue, and/or the like. The main system controller 302 is also configured to control communication of application layer (or facilities layer) information with objects 64, such as sending/receiving requests/instructions and data (e.g., ACKs, position information, and sensor data), including functionality for encoding/decoding such messages.

Continuing with the example of FIG. 3, the object detector 305 is configured to detect, monitor, and track object(s) 64 in a coverage area 63. The detecting, tracking, and monitoring of the observed object(s) 64 is based on received sensor data. The object detector 305 is configured to receive sensor data from sensors 262 with the assistance of sensor-interface subsystem 310, and in some embodiments, may receive sensor data held by one or more other infrastructure equipment 361 with the assistance of remote communication subsystem 314. According to various embodiments, the object detector 305 is also configured to receive sensor data held by observed objects 64 with the assistance of inter-object communication subsystem 312. As alluded to previously, what constitutes the coverage area 63 may be application dependent, limited by the sensing capabilities of the sensors 262, and varies from embodiment to embodiment. According to various embodiments, the object detector 305 continuously tracks the observed objects 64, and determines vector information (e.g., travel direction, travel velocity/speed, travel acceleration, etc.) about the observed objects 64. The object detector 305 may use one or more known object tracking and/or computer vision techniques to track the objects 64, such as a Kalman filter, Gaussian Mixture Model, Particle filter, Mean-shift based kernel tracking, a machine learning (ML) object detection technique (e.g., Viola-Jones object detection framework, scale-invariant feature transform (SIFT), histogram of oriented gradients (HOG), etc.), a deep learning object detection technique (e.g., fully convolutional neural network (FCNN), region proposal convolution neural network (R-CNN), single shot multibox detector, 'you only look once' (YOLO) algorithm, etc.), and/or the like. Some of the aforementioned techniques use identifiers (referred to as "inherent IDs" or the like) to track detected objects 64 in video or similar sensor data. In these embodiments, the object detector 305 may store these inherent IDs in the object DB 330. As discussed infra, these inherent IDs may be associated with unique IDs assigned to the detected objects 64 by the handshake subsystem 306.

In addition to using sensor data, the object detector 305 may use other mechanisms to assist the detection and monitoring of the objects 64. For example, the object detector 305 may detect and track objects 64 using known received signal strength indication (RSSI) calculations of one or more signals generated by the observed objects 64, triangulation, and/or dead reckoning methods. In another example, the object detector 305 may utilize other information associated with the one or more signals for detecting and tracking objects 64, such as directional signaling measurements, path loss measurements, packet delay time, signal to noise ratio, signal to noise plus interference ratio, throughput measurements, jitter, latency, round trip time (RTT), number of interrupts, out-of-order delivery of data packets, and/or other like parameters.

Continuing with the example of FIG. 3, the sensor interface subsystem 310 communicatively couples the infrastructure equipment 61 and the RTMS 300 with the sensor array 62, and facilitates communication with sensors 262 and actuators 322 in the sensor array 62. In particular, sensor interface subsystem 310 is configured to receive data from sensors 262 and actuators 322, and transmit commands to sensors 262 and actuators 322 for operation/control of the sensors 262 and actuators 322. Example of commands to sensors 262 and actuators 322 may include, but are not limited to, calibration commands, commands to collect certain sensor/actuator data that are collected asynchronously or on demand (as opposed to being collected continuously or on a periodic basis), and/or commands to change a position or orientation of a particular sensor 262 and/or actuator 322. In some embodiments, sensor interface subsystem 310 is configured to support inter-device communication in accordance with one or more industry standards, such as cellular, WiFi, Ethernet, short-range communication or personal area network (PAN), a Controller Area Network (CAN), or some other suitable standard or combination(s) thereof, such as those discussed herein. In this example of FIG. 3, the sensor array 62 includes the sensors 262 and actuators 322. The sensor interface subsystem 310 includes various electrical/electronic elements to interconnect the infrastructure equipment 61 with the sensors 262 and actuators 322 in the sensor array 62, such as controllers, cables/wires, plugs and/or receptacles, etc. In some implementations, the sensor interface subsystem 310 may include wireless communication circuitry to wirelessly communicate with the sensors 262 and actuators 322 in the sensor array 62. In ITS implementations, the sensor interface subsystem 310 may be a roadside ITS-S gateway or a road equipment data gateway, which is a specific gateway to the road side equipment and interconnects components of the roadside system including sensors 262 in sensor arrays 62, traffic lights, gates or barriers, gantries, electronic signage, etc.

The one or more sensors 262 include devices that are configured to measure and/or detect state changes or motions in the coverage area 63, and provide sensor data representative of the detected/measured changes to the object detector 305 via the sensor interface subsystem 310 and the main system controller 302. In some embodiments, the sensors 262 include one or more motion capture devices that are configured to capture motion by detecting a change in position of an object 64 relative to its surroundings (e.g., one or more objects surrounding the object 64), by detecting a change in the surroundings relative to the object 64, and/or measure the strength and/or speed of the object 64's motion. The motion (or change in motion) as well as the speed and direction of the motion may be detected by reflection of visible light (or opacity), ultraviolet light, sound, microwaves, infrared (IR) or near-IR waves, and/or some other suitable electromagnetic energy. The sensors 262 may include know electronic elements depending on the type of sensors 262 (e.g., radar, LiDAR, visible or UV light cameras, thermographic (IR) cameras, etc.), for example, transmitters, waveguides, duplexers, receivers (e.g., radar signal receiver, photodetectors, or the like), MEMS devices, scanners, beam splitters, signal processors or DSPs, energy sources (e.g., illumination sources, laser projectors, IR projectors, etc.), antenna arrays including individual antenna elements, and/or other like elements as are known. Other types of sensors 262 may be used in other embodiments.

The actuators 322 are devices that are responsible for moving and controlling a mechanism or system. In various embodiments, the actuators 322 are used to change the operational state (e.g., on/off, zoom or focus, etc.), position, and/or orientation of the sensors 262. In some embodiments, the actuators 322 are used to change the operational state of some other roadside equipment, such as gates, traffic lights, digital signage, etc. The actuators 322 are configured to receive control signals from the RTMS 300 via the sensor interface subsystem 310, and convert the signal energy (or some other energy) into an electrical and/or mechanical motion. The control signals may be relatively low energy electric voltage or current. In embodiments, the actuators 322 comprise electromechanical relays and/or solid state relays, which are configured to switch electronic devices on/off and/or control motors.

Continuing with the example of FIG. 3, the handshake subsystem 306 facilitates a handshake procedure with detected objects 64 with the assistance of inter-object communication subsystem 312, which may include using one or more communication protocols as discussed in more detail infra. During the handshake procedure each detected object 64 receives a system wide (unique) ID, and the detected objects 64 inform the infrastructure equipment 61 about the capabilities of the objects 64 related to wireless communication, self-localization, and environment sensor readings. Multiple handshake procedures may be performed with an object 64 as the object 64 travels through the coverage area 63. An initial handshake procedure may take between an object 64 and the infrastructure equipment 61 when the object 64 passes by the sensors 262 for the first time, such as when a vehicle 64 enters through an intersection. The handshake subsystem 306 may repeat the handshake procedure with one or more selected objects 64 as these objects 64 pass a predetermined number of sensor arrays 62a, 62b and/or infrastructure equipment 61a, 61b to calibrate the sensors 262. In some embodiments, the handshake procedure is also repeated with an object 64 if the object 64 is occluded temporarily and is later detected by the infrastructure equipment 61a, 61b.

In various embodiments, the handshake procedure allows the infrastructure equipment 61 to learn the capabilities of the tracked objects 64 so that sensor data and positioning data are only requested from suitable objects 64. The object capabilities include, but are not limited to, geo-positioning capabilities indicating whether any types of positioning systems implemented by the objects 64, wireless communication capabilities indicating the types of communication circuitry implemented by the objects 64, and sensing capabilities indicating the types of sensors, and the related readings ranges and precision of those sensors. The combination of location/position information obtained from the objects 64 and the tracking of objects 64 using sensor data from the individual sensors 262 allows the infrastructure equipment 61a, 61b to broadcast or multicast map data helping to minimize latency in wireless information exchange.

As mentioned previously, the handshake subsystem 306 assigns a unique ID to each tracked object 64. The unique ID is used to broadcast or multicast data (e.g., RTMS data) to the objects 64. The unique ID is generated for each detected object 64 by the handshake subsystem 306 using, for example, Universally Unique Identifier (UUID) algorithms or some other suitable mechanism. The unique ID does not have to be a globally unique ID, and instead, may be a locally unique ID (i.e., local to the coverage area 63). The locally unique IDs can be reused once the object 64 leaves the coverage area 63 since the ID only needs to be unique among objects 64 in the coverage area 63. In one example implementation, 16 bit IDs may be used, which allows 65536 unique values to be generated. Additionally, randomly changing the unique IDs for objects 64 during each handshake may alleviate privacy concerns. After the unique ID is assigned to an object 64, the handshake subsystem 306 stores the assigned unique ID in the object DB 330. Additionally, after the unique ID is assigned to an object 64, the object detector 305 continuously tracks the object 64, with the assistance of the sensors 262 via the sensor interface subsystem 310, and provides and updated position information of the object 64 to the map processing subsystem 309.

The handshake subsystem 306 also plays a role in managing storage of the unique IDs. As mentioned previously, the object detector 305 uses an object tracking algorithm, such as a Kalman filter, Gaussian Mixture Model, or the like that already use inherent IDs to track detected objects 64 in video or similar sensor data. In these embodiments, the object detector 305 may store the inherent IDs from the tracking algorithm in association with the assigned unique IDs in records 331 (also referred to as "ID records 331" or the like). Additionally, the object DB 330 also stores the object capabilities obtained during the handshake procedure in records 332 (also referred to as "capabilities records 332" or the like), and stores object data (e.g., velocity/speed, position, direction, size, sensor data etc.) obtained from the objects 64 after the handshake procedure in records 333. Furthermore, the object DB 330 stores records 334 indicating message types and details of message content for each message type to be sent back by the objects 64. This allows the main system controller 302 to send information requests to the objects 64 using triggers or single bit flags. The object DB 330, and in particular records 334, stores relations between unique IDs and message types as long as the objects 64 are within communication range of the infrastructure equipment 61a, 61b.

In some embodiments, the message type and/or message content may be in the form of an object list that contains one record per detected object 64 and its attributes. One advantage of using an object list is that messages to specific objects 64 can be embedded into the normal payload since the recipients of the information are at the same time the data object inside the message. An example object list is shown by table 1 infra.

Continuing with the example of FIG. 3, the map processing subsystem 309 includes a map segmenter 346, data fuser 352, and map generator 386. The data fuser 352 includes technology to combine sensor data from the sensors 262 and sensors mounted in/on one or more objects 64. The data fuser 352 may include technology to perform sensor detection and/or data collection and may combine/process the data to prepare the data for map generation. The map generator 386 includes technology to generate an environmental map 324 of the coverage area 63 based on the combined sensor data from the data fuser 352, and control storage of the map 324 in the mapping DB 320. The map segmenter 346 includes technology to divide the environmental map 324 from the map generator 386 into two or more map segments 325. In some embodiments, the map segmenter 346 is configured to annotate the two or more map segments 325 with information for the one or more objects 64 to construct respective individualized environmental maps. For example, the map segmenter 346 may assign a unique identifier to each of the two or more map segments 325 corresponding to a location in the environmental map 324. In some embodiments, the map segmenter 346 may be further configured to cluster the one or more objects 64 into the two or more map segments 325 based on respective locations of the one or more objects 64 and respective locations of the two or more segments in the environmental map 324. In ITS implementations, the mapping DB 320 may correspond to an LDM repository.

Some embodiments may advantageously provide a fog/edge infrastructure-aided dynamic mapping for autonomous driving and manufacturing (e.g., automated warehouses). For example, some embodiments may provide a platform to serve individualized maps of highly dynamic data for driving decisions in CA/AD or AV vehicles 64. As used herein, autonomous may refer to either fully autonomous or partially autonomous. Real-time mapping of a highly dynamic environment may be important for high-reliability decision making systems. In the assisted/autonomous driving sector, for example, in-vehicle processing alone may be insufficient to form a sufficient or complete real-time object-detection and tracking map of the surrounding area. Some embodiments may advantageously provide an infrastructure (e.g., a roadside system) to augment in-vehicle processing for more complete map generation and object tracking.

Some embodiments may provide unique labeling of objects 64 identified by infrastructural sensors 262, map segment tagging, and/or remote updates, together with a low overhead handshake protocol facilitated by the handshake subsystem 306 between the infrastructure equipment 61 and the objects 64. Some embodiments may provide an improved or optimum portion and detail of the high resolution map to each object 64 to advantageously ensure complete coverage without requiring high additional processing load. Relevant performance indicators (e.g., in the context of CA/AD vehicles 64) may include completeness and absence of artifacts, precision, timeliness, and sufficient coverage distance (e.g., complete width of the road or production line). Improvement or optimization of these performance indicators in the vehicle alone may be limited, for example, where an CA/AD vehicle 64 may use sensor data acquired on board and may try to integrate the data in an environment model based on high resolution maps. For some other on-board only systems, for example, the radius of environmental perception may be limited due to a range limitation in sensor technology, obstacles like other vehicles, road bends, infrastructure, and/or weather conditions. The physical space for mounting sensors may be limited by aerodynamics and other design constraints. Adding sensors and/or additional compute power may add considerable weight, cost and energy consumption to each vehicle. Some embodiments may improve the generation of an individualized map for an CA/AD vehicle 64 by augmenting the local sensor data with broadcast data from a collaborative infrastructure. In the collaborative infrastructure, for example, the environmental model may also be based on a high resolution map but the collaborative infrastructure may use fixed sensors along the road. A global consistent environment model may be distributed to all participating vehicles. Advantageously, shifting more compute power to the infrastructure equipment 61 (or the MEC host 257) together with roadside sensors 262 may reduce the need for more powerful/complex sensors and/or compute capability in the CA/AD vehicles 64.

Continuing with the example of FIG. 3, the inter-object communication subsystem 312 is configured to facilitate communication with observed objects 64. In particular, inter-object communication subsystem 312 is configured to receive data from observed objects 64, and broadcasts or multicasts messages to the observed objects 64 to perform handshakes and/or request data from observed objects 64. The inter-object communication subsystem 312 is configured to support communication between the infrastructure equipment 61 and the observed objects 64 in accordance with one or more industry standards, such as cellular specifications provided by the Third Generation Partnership Project (3GPP) New Radio (NR) and/or Long Term Evolution (LTE) standards, a Local Area Network standard such as WiFi specified by a suitable IEEE 802.11 standard, a short-range communication standard such as Bluetooth/Bluetooth Low Energy (BLE), ZigBee, Z-Wave or the like, or some other suitable standard or combination(s) thereof, such as those discussed herein. For some of these embodiments, the object detector 305 and/or other subsystems of the RTMS 300 are further configured, with the assistance of inter-object communication subsystem 312, to scan and discover whether the observed objects 64 support a particular inter-device communication industry standard. For WiFi implementations (e.g., DSRC and/or IEEE 802.11p), the scan could include, for example, performing energy detection (ED) during a listen-before-talk (LBT) operation to detect an unoccupied channel. For C-V2X implementations, the scan/discovery could include, for example, requesting V2X (or ProSe) capabilities and/or permissions directly from the objects 64 themselves or from a V2X control and management function (or ProSe Function) located in a core network. Further, main system controller 302, object detector 305, or some other subsystem may be configured, with the assistance of inter-object communication subsystem 312, to authenticate the observed objects 64, confirming that some or all of the observed objects 64 include suitable communications and autonomic capabilities. Upon authentication of the other observed objects 64, the main system controller 302 may control the inter-object communication subsystem 312 to exchange authentication information, including identification and/or security information. In some embodiments, this information may be exchanged in a secure manner, in accordance with a security protocol specified by the mutually supported communication standard. For example, the authentication information may be encrypted prior to transmission to the observed objects 64 or the like.

According to various embodiments, the messaging subsystem 307, with the assistance of the inter-object communication subsystem 312, broadcasts or multicasts messages to request data from the objects 64, which may be referred to as "send information requests." In these embodiments, the messaging subsystem 307 is configured to generate and encode the messages for broadcast/multicast, and decode messages that are received from individual observed objects 64. In some embodiments, the messaging subsystem 307 generates an object list indicating all observed objects 64 in the coverage area 63, which is then broadcasted/multicast to all observed objects 64 in the coverage area 63. This object list is updated and sent on a relatively frequent basis according to an interval that is adequate for the recipients' navigation requirements. Each object 64 has a set of attributes and/or data elements (DEs) that are required for reliable navigation decisions including, but are not limited to, assigned unique ID, position (e.g., GNSS geolocation), direction, speed, vehicle size, vehicle Type, and/or the like. In various embodiments, the set of attributes of the object list includes the send information request attributes or DEs. In embodiments, each recipient object 64 will be included in the object list in the form of a data record forming a map of all moving objects 64 in the coverage area 63. In this way, the send information requests for individual objects 64 can be embedded in already existing attributes for the individual objects 64. In embodiments, the send information requests may be Boolean attributes including, for example, a send ACK attribute to instruct the object 64 to reply with an acknowledgment message, Send Sensor attribute to instruct the object 64 to reply with own sensor data about a sensed environment, and a Send Position attribute to instruct the object 64 to reply with its own position data (e.g., GNSS and/or GPS coordinates). When the observed objects 64 receive the object list, the observed objects 64 may search for their corresponding records in the object list using the unique ID that was assigned to the objects 64 during initial handshake procedure. In these embodiments, since the attributes and/or DEs in the object list, including the send information requests, may be more or less identical for each object 64, the infrastructure equipment 61 may conserve computational resources. Additionally, using broadcast/multicast technologies may allow the infrastructure equipment 61 to reduce communication/signaling overhead. The object list may be formed or generated using any suitable markup language, schema language, data interface language, etc. In some embodiments, the object list comprise documents or data structures in a format that can be interpreted by the subsystems of RTMS 300, such as XML (or any variation thereof), JSON, markdown (or any variation thereof), IFTTT ("If This Then That"), PADS markup language (PADS/ML), routing policy language (RPL), Click router configuration language, Nettle, and/or some other suitable data format, such as those discussed herein. An example object list in JSON human readable format is shown by table 1, which includes example data sizes for each field in pseudo comments.

TABLE 1

Example Object List

```
{
//Map Header section //
  "ServiceName": "LDM ObjectList", # string (20)
  "FogPlatformID": 3.1, # string (10)
  "Version": 1.1, # string (10)
//time of sending the finished map, time of measurement timestamps are
with each object
  "Timestamp_map": "1520255627741" # 2 × uint32
//rectangular road section
  "MapSection": {
//corner points of map section, listed clockwise
  "Points":[
// map corner point coordinates, GPS are dummy values
        "Point": {
          "latitude": 48.339581, # float64
          "longitude": 11.608018 # float64
        },
        "Point": {
          "latitude": 48.347316, # float64
          "longitude": 11.603527 # float64
        }
        "Point": { // map corner point coordinates
          "latitude": 48.339581, # float64
          "longitude": 11.608018 # float64
        },
        "Point": {
          "latitude": 48.347316, # float64
          "longitude": 11.603527 # float64
        }
  ],
  "SegmentSize": {
  "unit": "meters", # string (10)
  "value": 100, # uint32
      "count": 15 # uint32
  },
//*******END Header Section*******//
//*******Segment Header Section*******//
  "Segments": [
  {
  "id": 1, # string (36)
//*******END Segment Header Section*******//
//*******OBJECT LIST*******//
      "Objects": [
//*******Single Object Section*******//
      {
      "id": "277bfe58-b137-405b-9836-75c6410faf15", # string (36)
      "type": "passenger", # string (20)
      "timestamp": "1520255585004", # 2 × uint32
      "position": {
      "latitude": 48.339581, # float64
      "lat_sigma": 2.5, # float32 // in meters
      "longitude": 11.603527, # float64
      "long_sigma": 2.5 # float32 // in meters
      },
//vector based velocity for calculate heading
      "velocity_east": {
      "unit": "m/s", # string (10)
      "value": 29, # int32 //can be negative
      "sigma": 1.1 # uint32
      },
      "velocity_north": {
      "unit": "m/s", # string (10)
      "value": 17, # int32 //can be negative
```

TABLE 1-continued

Example Object List

```
"sigma": 1.1 # uint32
},
"length": {
 "unit": "m", # string (10)
 "value": 4.3, # uint32
 "sigma": 0.2 # uint32
},
"width": {
 "unit": "m", # string (10)
 "value": 1.8, # uint32
 "sigma": 0.2 # uint32
},
"SentAck ": true, # 1 bit
"SentSensor": true, # 1 bit
"SentPosition": false # 1 bit
//*******End Single Object Section*******//
},
{
//nextobject in list
},
    ...
]
},
{
"id": 2, //second map segment
"Objects": [
{
// similar to previous segment
    ...
]
},
    ...
]
}
}
```

The example of table 1 includes a "Map Header Section", which indicates individual map segments 325 segmented by the map segmenter 346. In this example, the overall environmental map 324 is rectangular, and if the overall map 324 contains curved roads, then the rectangle will be large enough to fit the curved road. Additionally, the overall environmental map 324 in this example is split into segments 325 of equal size, and is then equally sliced in a way that the sequence of segments 325 follows the main driving direction for this map segment 325. Other representations of map segments 325 may be used in other embodiments, such as using different shaped and sized map segments for relatively complex interchanges and in cities.

The example of table 1 also includes a "single object section" in the "object list" portion of the message, which includes a set of attributes for an individual object 64. The single object section includes, inter alia, an ID DE, a timestamp DE, a "SentAck" DE, a "SentSensor" DE, and a "SentPosition" DE. The ID DE includes the unique ID assigned to the object during the handshake procedure. The timestamp DE includes a timestamp that may be equalized or synchronized by the infrastructure equipment 61 so that each object 64 does not need its own timestamp. The "SentAck" DE is a one bit DE that, when set to "TRUE" or a value of "1", requests the object 64 to send back an ACK message. The "SentSensor" DE is a one bit DE that, when set to "TRUE" or a value of "1", requests the object 64 to send additional details about its own sensor values and/or captured sensor data. The "SentPosition" DE is a one bit DE that, when set to "TRUE" or a value of "1", requests the object 64 to send back its own position data as determined, for example, using on-board positioning circuitry as calculated after DGNSS or the like. In this example, the object 64 with the unique ID in the ID DE identifies itself in the object list by searching the message for its unique ID, checks the status of the send information request attributes (e.g., whether true/false), and if any of the send information request attributes are set to true, generates and sends the corresponding reply to the infrastructure equipment 61. If any of the send information request attributes are set to false, the agent does not (or stops) transmitting the relevant data to the infrastructure equipment 61. The time of the relevant send information requests is calculated by the messaging subsystem 307 in advance to correspond to a specific geographic location at which the object 64 will be located.

The "single object section" in the "object list" portion of the message in this example also includes a type DE, a position DF, and velocity DF. These DEs/DFs may be used by other objects 64 for placing the subject object 64 in their locally generated maps. The type DE in this example includes a vehicle type, which can be incorporated in the lookup table for vehicle sizes. In this example it is assumed that sizes of vehicles can be classified into 256 different vehicle types, resulting in an 8 bit data size, where trailers are regarded as separate objects 64.

The position DF in this example is a Cartesian (X, Y) coordinate in centimeters from an anchor point within the boundary of the map segment 325 (e.g., the "points" DF and "SegmentSize" DF in the example of table 1). In other embodiments, the position DF can include GNSS longitude and latitude values. In this example, since the transmitted map segment 325 is segmented into polygons, the position values can be given in a relative formation related to the size and position of the bounding segment. This results in a considerable reduction of data size that needs to be transmitted. Using Cartesian coordinates may allow for a smaller message size (and therefore reduced signaling overhead) since the largest number that needs to be stored for Cartesian coordinates is 100000 for a maximum map segment 325 size of 1 kilometer (km). Therefore, the Cartesian coordinates can be stored in two 17 bit DEs, one DE for the X axis and one DE for the Y axis in the Cartesian coordinate system. The sigma DE, which indicates a variance of the latitude and longitude values, could be stored in the same size DF, and in some embodiments, the same sigma can be used for both x- and y axis resulting in 51 bit per position as compared to 192 bits in conventional messages.

Direction and speed are given by the velocity DFs (e.g., the "velocity_north" DF and the "velocity_east" DF in the example of table 1). In this example, the direction and speed are coded together with two scalars, one for the X axis and one for Y axis. These values can be negative when used to calculate the direction. Vector addition of the two values, $v = \sqrt{x^2 + y^2}$, denotes the speed while, $\vec{V} = (V_x, V_y)$, denotes the direction. Using $$100 \frac{m}{s}$$

as a maximum possible speed provides some headroom for the object 64 speed. A granularity of $$0.1 \frac{m}{s}$$

is used to provide a maximum value of 1000 to be stored in both x and y directions. This value can be stored in 10 bit DE resulting in 20 bits for both direction and speed.

In total, the amount of data per single object section is 94 bits including the three bits for the send information request DEs (e.g., 16+51+20+8+3=94 bits). This is then rounded to 96 bits to use a full octet per object 64. Using 430 objects 64 as an example, the total data size for object list is 430×96=41289 bit=5160 Byte=5.1 kb. Adding 130 bytes for metadata in the message header results in 5.2 kilobytes (kb) for a complete 1 km three lane road segment at maximum traffic density.

As alluded to earlier, remote communication subsystem 314 is configured to facilitate communication with one or more remote servers 360 and other infrastructure equipment 361. The remote servers 360 may be the same or similar as the server(s) 260 of FIG. 2, and may be one or more servers affiliated with a mobile network operator, a service provider platform, cloud computing service, traffic management service, energy management service, an insurance company, emergency response services (e.g., first responders, fire, ambulance, etc.), a law enforcement or governmental agency, an environmental data service, and so forth. The other infrastructure equipment 361 may be the same or similar as the infrastructure equipment 61 (with associated sensor arrays 62, etc.) that is deployed at a different geographic location than the infrastructure equipment 61. The remote communication subsystem 314 is configured to support communication between the infrastructure equipment 61, servers 340 and other infrastructure equipment 361 in accordance with one or more industry standards, such as cellular specifications such as 3GPP NR and/or LTE standards, or WiMAX standards; a LAN, WAN, or WLAN standard such as WiFi specified by a suitable IEEE 802.11 standard or Ethernet specified by a suitable IEEE 802.3 standard, or some other suitable standard or combination(s) thereof, such as those discussed herein.

According to various embodiments, the subsystems of the infrastructure system 61 and/or RTMS 300 fills in perception gaps in a real-time dynamic map created and updated by the map processing system 309 by the handshake subsystem 305 performing a handshake procedure (e.g., handshake procedure 500 of FIG. 5) with objects 64 in the coverage area 63; the object detector 305 continuously tracking of all moving objects 64 in the coverage area 63; the object detector 305 and/or the map processing subsystem 309 selecting individual objects 64 from which to obtain sensor data for augmenting the real-time dynamic map; the messaging subsystem 307 generating/encoding request messages to be broadcast or multicast communication to the selected objects 64; and the messaging subsystem 307 and/or the map processing subsystem 309 processing response messages obtained from the selected objects 64.

According to various embodiments, the a subsystem of the RTMS 300 identifies subsections or regions of the coverage area 63 for which additional information is required, and the object detector 305 and/or another subsystem of the RTMS 300 selects individual objects 64 from a list of objects 64 being tracked (e.g., which is stored in the object DB 330). These embodiments allow the infrastructure equipment 61 to improve the environmental perception by filling in or supplementing perception gaps, for example, by augmenting dynamic maps with sensor readings from the tracked objects 64. Additionally, the infrastructure equipment 61 may verify the reception of messages sent to the objects when using broadcast or multicast protocols, which is lacking in most current communication protocols. The selection of objects 64 for sending send information requests includes the map processing subsystem 309 selecting one or more sections or regions of the coverage area 63 (e.g., one or more logical grid cells of the environmental model) for which additional information is needed. The selection of the sections or regions may be different depending on whether the selection is for filling in perception gaps or for receiving acknowledgement messages. For filling in perception gaps, the map processing subsystem 309 uses known mechanisms to detect occlusions of the fixed sensors 262 or other reasons that reduce the completeness of environmental map 324, and selects sections or regions (e.g., grid cells) that correspond to the occluded area. For verifying the reception of broadcasted/multicast messages, the main system controller 302, object detector 305, or some other subsystem of the RTMS 300 selects one or more test sections or regions (e.g., grid cells) at random, using a round robin scheduling mechanism, based on a user/operator selection, or based on the observed traffic situation. In the latter case, simulation result can give an indication of traffic densities or other traffic conditions that may lead to degrading wireless communication coverage.

After the sections or regions (e.g., grid cells) are selected, the object detector 305 consults a list of tracked objects 64 and creates a list of objects 64 that will (or are predicted to) pass through the selected section during a configurable time interval. From this first list, the object detector 305 generates a second list including objects 64 that have the necessary technical capabilities to provide the required information as indicated during initial handshake procedure. Based on the speed of each object 64 in the second list and a determined or known communication delay, the object detector 305 generates a third list including timestamps for the object IDs in the second list, where the timestamps indicate when a send information request should be sent to each object 64 in the second list. The send information request is sent repeatedly as long as each object 64 in the second list is located at or inside the selected section or region.

According to various embodiments, the RTMS 300 may use data in the response messages from the tracked objects 64 in multiple ways, such as when the response messages include sensor data or when the response messages include receipt ACKs. When the response messages include sensor data from the objects 64, the RTMS 300 may establish a level of trust for the sensor data and fuses the sensor data with the sensor data from the fixed sensors 262 to form a new result (data) set. To increase the level of trust for the information from objects 64, the responses from several agents can be used to establish a temporal or spatial overlap of the sensed section or region. Objects 64 that provide incorrect information may be excluded. The results from the overlap check are then fused with the observations based on sensor data of sensors 262. Another trust mechanism for received sensor data may include only considering occupied areas in the report from an object 64. For example, if an object 64 or some other object in the coverage area 63 is detected using sensor data from the sensors 262, but sensor data received from an object 64 does not show the detected object at the same position is ignored whereas an additional object that was not detected by the infrastructure equipment 61 is used for the data fusion process. The overall list of observed objects 64 can also be increased by replies from objects 64 but not reduced. A new result set in form of a map of all dynamic objects is created and sent back to the tracked objects 64.

When the response messages include receipt ACKs, or when such ACK messages are missing, the infrastructure equipment 61 may initiate means to improve reception in the observed coverage area 63, for example, by changing or adjusting one or more network configuration parameters including, for example, antenna parameters (e.g., antenna tilt, azimuth, etc.), downlink transmit power, an on or off state of the infrastructure equipment 61, handover-related parameters, and/or the like. In one example network configuration adjustment may include a coverage and capacity optimization (CCO) function may decide to change the signal strength of the cell or that of an interfering nearby cell by modifying antenna tilt or power settings in order to improve radio link quality. may also include parameters within the same infrastructure equipment 61 or parameters of different infrastructure equipment 61 or network elements with impact between each other. Other example network configuration adjustments include, but are not limited to, activating multipath communication, beam steering, repetition of messages or combination of different communication technologies. Additionally, the network configuration parameters of one wireless communication cell may include or involve parameters of one or more neighbor cells. Another typical association example is the TX power, antenna azimuth and tilt of one cell are associated with each other. Further details on dealing with coverage issues and mitigation options may vary from embodiment to embodiment, and may depend on the particular wireless technology being used. Prior to adjusting network parameters, the infrastructure equipment 61 may request multiple receipt ACKs form multiple objects 64 since there may be multiple reasons for a missed receipt ACK. In some embodiments, multiple objects 64 maybe requested to repeatedly send receipt ACKs. The infrastructure equipment 61 may then alert a separate subsystem (such as the inter-object communication subsystem 312, the remote communication subsystem 314, or the RAN node 256 of FIG. 2) about issues with wireless coverage.

In ITS-based implementations, some or all of the components depicted by FIG. 3 may follow the ITS communication (ITSC) protocol, which is based on the principles of the OSI model for layered communication protocols extended for ITS applications. The ITSC includes, inter alia, For example, an access layer (which corresponds with the OSI layers 1 and 2), a networking & transport (N&T) layer (which corresponds with OSI layers 3 and 4), a facilities layer (which corresponds with OSI layers 5, 6, and at least some functionality of OSI layer 7), and an applications layer (which corresponds with some or all of OSI layer 7). Each of these layers are interconnected via respective interfaces, service access points (SAPs), and/or APIs. In such implementations, some or all of the RTMS 300 may be part of the facilities layer, and aspects of the sensor interface subsystem 310, the inter-object communication subsystem 312, and the remote communication subsystem 314 may be part of the N&T and access layers.

The facilities layer is middleware, software connectors, software glue, etc. comprising multiple facilities. In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the applications layer and exchanges data with lower layers for communicating that data with other ITS-Ss. A list of the common facilities is given by table 2 and a list of the domain facilities is given by table 3.

TABLE 2

Common Facilities

| Classification | Facility name | Description |
| --- | --- | --- |
| Management | Traffic class management | Manage assignment of traffic class value for the higher layer messages |
| | ID management | Manage ITS-S identifiers used by the application and the facilities layer. |
| | Application ID (AID) management | Manage the AID used by the application and the facilities layer. |
| | Security access | Deal with the data exchanged between the application and facilities layer with the security entity. |
| Application Support | HMI support | Support the data exchanges between the applications and Human Machine Interface (HMI) devices. |
| | Time service | Provide time information and time synchronization service within the ITS-S. This may include providing/obtaining the actual time and time stamping of data. |
| | Application/facilities status management | Manage and monitor the functioning of active applications and facilities within the ITS-S and the configuration. |
| | SAM processing | Support the service management of the management layer for the transmission and receiving of the service announcement message (SAM). |
| Information Support | Station type/capabilities | Manage the ITS-S type and capabilities information. |
| | positioning service | Calculate the real time ITS-S position and provides the information to the facilities and applications layers. The ITS-S position may be geographical position (longitude, latitude, altitude) of the ITS-S. |
| | Location referencing | Calculate the location referencing information and provide the location referencing data to the applications/facilities layer. |
| | Common data dictionary | Data dictionary for messages. |
| | Data presentation | Message encoding/decoding support according to formal language being used (e.g., ASN.1); supports the basic functionality of the OSI presentation layer. |
| Communication Support | Addressing mode | Select addressing mode for messages transmission |
| | Congestion control | Facilities layer decentralized congestion control functionalities. |

TABLE 3

Domain Facilities

| Classification | Facility name | Description |
| --- | --- | --- |
| Application Support | DEN basic service | Support the protocol processing of the Decentralized Environmental Notification Message |
| | CA basic service | Support the protocol processing of the Cooperative Awareness Message |
| | EFCD | Aggregation of CAM/DENM data at the road side ITS-S and provide to the central ITS-S |
| | Billing and payment | Provide service access to billing and payment service provider |

TABLE 3-continued

Domain Facilities

| Classification | Facility name | Description |
| --- | --- | --- |
| | SPAT basic service | Support the protocol processing of the Signal Phase and Timing (SPAT) Message |
| | TOPO basic service | Support the protocol processing of the Road Topology (TOPO) Message |
| | IVS basic service | Support the protocol processing of the In Vehicle Signage (IVS) Message |
| | Community service user management | Manage the user information of a service community |
| Information Support | Local dynamic map | Local Dynamic Map database and management of the database |
| | RSU management and communication | Manage the RSUs from the central ITS-S and communication between the central ITS-S and road side ITS. |
| | Map service | Provide map matching functionality |
| Communication Support | Session support | Support session establishment, maintenance and closure |
| | Web service support | High layer protocol for web connection, SOA application protocol support |
| | Messaging support | Manage ITS services messages based on message priority and client services/use case requirements |
| | E2E Geocasting | Deal with the disseminating of information to ITS vehicular and personal ITS stations based on their presence in a specified Geographical area |

In one example ITS implementation, the messaging subsystem 307 and the inter-object communication subsystem 312 may provide the DEN basic service (DEN-BS) and/or the CA basic service (CA-BS) facilities, the mapping DB 320 may provide the LDM facility, and the map processing subsystem 309 may be an ITS application residing in the application layer. In this example, the map processing subsystem 309 may be classified as a road safety application and/or a traffic efficiency application. Furthermore, aspects of the handshake subsystem 306 and/or the object DB 330 may provide the station type/capabilities facility in this example ITS implementation.

For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode DENM entity, a decode DENM entity, a DENM transmission management entity, a DENM reception management entity, and a DENM keep-alive forwarding (KAF) entity. The CAM/DENM transmission management entity implements the protocol operation of the originating ITS-S including activation and termination of CAM/DENM transmission operation, determining CAM/DENM generation frequency, and triggering generation of CAMs/DENMs. The CAM/DENM reception management entity implements the protocol operation of the receiving ITS-S including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity. The encode CAM/DENM entity constructs (encodes) CAMs/DENMs to include various, the object list may include a list of DEs and/or data frames (DFs) included in the ITS data dictionary as defined by ETSI technical specification (TS) 102 894-2 version 1.3.1 (2018 August), titled "Intelligent Transport System (ITS) Users and application requirements; Part 2: Applications and facilities layer common data dictionary."

In embodiments, the encode CAM/DENM entity constructs (encodes) CAMs/DENMs to include various data, such as the object list discussed previously. For example, the CAM/DENM encode entity may generate a CAM/DENM to include a plurality of records, where record of the plurality of records corresponds to an individual object 64 of the objects 64 detected by the sensors 262. Each record at least includes one or more data elements (DEs), and may include one or more data frames (DFs). A DE is a data type that contains one single data (or a datum), and a DF is data type that contains more than one DE in a predefined order. DEs and/or DFs may be used to construct facilities layer or applications layer messages such as CAMs, DENMs, and the like. According to various embodiments, the plurality of DEs includes an ACK DE, a position request DE, and a sensor request DE. In this example, the CAM/DENM encode entity inserts a first value into the sensor request DE of a record for the at least one object 64, where the first value indicates that the at least one object 64 is to report sensor data captured by local sensors of that object 64 (e.g., the first value may be "TRUE" or "1"); inserts a second value into the sensor request DE of records for other detected objects, where the second value indicates that the other detected objects are not to report the second sensor data (e.g., the second value may be "FALSE" or "0"); inserts a third value into the position request DE of records of one or more detected objects that are to report a current position (e.g., the third value may be "TRUE" or "1"); and inserts a fourth value into the position request DE of records of one or more detected object that are not to report the current position (e.g., the fourth value may be "FALSE" or "0"). The decode CAM/DENM entity decodes received CAMs/DENMs. According to various embodiments, the decode CAM/DENM entity included in a roadside ITS-S decodes CAMs/DENMs from the one or more objects 64 to obtain the ACKs, the position data, and/or the sensor data from the one or more objects 64. In these embodiments, the sensor data obtained from the CAMs/DENMs is representative of a physical area corresponding to an occlusion.

As mentioned previously, the station type/capabilities facility may be used for aspects of the object DB 330 and/or the handshake unit 306. The ITS station type/capabilities facility provides information to describe a profile of an ITS-S to be used in the applications and facilities layers. This profile indicates the ITS—S type (e.g., vehicle ITS-S, road side ITS-S, personal ITS-S, or central ITS-S), a role of the ITS-S (e.g., operation status of an emergency vehicle and other prioritized vehicle, status of a dangerous goods transporting vehicle, etc.), and detection capabilities and status (e.g., the ITS-S's positioning capabilities, sensing capabilities, etc.). In this example ITS implementation, the station type/capabilities facility stores, in the object DB 330, the object capabilities included in the ACK messages received from the observed objects 64 and the unique ID assigned to the objects 64 during the handshake procedure.

As mentioned previously, aspects of the sensor interface subsystem 310, the inter-object communication subsystem 312, and the remote communication subsystem 314 may be part of the N&T and access layers. The N&T layer provides functionality of the OSI network layer and the OSI transport layer and includes one or more networking protocols, one or more transport protocols, and network and transport layer management. The networking protocols may include, inter alia, the Internet Protocol version 4 (IPv4), Internet Protocol version 6 (IPv6), the GeoNetworking protocol, IPv6 networking with mobility support, IPv6 over GeoNetworking, the CALM FAST protocol, and/or any other suitable networking protocol. It should be appreciated that the IPv6 networking protocol comprises methods to enable interoperability with legacy IPv4 systems. The transport protocols may include, inter alia, UDP/TCP, one or more dedicated ITSC transport protocols, or some other suitable transport protocol. Each of the networking protocols may be connected to a corresponding transport protocol. The access layer includes a physical layer (PHY) connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY and DLL, and a security adaptation entity (SAE) to provide security services for the access layer. The access layer may also include external communication interfaces (CIs) and internal CIs. The CIs are instantiations of a specific access layer technology and protocol such as ITS-G5, DSRC, WiFi, GPRS, UMTS, 3GPP 5G, Ethernet, Bluetooth, or any other protocol discussed herein. The CIs provide the functionality of one or more logical channels (LCHs), where the mapping of LCHs on to physical channels is specified by the standard of the particular access technology involved.

Referring back to FIG. 3, each of the subsystems of RTMS 300, sensor interface subsystem 310, inter-object communication subsystem 312, and remote communication subsystem 314 may be implemented in hardware, software, or combination thereof. Example hardware implementations may include individual companion silicon or circuitry, including, but not limited to, configurable logic such as, for example, PLAs, FPGAs, CPLDs, programmable SoCs programmed with the operational logic, or fixed-functionality logic hardware using circuit technology such as, for example, ASIC, CMOS, or TTL technology, or any combination thereof. Software implementations may include implementations where the components shown by FIG. 3 are individual autonomous software agents and/or artificial intelligence (AI) agents developed using a suitable programming language, development tools/environments, etc., which are executed by one or more processors or individual hardware accelerators that are configured with appropriate bit stream(s) or logic blocks to perform their respective functions. Software implementations may additionally or alternatively include implementations in instructions of instruction set architectures (ISA) supported by target processors, or any one of a number of high level programming languages that can be compiled into instruction of the ISA of the target processors. In either software or hardware implementations, especially those embodiments where either controller 302 and/or one of the subsystems of the RTMS 300 includes at least one (trained) neural network in performing their respective determinations and/or assessments, at least a portion of main system controller 302 and the subsystems of the RTMS 300 may be implemented in a hardware accelerator (e.g., an FPGA configured with an appropriate bitstream). As examples, the (trained) neural networks may be a multilayer feedforward neural network (FNN), Convolution Neural Network (CNN), Recurrent Neural Network (RNN), and/or some other suitable neural network. An example hardware computing platform of the infrastructure equipment 61 will be further described later with references to FIG. 7.

Figure 4:
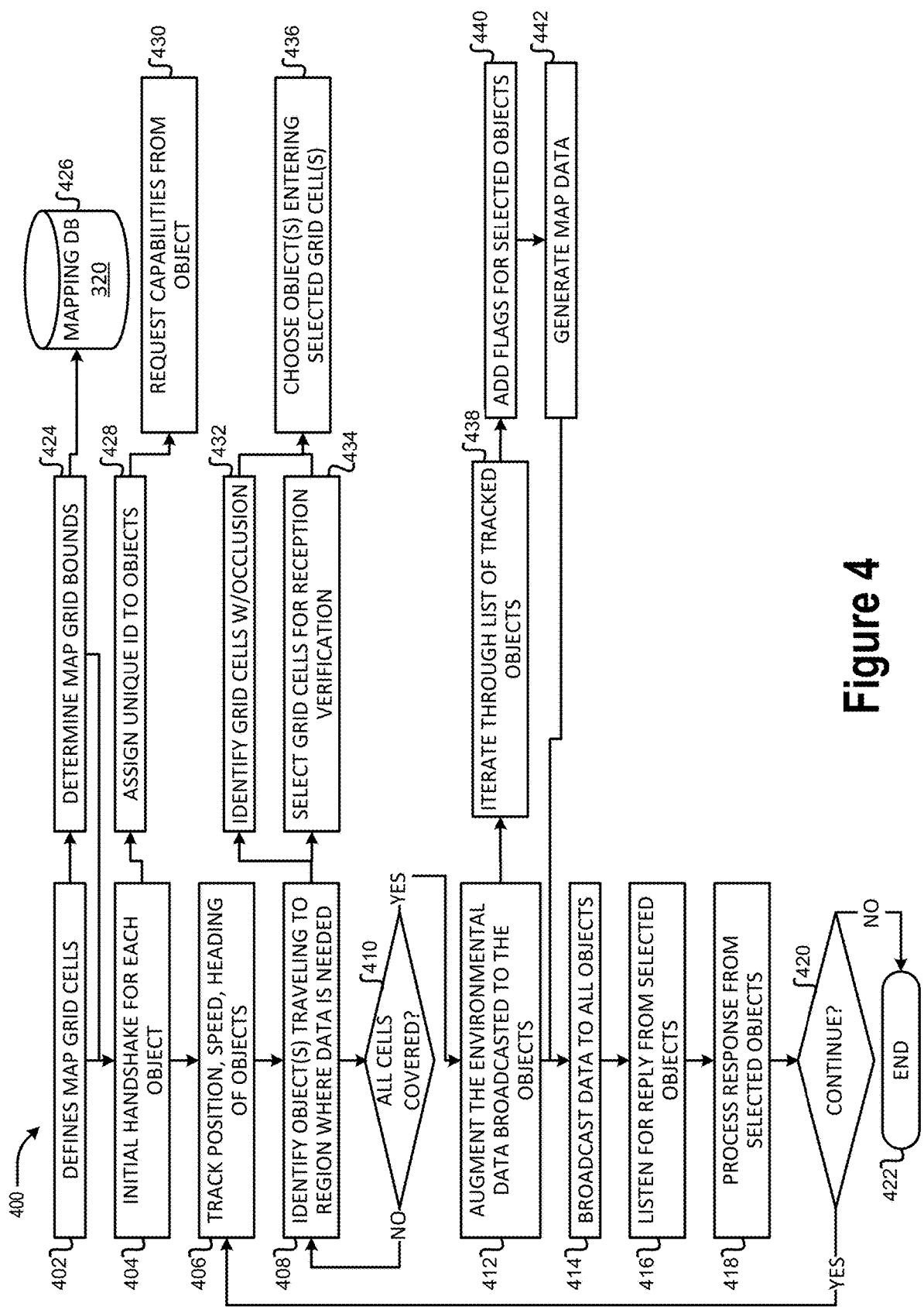
FIGS. 4-6 show example processes for practicing the embodiments discussed herein.
Figure 5:
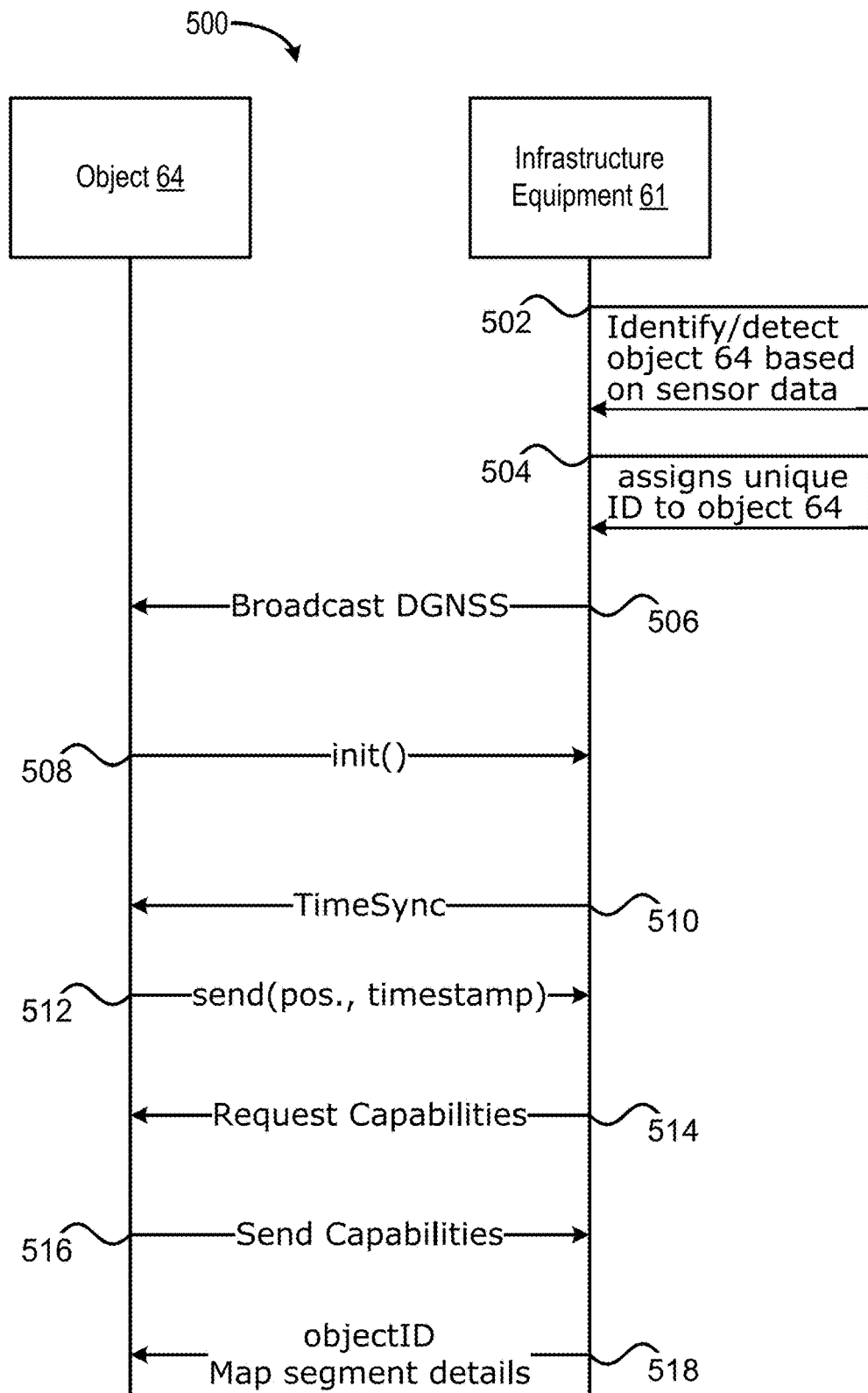
Figure 6:
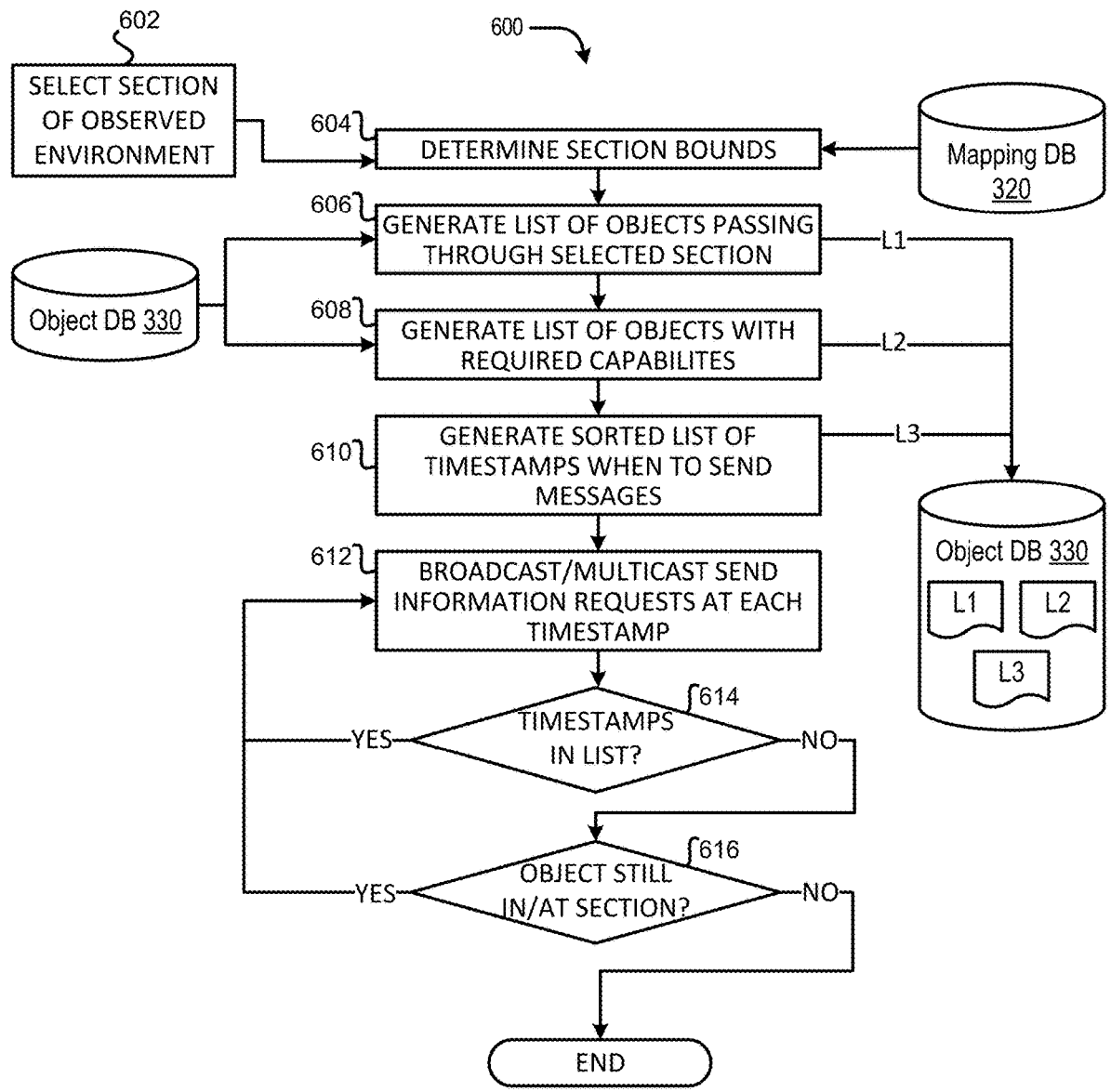

FIGS. 4-6 shows example processes 400-600, respectively, in accordance with various embodiments. For illustrative purposes, the various operations of processes 400-600 is described as being performed by various subsystems of the infrastructure equipment 61 and/or the RTMS 300 of FIG. 3. While particular examples and orders of operations are illustrated FIGS. 4-6, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 4 shows a map generation process 400 according to various embodiments. The map generation process 400 may be used to generate real-time dynamic maps for objects 64 based on sensor data from individual sensors 262 and sensor data from associated with objects 64. Process 400 may be used to fill in perception gaps or otherwise augment the dynamic maps when occlusions are detected. It should be noted that process. Process 400 begins at operation 402 where the infrastructure equipment 61 (or map processing subsystem 309) determines or calculates a grid-based environment model of the coverage area 63 that is overlaid on top of the observed coverage area 63 (e.g., a road). The grid cells may be 2D or 3D. Each grid cell may have the same size and may be defined in terms of absolute GNSS coordinates or using some other coordinate system. In embodiments, operation 402 includes operation 424 where the infrastructure equipment 61 (or map processing subsystem 309) determines map grid boundaries of the environmental model, and operation 426 where the infrastructure equipment 61 (or map processing subsystem 309) stores the defined environmental model and grid boundaries in the mapping DB 320.

At operation 404, the infrastructure equipment 61 (or handshake subsystem 306) performs an initial handshake procedure (e.g., handshake procedure 500 of FIG. 5) with objects 64 as the objects 64 enter the communication and sensor coverage area 63. In embodiments, operation 404 includes operation 428 where the infrastructure equipment 61 (or handshake subsystem 306) assigns a unique ID to the objects 64 and operation 430 where the infrastructure equipment 61 (or handshake subsystem 306) requesting technical capabilities of the moving objects 64. The technical capabilities are obtained, and may be stored in the object DB 330 (not shown by FIG. 4), to determine if and to what extend a particular object 64 can participate in obtaining real-time mapping services and/or can assist in filling in perception gaps.

At operation 406, the infrastructure equipment 61 (or object detector 305) continuously tracks the positions of the detected objects 64 using sensor data obtained from the fixed infrastructure sensors 262. The sensors data is used to determine position, speed, direction (heading), and other properties about the moving objects 64. Properties of objects 64 under observation are made available by the map processing subsystem 309 as a concise and time-synced map 324, which is conveyed (e.g., broadcasted or multicast) back to the tracked objects 64 to aid navigation, CA/AD applications, and/or other applications implemented by the objects 64. For synchronizing objects 64 with respect of the infrastructure equipment 61, the objects 64 may include a means to at least coarsely localize themselves and communicate their respective positions in a protocol of secure initial identification. This may include, for example, GNSS systems or DGNSS positioning systems, LTE location services, or some other electronic components that may determine a location or position of an object 64, such as those discussed herein.

At operation 408, the infrastructure equipment 61 (or the object detector 305) identifies objects 64 traveling toward (or are predicted to travel at or near) a region in the coverage area 63 for which additional data is needed or is predicted to be required in the near future. In embodiments, operation 408 includes operation 432 where the infrastructure equipment 61 (or the object detector 305) identifies grid cells with occlusions and/or operation 434 where the infrastructure equipment 61 (or the object detector 305) selects grid cells for reception verification. In these embodiments, after the grid cells are selected at operation 432 or 434, the infrastructure equipment 61 (or the object detector 305) selects or chooses one or more objects 64 entering t (or predicted to enter) the selected grid cells. At operation 410, the infrastructure equipment 61 (or the object detector 305) determines whether all cells in the environmental model are covered, and if not, the infrastructure equipment 61 (or the object detector 305) loops back to perform operation 408.

If the infrastructure equipment 61 (or the object detector 305) determines that all cells are covered, then the infrastructure equipment 61 (or the map processing subsystem 309) performs operation 412 to augment the environmental (map) data to be broadcasted or multicast to the objects 64. In embodiments, operation 412 includes operation 438 where the infrastructure equipment 61 (or map processing subsystem 309) iterates through a list of tracked objects 64 (e.g., ID records 331 in object DB 330 of FIG. 3) for the unique IDs assigned to the objects 64 identified at operation 408. In embodiments, operation 440 includes operation 438 where the infrastructure equipment 61 (or messaging subsystem 307) adds flags for the selected objects 64. For example, the messaging subsystem 307 may augment the payload data of real-time dynamic mapping messages for identified moving objects 64 with flags or DEs to indicate send information requests to request the selected objects 64 to send a receipt ACK, sensor data captured by on-board sensors, and/or position data associated with the captured sensor data. Receipt ACKs may be requested from several objects 64 to determine or achieve statistical confidence communication (cell) coverage. Sensor data and position data are requested to fill in perception gaps in the overall map 324 generated by the map processing subsystem 309. These flags or DEs may be set in subsequent or updated broadcast/multicast packages or PDUs as long as the infrastructure equipment 61 requires feedback information from the selected objects 64. In this way, the infrastructure equipment 61 (or messaging subsystem 309) is able to switch object 64 responses on and off for specific grid cells. At operation 414, the infrastructure equipment 61 (or messaging subsystem 307) broadcasts the messages including the real-time dynamic map segment data to all tracked objects 64, including the objects 64 selected for the send information requests.

At operation 416, the infrastructure equipment 61 (or the inter-object communication subsystem 312) continuously listens for response messages from the selected objects 64. The response messages can be sent on a separate point-to-point connection using a suitable wireless/V2X communication technology, which can include broadcast or multicast transmissions. In some embodiments, some of the other objects 64 can optionally listen for broadcasted or multicast response messages, compare the data included in these response messages with their own observations, and annotate their own mapping data based on the comparison.

At operation 418, the infrastructure equipment 61 (or the main system controller 202 and/or the map processing subsystem 309) processes the data received from the selected objects 64. When the send information request includes a request for an ACK message, a missing ACK response message may indicate poor wireless coverage (e.g., cell coverage hole) or network overload. When the send information request includes a request for additional sensor data, the map processing subsystem 309 uses the sensor data included in the response message to check for consistency, and fuses the received sensor data with the sensor data from infrastructure sensors 262. In some embodiments, trust mechanisms may be used to determine the trustworthiness or otherwise verify the received sensor data. For example, "sanity checks" can be performed by comparing the sensor data captured by several objects 64 at or near the cells selected at operation 434 and sensor data captured by the sensors 262 of those same cells. In another example, out of band authentication and safety measures, such as safety islands or TXE or TPM elements inside the objects 64, may also be used.

FIG. 5 shows a handshake procedure 500 for according to various embodiments. In some embodiments, the handshake procedure 500 may correspond to operations 404, 428, and 430 of process 400 shown by FIG. 4. Object annotation is facilitated by the handshake procedure 500 between object 64 and infrastructure equipment 61, where some or all objects 64 entering a coverage area 63 of the infrastructure equipment 61 receive a system wide (unique) ID and inform the infrastructure equipment 61 about their object capabilities related to wireless communication, self-localization, and environment sensing capabilities. For example, an initial handshake procedure 500 between an object 64 and the infrastructure equipment 61 may happen when the object 64 is passing by sensors 262 for the first time (e.g., when entering through an intersection or onto a roadway 63). The handshake procedure 500 can also be repeated later if on object 64 is occluded temporarily and is later detected again by the sensors 262 of the infrastructure equipment 61.

Process 500 begins at operation 502 where the infrastructure equipment 61 (or the object detector 305) identifies or detects the object 64 as new to the infrastructure equipment 61. At operation 504, the infrastructure equipment 61 (or the handshake subsystem 306) generates a unique ID for the object 64. For example, the unique ID may be reused once the object 64 leaves the coverage area 63. The unique ID may only need to be unique in the scope of the infrastructure equipment 61 or a portion of the infrastructure equipment 61. In some embodiments, the infrastructure equipment 61 may optionally provide a service to improve the positioning information of the object 64 (e.g., utilizing differential global navigation satellite system (DGNSS)) at operation 506. At operation 508, the object 64 performs an initiation procedure ("init( )") with the infrastructure equipment 61 wherein the object 64 establishes a connection with the infrastructure equipment 61 using a suitable V2X communication technology 250 and announces its intention to use maps data by sending a request package. At operation 510, the infrastructure equipment 61 (or the handshake subsystem 306) provides a time synchronization ("TimeSync") message to the object 64, where the infrastructure equipment 61 may be the time authority. This allows the object 64 to synchronize its local time to that of the infrastructure equipment 61. At operation 512, the object 64 submits its current position and timestamp back to the infrastructure equipment 61 (or the handshake subsystem 306).

At operation 514, the infrastructure equipment 61 (or the handshake subsystem 306) sends a request for technical capabilities of the tracked object 64, and at operation 516, the object 64 sends a message including or indicating its technical capabilities. The definition of technical capabilities may include a list of message types and details of message content for each type sent back by the object 64. This allows the infrastructure equipment 64 to send information requests to the object 64 by using simple triggers, for example single bit flags. The infrastructure stores the relations between the unique ID assigned to the object 64 and message types as long as the object 64 stays in communication range of the infrastructure equipment 61. To complete the handshake procedure 500, at operation 518, the infrastructure equipment 61 (or the handshake subsystem 306) sends back the unique ID assigned to the object 64. Following the handshake procedure 500, stationary sensors 262 are used to track the object 64 and update its position constantly while travelling within the coverage area 63.

In some embodiments, the handshake procedure 500 may be repeated periodically or after a certain number of infrastructure nodes are passed to calibrate the tracking capabilities by the infrastructure sensors and/or the object detector 305. In some embodiments, privacy concerns may be addressed by randomly changing the unique IDs during each handshake. Following the handshake procedure 500, the combination of location information from the object 64 and the consecutive object tracking using sensor data from the sensors 262 may be used to update the environmental map 324. When an occlusion is detected, the environmental map 324 may be updated with sensor data provided by the object 64. Some embodiments may provide consecutive transmission of map data 324 occurring as one-way communication or broadcast from the infrastructure equipment 61 to the objects 64, advantageously reducing or minimizing latency in the wireless information exchange. For example, some embodiments may assign unique IDs by utilizing universally unique identifier (UUID) techniques, such as suitable random number generators, hash functions, and/or the like. For example, some embodiments may manage unique IDs with object tracking techniques such as those discussed previously. Some object tracking techniques may use IDs to track detected object in video or similar sensor data. Some embodiments may include a table or buffer as a storage that may be used to map the inherent IDs from the tracking technique to the unique IDs used in the map broadcast.

FIG. 6 shows an object selection process 600 for selecting objects 64 for sending send information requests, in accordance with various embodiments. In embodiments, the object selection process 600 is used to identify subsections of the coverage area 63 for which additional information is required. The object selection process 600 is also used to select individual objects 64 from a list of objects 64 being tracked. The process 600 allows the infrastructure equipment 61 to improve the environmental perception by filling in or supplementing perception gaps, for example, by augmenting dynamic maps with sensor readings from the tracked objects 64. Additionally, the process 600 allows the infrastructure equipment 61 to verify the reception of messages sent to the objects when using broadcast or multicast protocols.

Referring to FIG. 6, process 600 starts at operation 602, where the infrastructure equipment 61 (or a subsystem of infrastructure equipment 61 and/or RTMS 300) selects a section or region (e.g., grid cells) of the observed environment for which additional information is needed. The selection of the sections or regions may be different depending on the reason why additional information is needed, for example, whether the selection is for filling in perception gaps or for receiving acknowledgement messages. For filling in perception gaps, the map processing subsystem 309 detects occlusions of the fixed sensors 262 or other reasons that reduce the completeness of environmental map 324, and selects the sections or regions (e.g., grid cells) that correspond to the occluded area at operation 602. For verifying the reception of broadcasted/multicast messages (e.g., receiving ACKs), the main system controller 302, object detector 305, or some other subsystem of the RTMS 300 selects test sections or regions (e.g., grid cells) at random, using a round robin scheduling mechanism, based on a user/operator selection, or based on the observed or simulated network traffic. In some embodiments, a network management (NM) entity may instruct the infrastructure equipment 61 to perform the verification for self-optimizing/organizing network (SON) functions.

At operation 604, the map processing subsystem 309, the main system controller 302, the object detector 305, or some other subsystem of the RTMS 300 determines the sub-sections or regions of the coverage area 63 for which the additional information is required. In embodiments, the subsystem may determine the bounds of the sub-sections or regions (e.g., X, Y, and/or Z coordinates) based on the overall map 324 and/or map segments 325 stored in the mapping DB 320.

At operation 606, the object detector 305 creates or generates a list of objects 64 passing though (or are predicted to travel at or near) the selected sections ("L1" in FIG. 6), which may be based on ID records 331 obtained from the object DB 330. This list L1 may be stored in a suitable data structure in the object DB 330. At operation 608, the object detector 305 creates or generates a list of objects 64 from L1 that have the necessary capabilities to provide the required information ("L2" in FIG. 6), which may be based on capabilities records 332 obtained from the object DB 330. This list L2 may be stored in a suitable data structure in the object DB 330. At operation 610, the object detector 305 creates or generates a sorted list of timestamps and object IDs when a send information request should be sent to each object 64 in the list L2 ("L3" in FIG. 6), which may be based on stored object data records 333 obtained from the object DB 330, which may indicate determined velocity/speed, position, direction, size, of the objects 64. This list L3 may be stored in a suitable data structure in the object DB 330. The list of timestamps L3 may also be based on a speed, position, direction/heading of each object 64 in L2 as detected by the object detector 305 using sensor data from sensors 262, and/or a determined or known communication delay.

At operation 612, the inter-object communication subsystem 312 starts broadcasting/multicasting the send information requests at each determined timestamp in list L3. This includes, at operation 614, the inter-object communication subsystem 312 determining if there are still timestamps in the list L3, and the inter-object communication subsystem 312 looping back to perform operation 612 if there are still timestamps in the list L3. If at operation 616 the inter-object communication subsystem 312 determines that there are no more timestamps in the list L3, then the inter-object communication subsystem 312 proceeds to operation 616, which involves the inter-object communication subsystem 312 repeatedly broadcasting/multicasting the send information requests as long as each object 64 in L2 is at or near the selected section or region. This includes, at operation 616, the inter-object communication subsystem 312 determining if any of the objects 64 in list L2 being located at or in the selected sections or regions, and the inter-object communication subsystem 312 looping back to perform operation 612 if any of the objects 64 in list L2 are still located at or in the selected sections or regions. If at operation 616 the inter-object communication subsystem 312 determines that none of the objects 64 in list L2 are located at or in the selected sections or regions, then process 600 ends or may repeat as necessary.

II. EXAMPLE IMPLEMENTATIONS

Figure 7:
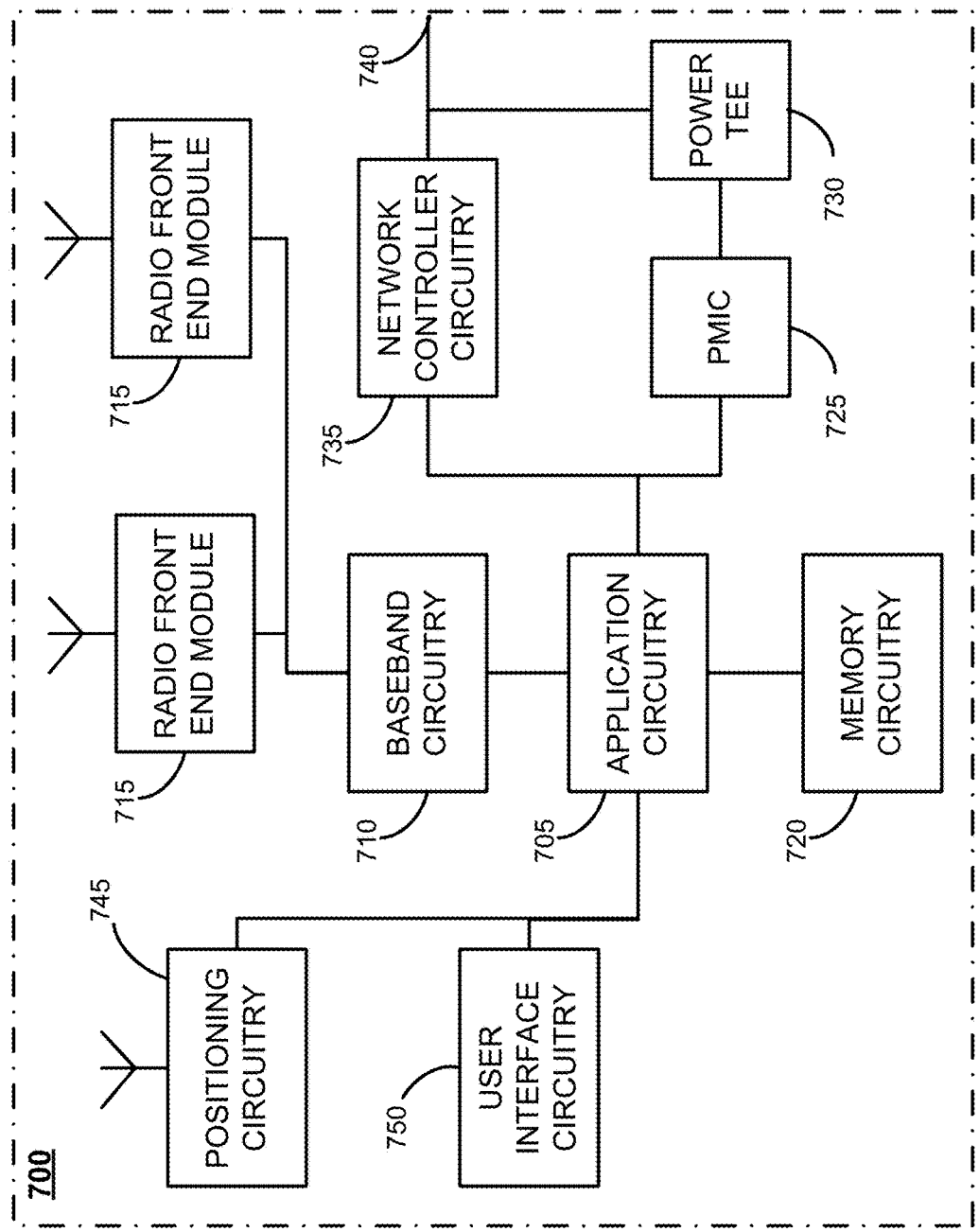
FIG. 7 illustrates an example implementation of infrastructure equipment in accordance with various embodiments.

FIG. 7 illustrates an example of infrastructure equipment 700 in accordance with various embodiments. The infrastructure equipment 700 (or "system 700") may be implemented as the infrastructure equipment 61 discussed with regard to FIGS. 1-6, a base station, radio head, RAN node such as the RAN node 256 of FIG. 2, server(s) 260, and/or any other element/device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, positioning circuitry 745, and user interface 750. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (110 or 10), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or 5GC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the RTMS 300 of FIG. 3 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 705 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 710 may be implemented, for example, as a solder-down substrate including one or more integrated circuits, a single packaged integrated circuit soldered to a main circuit board or a multi-chip module containing two or more integrated circuits. The baseband circuitry 710 includes one or more processing devices (e.g., baseband processors) to carry out various protocol and radio control functions. Baseband circuitry 710 may interface with application circuitry of system 700 for generation and processing of baseband signals and for controlling operations of the RFEMs 715. The baseband circuitry 710 may handle various radio control functions that enable communication with one or more radio networks via the RFEMs 715. The baseband circuitry 710 may include circuitry such as, but not limited to, one or more single-core or multi-core processors (e.g., one or more baseband processors) or control logic to process baseband signals received from a receive signal path of the RFEMs 715, and to generate baseband signals to be provided to the RFEMs 715 via a transmit signal path. In various embodiments, the baseband circuitry 710 may implement a real-time OS (RTOS) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 7, in one embodiment, the baseband circuitry 710 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate Long Term Evolution (LTE) protocol entities and/or Fifth Generation (5G)/New Radio (NR) protocol entities when the RFEMs 715 are cellular radiofrequency communication system, such as millimeter wave (mmWave) communication circuitry or some other suitable cellular communication circuitry. In the first example, the protocol processing circuitry would operate medium access control (MAC), radio link control (RLC), packet data convergence protocol (PDCP), service data adaptation protocol (SDAP), radio resource control (RRC), and non-access stratum (NAS) functions. In a second example, the protocol processing circuitry may operate one or more IEEE-based protocols when the RFEMs 715 are WiFi communication system. In the second example, the protocol processing circuitry would operate WiFi MAC and logical link control (LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 710 and/or RFEMs 715. The baseband circuitry 710 may also support radio communications for more than one wireless protocol.

Continuing with the aforementioned embodiment, the baseband circuitry 710 includes individual processing device(s) to implement PHY including hybrid automatic repeat request (HARD) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 715, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry XT106 and/or FEM circuitry XT108 using metal transmission lines or the like.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards. The memory circuitry 720 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 700, an operating system of infrastructure equipment 700, one or more applications, and/or for carrying out the embodiments discussed herein (such as one or more operations of depicted by FIGS. 4-6 and/or discussed with regard to FIG. 3). The computational logic may be stored or loaded into memory circuitry 720 as instructions for execution by the processors of the application circuitry 705 to provide or perform the functions described herein. The various elements may be implemented by assembler instructions supported by processors of the application circuitry 705 or high-level languages that may be compiled into such instructions. The permanent copy of the programming instructions may be placed into persistent storage devices of memory circuitry 720 in the factory during manufacture, or in the field through, for example, a distribution medium (not shown), through a communication interface (e.g., from a distribution server), and/or over-the-air (OTA).

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols. In various embodiments, the network controller circuitry 735 enables communication with associated equipment (e.g., individual sensors 262 and/or actuators 322 in sensor array(s) 62 as shown by FIGS. 1-3) and/or with a backend system (e.g., server(s) 260 of FIG. 2), which may take place via a suitable gateway device.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various other infrastructure equipment, or the like.

The components shown by FIG. 7 may communicate with one another using interface circuitry, which may include any number of bus and/or interconnect (IX) technologies such as industry standard architecture (ISA), extended ISA (EISA), inter-integrated circuit ($I^2C$), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

Figure 8:
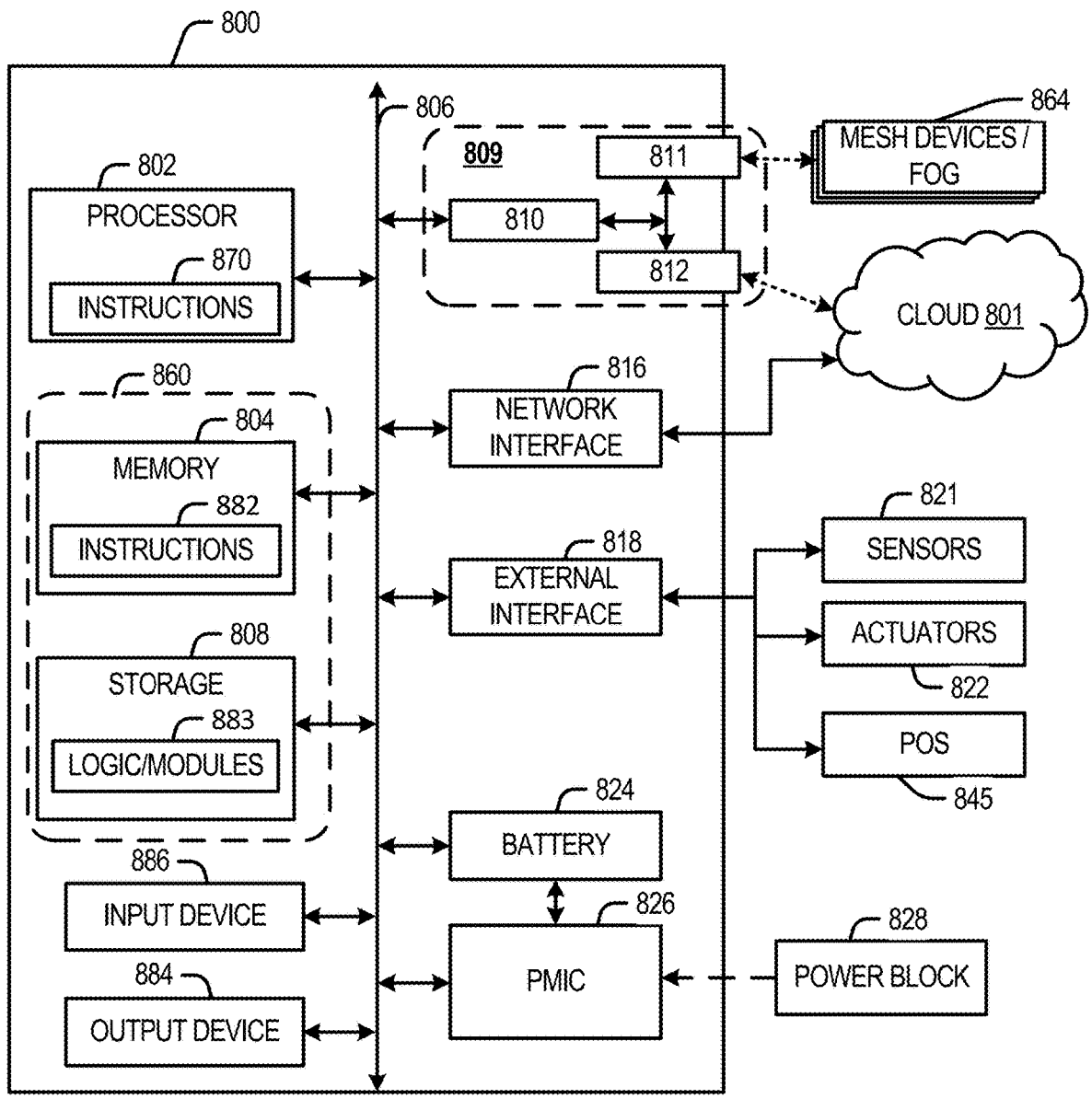
FIG. 8 illustrates an example implementation of a computing architecture, in accordance with various embodiments.

FIG. 8 illustrates an example of an platform 800 (also referred to as "system 800," "device 800," "appliance 800," or the like) in accordance with various embodiments. The platform 800 may be suitable for use as any of the computer devices discussed herein, such as the vUE system 201, communication technology 250, and other objects 64. Platform 800 may also be implemented in or as a server computer system or some other element, device, or system discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The example of FIG. 8 is intended to show a high level view of components of the computer platform 800. However, some of the components shown may be omitted, additional components may be present, and different arrangement of the components shown may occur in other implementations.

The platform 800 includes processor circuitry 802. The processor circuitry 802 includes circuitry such as, but not limited to one or more processor cores and one or more of cache memory, low drop-out voltage regulators (LDOs), interrupt controllers, serial interfaces such as serial peripheral interface (SPI), inter-integrated circuit (I$^2$C) or universal programmable serial interface circuit, real time clock (RTC), timer-counters including interval and watchdog timers, general purpose input-output (I/O), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 802 may include one or more hardware accelerators, which may be microprocessors, programmable processing devices (e.g., FPGA, ASIC, etc.), or the like. The one or more hardware accelerators may include, for example, computer vision (CV) and/or deep learning (DL) accelerators. In some implementations, the processor circuitry 802 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 802 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 802 may be coupled with or may include memory/storage and may be configured to execute instructions stored in the memory/storage to enable various applications or operating systems to run on the platform 800. In these embodiments, the processors (or cores) of the processor circuitry 802 is configured to operate application software to provide a specific service to a user of the platform 800. In some embodiments, the processor circuitry 802 may be a special-purpose processor/controller to operate according to the various embodiments herein.

As examples, the processor circuitry 802 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, Calif. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 802 may be a part of a system on a chip (SoC), System-in-Package (SiP), a multi-chip package (MCP), and/or the like, in which the processor circuitry 802 and other components are formed into a single integrated circuit, or a single package, such as the Edison™ or Galileo™ SoC boards from Intel® Corporation. Other examples of the processor circuitry 802 are mentioned elsewhere in the present disclosure.

Additionally or alternatively, processor circuitry 802 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 802 may comprise logic blocks or logic fabric including and other interconnected resources that may be programmed to perform various functions, such as the procedures, methods, functions, etc. of the various embodiments discussed herein. In such embodiments, the circuitry of processor circuitry 802 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 802 may communicate with system memory circuitry 804 over an interconnect 806 (e.g., a bus). Any number of memory devices may be used to provide for a given amount of system memory. As examples, the memory circuitry 804 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 804 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 804 may also comprise persistent storage devices, which may be temporal and/or persistent storage of any type, including, but not limited to, non-volatile memory, optical, magnetic, and/or solid state mass storage, and so forth.

The individual memory devices of memory circuitry 804 may be implemented as one or more of solder down packaged integrated circuits, socketed memory modules, and plug-in memory cards. The memory circuitry 804 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 804. In embodiments, the memory circuitry 804 may be disposed in or on a same die or package as the processor circuitry 802 (e.g., a same SoC, a same SiP, or soldered on a same MCP as the processor circuitry 802).

To provide for persistent storage of information such as data, applications, operating systems (OS), and so forth, a storage circuitry 808 may also couple to the processor circuitry 802 via the interconnect 806. In an example, the storage circuitry 808 may be implemented via a solid-state disk drive (SSDD). Other devices that may be used for the storage circuitry 808 include flash memory cards, such as SD cards, microSD cards, xD picture cards, and the like, and USB flash drives. In low power implementations, the storage circuitry 808 may be on-die memory or registers associated with the processor circuitry 802. However, in some examples, the storage circuitry 808 may be implemented using a micro hard disk drive (HDD). Further, any number of new technologies may be used for the storage circuitry 808 in addition to, or instead of, the technologies described, such resistance change memories, phase change memories, holographic memories, or chemical memories, among others.

The storage circuitry 808 store computational logic 883 (or "modules 883") in the form of software, firmware, or hardware commands to implement the techniques described herein. The computational logic 883 may be employed to store working copies and/or permanent copies of programming instructions for the operation of various components of platform 800 (e.g., drivers, etc.), an operating system of platform 800, one or more applications, and/or for carrying out the embodiments discussed herein. The computational logic 883 may be stored or loaded into memory circuitry 804 as instructions 882 for execution by the processor circuitry 802 to provide the functions described herein. The various elements may be implemented by assembler instructions supported by processor circuitry 802 or high-level languages that may be compiled into such instructions (e.g., instructions 870). The permanent copy of the programming instructions may be placed into persistent storage devices of storage circuitry 808 in the factory or in the field through, for example, a distribution medium (not shown), through a communication interface (e.g., from a distribution server (not shown)), or over-the-air (OTA).

Although the instructions 882 are shown as code blocks included in the memory circuitry 804 and the computational logic 883 is shown as code blocks in the storage circuitry 808, it should be understood that any of the code blocks may be replaced with hardwired circuits, for example, built into an FPGA, ASIC, or some other suitable circuitry. For example, where processor circuitry 802 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 804 and/or storage circuitry 808 may store program code of an operating system (OS), which may be a general purpose OS or an OS specifically written for and tailored to the computing platform 800. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 800, attached to the platform 800, or otherwise communicatively coupled with the platform 800. The drivers may include individual drivers allowing other components of the platform 800 to interact or control various input/output (I/O) devices that may be present within, or connected to, the platform 800. For example, the drivers may include a display driver to control and allow access to a display device, a touchscreen driver to control and allow access to a touchscreen interface of the platform 800, sensor drivers to obtain sensor readings of sensor circuitry 821 and control and allow access to sensor circuitry 821, actuator drivers to obtain actuator positions of the actuators 822 and/or control and allow access to the actuators 822, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment (SEE), trusted execution environment (TEE), and/or management engine of the platform 800 (not shown).

In an example, the instructions 882 provided via the memory circuitry 804 and/or the storage circuitry 808 are embodied as a non-transitory, machine-readable medium 860 including code to direct the processor circuitry 802 to perform electronic operations in the platform 800. The processor circuitry 802 accesses the non-transitory machine-readable medium 860 over the interconnect 806. For instance, the non-transitory, machine-readable medium 860 may be embodied by devices described for the storage circuitry 808 of FIG. 8 or may include specific storage units such as optical disks, flash drives, or any number of other hardware devices. The non-transitory, machine-readable medium 860 may include instructions 882 to direct the processor circuitry 802 to perform a specific sequence or flow of actions, for example, as described with respect to the flowchart(s) and block diagram(s) of operations and functionality depicted previously (see e.g., FIGS. 4-8). In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., EPROM, EEPROM) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). In alternate embodiments, the programming instructions may be disposed on multiple computer-readable non-transitory storage media instead. In still other embodiments, the programming instructions may be disposed on computer-readable transitory storage media, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device. The computer-readable medium may include a propagated data signal with the computer-readable program code embodied therewith, either in baseband or as part of a carrier wave. The computer usable program code may be transmitted using any appropriate medium, including but not limited to wireless, wireline, optical fiber cable, RF, etc.

The computer program code for carrying out operations of the present disclosure (e.g., computational logic 883, instructions 882, 870, etc.) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP-.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools as discussed herein. The computer program code for carrying out operations of the present disclosure may also be written in any combination of the programming languages discussed herein. The program code may execute entirely on the user's wearable device, partly on the user's wearable device, as a stand-alone software package, partly on the user's wearable device and partly on a remote computer or entirely on the remote computer or server. In the latter scenario, the remote computer may be connected to the user's wearable device through any type of network, including a local area network (LAN) or a wide area network (WAN), or the connection may be made to an external computer (for example, through the Internet using an Internet Service Provider).

The components may communicate over the interconnect 806. The interconnect 806 may include any number of technologies, including industry standard architecture (ISA), extended ISA (EISA), peripheral component interconnect (PCI), peripheral component interconnect extended (PCIx), PCI express (PCIe), or any number of other technologies. The interconnect 806 may be a proprietary bus, for example, used in a SoC based system. Other bus systems may be included, such as an I²C interface, an SPI interface, point-to-point interfaces, and a power bus, among others.

The interconnect 806 couples the processor circuitry 802 to the communication circuitry 809 for communications with other devices. The communication circuitry 809 is a hardware element, or collection of hardware elements, used to communicate over one or more networks (e.g., cloud 801) and/or with other devices (e.g., mesh devices/fog 864). The communication circuitry 809 includes baseband circuitry 810 (or "modem 810") and radiofrequency (RF) circuitry 811 and 812.

The baseband circuitry 810 includes one or more processing devices (e.g., baseband processors) to carry out various protocol and radio control functions. Baseband circuitry 810 may interface with application circuitry of platform 800 (e.g., a combination of processor circuitry 802 and CRM 860) for generation and processing of baseband signals and for controlling operations of the RF circuitry 811 or 812. The baseband circuitry 810 may handle various radio control functions that enable communication with one or more radio networks via the RF circuitry 811 or 812. The baseband circuitry 810 may include circuitry such as, but not limited to, one or more single-core or multi-core processors (e.g., one or more baseband processors) or control logic to process baseband signals received from a receive signal path of the RF circuitry 811 and/or 812, and to generate baseband signals to be provided to the RF circuitry 811 or 812 via a transmit signal path. In various embodiments, the baseband circuitry 810 may implement a real-time OS (RTOS) to manage resources of the baseband circuitry 810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 8, in one embodiment, the baseband circuitry 810 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate Long Term Evolution (LTE) protocol entities and/or Fifth Generation (5G)/New Radio (NR) protocol entities when the communication circuitry 809 is a cellular radiofrequency communication system, such as millimeter wave (mmWave) communication circuitry or some other suitable cellular communication circuitry. In the first example, the protocol processing circuitry 805 would operate medium access control (MAC), radio link control (RLC), packet data convergence protocol (PDCP), service data adaptation protocol (SDAP), radio resource control (RRC), and non-access stratum (NAS) functions. In a second example, the protocol processing circuitry may operate one or more IEEE-based protocols when the communication circuitry 809 is WiFi communication system. In the second example, the protocol processing circuitry would operate WiFi MAC and logical link control (LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 810 and/or RF circuitry 811 and 812. The baseband circuitry 810 may also support radio communications for more than one wireless protocol.

Continuing with the aforementioned embodiment, the baseband circuitry 810 includes individual processing device(s) to implement PHY including hybrid automatic repeat request (HARD) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 809 also includes RF circuitry 811 and 812 to enable communication with wireless networks using modulated electromagnetic radiation through a non-solid medium. Each of the RF circuitry 811 and 812 include a receive signal path, which may include circuitry to convert analog RF signals (e.g., an existing or received modulated waveform) into digital baseband signals to be provided to the baseband circuitry 810. Each of the RF circuitry 811 and 812 also include a transmit signal path, which may include circuitry configured to convert digital baseband signals provided by the baseband circuitry 810 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 811 or 812 using metal transmission lines or the like.

The RF circuitry 811 (also referred to as a "mesh transceiver") is used for communications with other mesh or fog devices 864. The mesh transceiver 811 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 811, configured for a particular wireless communication protocol, may be used for the connections to the mesh devices 864. For example, a WLAN unit may be used to implement Wi-Fi™ communications in accordance with the IEEE 802.11 standard. In addition, wireless wide area communications, for example, according to a cellular or other wireless wide area protocol, may occur via a WWAN unit.

The mesh transceiver 811 may communicate using multiple standards or radios for communications at different ranges. For example, the platform 800 may communicate with close/proximate devices, e.g., within about 10 meters, using a local transceiver based on BLE, or another low power radio, to save power. More distant mesh devices 864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 812 (also referred to as a "wireless network transceiver," a "cloud transceiver," or the like) may be included to communicate with devices or services in the cloud 801 via local or wide area network protocols. The wireless network transceiver 812 includes one or more radios to communicate with devices in the cloud 801. The cloud 801 may be the same or similar to cloud 302 discussed previously. The wireless network transceiver 812 may be a LPWA transceiver that follows the IEEE 802.15.4, or IEEE 802.15.4g standards, among others, such as those discussed herein. The platform 800 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 811 and wireless network transceiver 812, as described herein. For example, the radio transceivers 811 and 812 may include an LTE or other cellular transceiver that uses spread spectrum (SPA/SAS) communications for implementing high-speed communications. Further, any number of other protocols may be used, such as Wi-Fi® networks for medium speed communications and provision of network communications.

The transceivers 811 and 812 may include radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LP-WAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) V2X communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the transceivers 811, 812 including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

Network interface circuitry/controller (NIC) 816 may be included to provide wired communication to the cloud 801 or to other devices, such as the mesh devices 864 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 800 via NIC 816 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 816 may include one or more dedicated processors and/or FPGAs to communicate using one or more of the aforementioned network interface protocols. In some implementations, the NIC 816 may include multiple controllers to provide connectivity to other networks using the same or different protocols. For example, the platform 800 may include a first NIC 816 providing communications to the cloud over Ethernet and a second NIC 816 providing communications to other devices over another type of network.

The interconnect 806 may couple the processor circuitry 802 to an external interface 818 (also referred to as "I/O interface circuitry" or the like) that is used to connect external devices or subsystems. The external devices include, inter alia, sensor circuitry 821, actuators 822, and positioning circuitry 845. The sensor circuitry 821 may include devices, modules, or subsystems whose purpose is to detect events or changes in its environment and send the information (sensor data) about the detected events to some other a device, module, subsystem, etc. Examples of such sensors 621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 818 connects the platform 800 to actuators 822, allow platform 800 to change its state, position, and/or orientation, or move or control a mechanism or system. The actuators 822 comprise electrical and/or mechanical devices for moving or controlling a mechanism or system, and converts energy (e.g., electric current or moving air and/or liquid) into some kind of motion. The actuators 822 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 822 may include one or more electro-mechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 800 may be configured to operate one or more actuators 822 based on one or more captured events and/or instructions or control signals received from a service provider and/or various client systems. In some embodiments, the sensor circuitry 821 and actuators 822 correspond to the sensors 262 and actuator 322 of FIG. 3, and/or correspond to the sensors, etc., discussed with regard to FIGS. 9-12.

The positioning circuitry 845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-Technology for Positioning, Navigation, and Timing (Micro-PNT) IC that uses a master timing clock to perform position tracking/estimation without GNSS assistance. The positioning circuitry 845 may also be part of, or interact with, the communication circuitry 809 to communicate with the nodes and components of the positioning network. The positioning circuitry 845 may also provide position data and/or time data to the application circuitry, which may use the data to synchronize operations with various infrastructure (e.g., radio base stations), for turn-by-turn navigation, or the like.

In some examples, various input/output (I/O) devices may be present within, or connected to, the platform 800, which are referred to as input device circuitry 886 and output device circuitry 884 in FIG. 8. The input device circuitry 886 and output device circuitry 884 include one or more user interfaces designed to enable user interaction with the platform 800 and/or peripheral component interfaces designed to enable peripheral component interaction with the platform 800. Input device circuitry 886 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 884 may be included to show information or otherwise convey information, such as sensor readings, actuator position(s), or other like information. Data and/or graphics may be displayed on one or more user interface components of the output device circuitry 884. Output device circuitry 884 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry 884 may also include speakers or other audio emitting devices, printer(s), and/or the like. In some embodiments, the sensor circuitry 821 may be used as the input device circuitry 886 (e.g., an image capture device, motion capture device, or the like) and one or more actuators 822 may be used as the output device circuitry 884 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 824 may be coupled to the platform 800 to power the platform 800, which may be used in embodiments where the platform 800 is not in a fixed location. The battery 824 may be a lithium ion battery, a lead-acid automotive battery, or a metal-air battery, such as a zinc-air battery, an aluminum-air battery, a lithium-air battery, a lithium polymer battery, and/or the like. In embodiments where the platform 800 is mounted in a fixed location, the platform 800 may have a power supply coupled to an electrical grid. In these embodiments, the platform 800 may include power tee circuitry to provide for electrical power drawn from a network cable to provide both power supply and data connectivity to the platform 800 using a single cable.

Power management integrated circuitry (PMIC) 826 may be included in the platform 800 to track the state of charge (SoCh) of the battery 824, and to control charging of the platform 800. The PMIC 826 may be used to monitor other parameters of the battery 824 to provide failure predictions, such as the state of health (SoH) and the state of function (SoF) of the battery 824. The PMIC 826 may include voltage regulators, surge protectors, power alarm detection circuitry. The power alarm detection circuitry may detect one or more of brown out (under-voltage) and surge (over-voltage) conditions. The PMIC 826 may communicate the information on the battery 824 to the processor circuitry 802 over the interconnect 806. The PMIC 826 may also include an analog-to-digital (ADC) convertor that allows the processor circuitry 802 to directly monitor the voltage of the battery 824 or the current flow from the battery 824. The battery parameters may be used to determine actions that the platform 800 may perform, such as transmission frequency, mesh network operation, sensing frequency, and the like. As an example, the PMIC 826 may be a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

A power block 828, or other power supply coupled to a grid, may be coupled with the PMIC 826 to charge the battery 824. In some examples, the power block 828 may be replaced with a wireless power receiver to obtain the power wirelessly, for example, through a loop antenna in the platform 800. A wireless battery charging circuit, such as an LTC4020 chip from Linear Technologies of Milpitas, Calif., among others, may be included in the PMIC 826. The specific charging circuits chosen depend on the size of the battery 824, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Furthermore, the embodiments discussed herein may take the form of a computer program product or data to create the computer program, with the computer program or data embodied in any tangible or non-transitory medium of expression having the computer-usable program code (or data to create the computer program) embodied in the medium. In one embodiment, a non-transitory computer-readable storage media (NTCRSM) suitable for use to store instructions (or data that creates the instructions), wherein execution of the instructions cause an apparatus (such as any of the devices/components/systems described with regard to FIGS. 1-8), in response to execution of the instructions by the apparatus, to practice selected aspects of the present disclosure. The NTCRSM may include a number of programming instructions (or data to create the programming instructions). The programming instructions are configured to enable a device (e.g., any of the devices/components/systems described with regard to FIGS. 1-8), in response to execution of the programming instructions, to perform various programming operations associated with operating system functions, one or more applications, and/or aspects of the present disclosure (including various programming operations associated with FIGS. 4-6).

In alternate embodiments, the programming instructions (or data to create the instructions) are disposed on multiple NTCRSM. In alternate embodiments, the programming instructions (or data to create the instructions) are disposed on (or encoded in) computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM may be embodied by devices described for the storage circuitry 808 and/or memory circuitry 804 described with regard to FIG. 8. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code (such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 883, instructions 882, 870 discussed previously with regard to FIG. 8) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 700 or 800, partly on the system 700 or 800, as a stand-alone software package, partly on the system 700 or 800 and partly on a remote computer or entirely on the remote computer (e.g., a different one of system 700 or 800). In the latter scenario, the remote computer may be connected to the system 700 or 800 through any type of network, including a local area network (LAN) or a wide area network (WAN), or the connection may be made to an external computer (for example, through the Internet using an Internet Service Provider).

III. EXAMPLE SYSTEM OVERVIEW

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 9-12.

Figure 9:
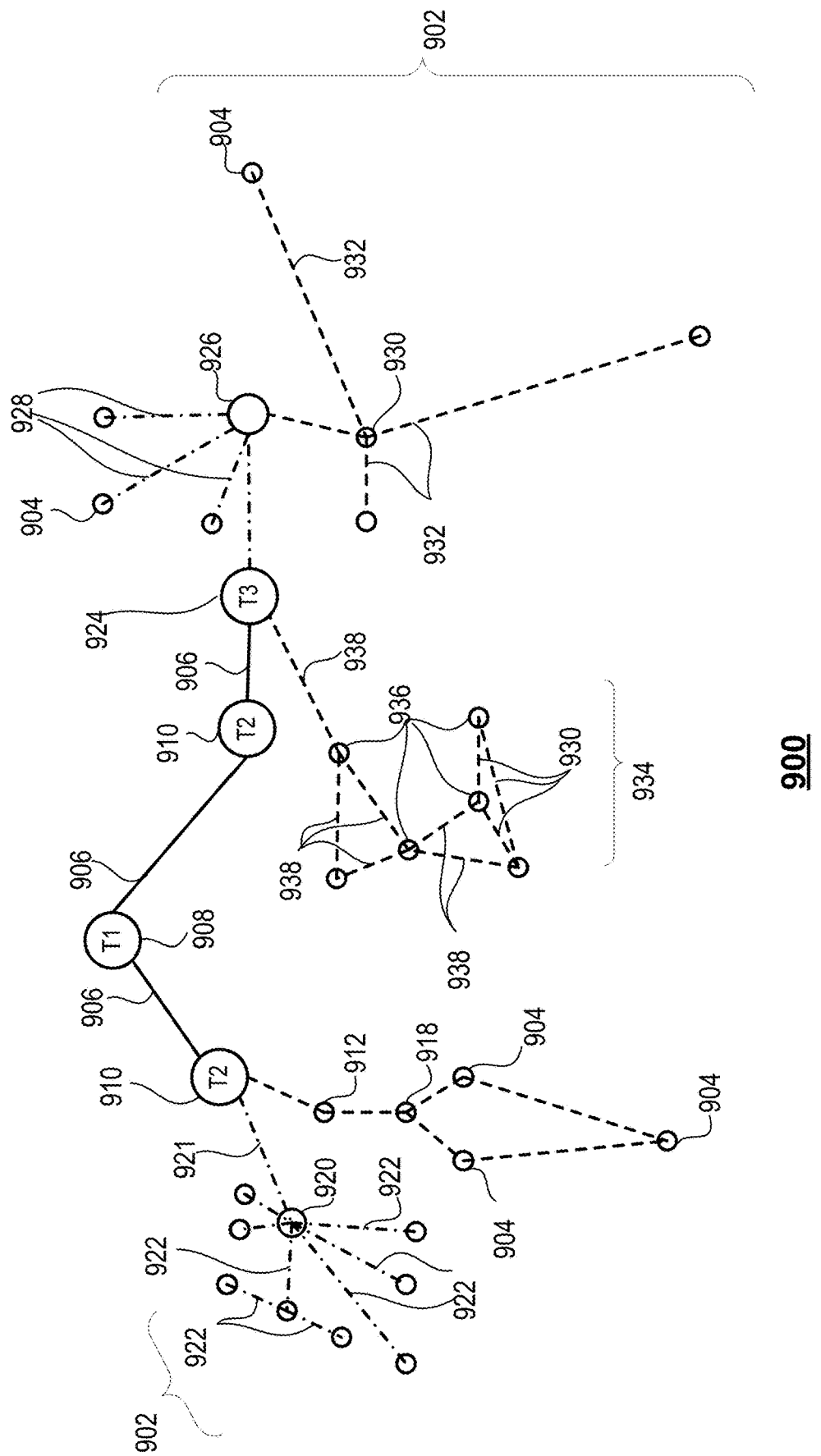
FIG. 9 illustrates an arrangement showing interconnections that may be present between a network and Internet of Things (IoT) networks, in accordance with various embodiments.

FIG. 9 illustrates an arrangement 900 showing interconnections that may be present between the Internet and IoT networks, in accordance with various embodiments. The interconnections may couple smaller networks 902, down to the individual IoT device 904, to the fiber backbone 906 of the Internet 900. To simplify the drawing, not every device 904, or other object, is labeled.

In FIG. 9, top-level providers, which may be termed tier 1 providers 908, are coupled by the fiber backbone of the Internet to other providers, such as secondary or tier 2 providers 910. In one example, a tier 2 provider 910 may couple to a tower 912 of an LTE cellular network, for example, by further fiber links, by microwave communications 914, or by other communications technologies. The tower 912 may couple to a mesh network including IoT devices 904 through an LTE communication link 916, for example, through a central node 918. The communications between the individual IoT devices 904 may also be based on LTE or NR communication links 916. In another example, a high-speed uplink 921 may couple a tier 2 provider 910 to a gateway (GW) 920. A number of IoT devices 904 may communicate with the GW 920, and with each other through the GW 920, for example, over BLE links 922.

The fiber backbone 806 may couple lower levels of service providers to the Internet, such as tier 3 providers 924. A tier 3 provider 924 may be considered a general Internet service provider (ISP), for example, purchasing access to the fiber backbone 910 from a tier 2 provider 910 and providing access to a corporate GW 926 and other customers. From the corporate GW 926, a wireless local area network (WLAN) can be used to communicate with IoT devices 904 through Wi-Fi® links 928. A Wi-Fi link 928 may also be used to couple to a low power wide area (LPWA) GW 930, which can communicate with IoT devices 904 over LPWA links 932, for example, compatible with the LoRaWan specification promulgated by the LoRa alliance.

The tier 3 provider 924 may also provide access to a mesh network 934 through a coordinator device 936 that communicates with the tier 3 provider 924 using any number of communications links, such as an LTE cellular link, an LPWA link, or a link 938 based on the IEEE 802.15.4 standard, such as Zigbee®. Other coordinator devices 936 may provide a chain of links that forms cluster tree of linked devices.

IoT devices 904 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 904 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 904 may be biotic devices such as monitoring implants, biosensors, biochips, and the like. In other embodiments, an IoT device 904 may be a computer device that is embedded in a computer system and coupled with communications circuitry of the computer system. In such embodiments, the IoT device 904 refer to a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 904 may include one or more memory devices and one or more processors to capture and store/record data. Each of the IoT devices 904 may include appropriate communications circuitry (e.g., transceiver(s), modem, antenna elements, etc.) to communicate (e.g., transmit and receive) captured and stored/recorded data. Further, each IoT device 904 may include other transceivers for communications using additional protocols and frequencies. The wireless communications protocols may be any suitable set of standardized rules or instructions implemented by the IoT devices 904 to communicate with other devices, including instructions for packetizing/depacketizing data, instructions for modulating/demodulating signals, instructions for implementation of protocols stacks, and the like. For example, IoT devices 904 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of the IoT devices 904, tower 912, GW 920, 926, and 930, coordinator device 936, and so forth, may also be incorporated with the embodiments described herein, in particular, with references to FIGS. 1-7. In particular, the IoT devices 904, tower 912, GW 920, 926, and 930, coordinator device 936, and so forth, may correspond with the computing devices/systems discussed previously with regard to FIGS. 1-6.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

Figure 10:
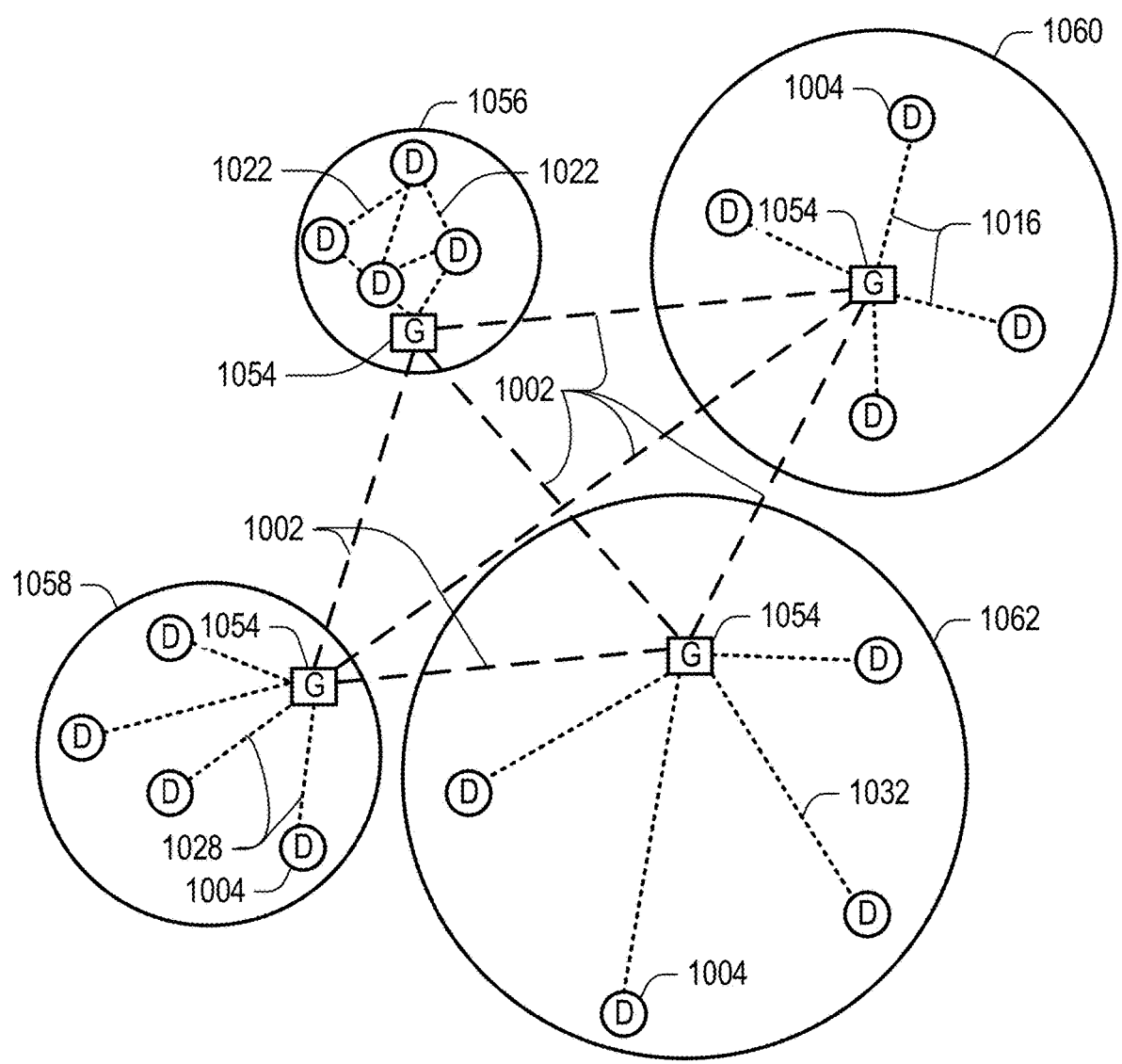
FIG. 10 illustrates an example domain topology, in accordance with various embodiments.

FIG. 10 illustrates an example domain topology 1000 that may be used for a number of IoT networks coupled through backbone links 1002 to GWs 1054, in accordance with various embodiments. To simplify the drawing, not every device 1004, or communications link 1016, 1022, 1028, or 1032 is labeled. The backbone links 1002 may include any number of wired or wireless technologies, and may be part of a local area network (LAN), a wide area network (WAN), or the Internet. Similar to FIG. 9, in embodiments, one or more of IoT devices 1004 (which may be the same or similar as IoT devices 904 of FIG. 9), GWs 1054, and so forth, may be incorporated with embodiments described herein. In particular, the various devices shown by FIG. 10 may correspond with the EMS appliances, physical nodes, relay controllers, etc., discussed previously with regard to FIGS. 1-6.

The network topology 1000 may include any number of types of IoT networks, such as a mesh network 1056 using BLE links 1022. Other IoT networks that may be present include a WLAN network 1058 using WiFi links 1028, a cellular network 1060 using cellular links 1016, and an LPWA network 1062 using LPWA links 1032. Each of these IoT networks may provide opportunities for new developments, as described herein. For example, communications between IoT devices 1004, such as over the backbone links 1002, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 1006 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1058 uses systems that perform standards conversion to provide multi-standard connectivity, enabling IoT devices 1004 using different protocols to communicate. Further systems may provide seamless interconnectivity across a multi-standard infrastructure comprising visible Internet resources and hidden Internet resources. Communications in the cellular network 1060 may be enhanced by systems that offload data, extend communications to more remote devices, or both. The LPWA network 1062 may include systems that perform non-Internet protocol (IP) to IP interconnections, addressing, and routing.

Figure 11:
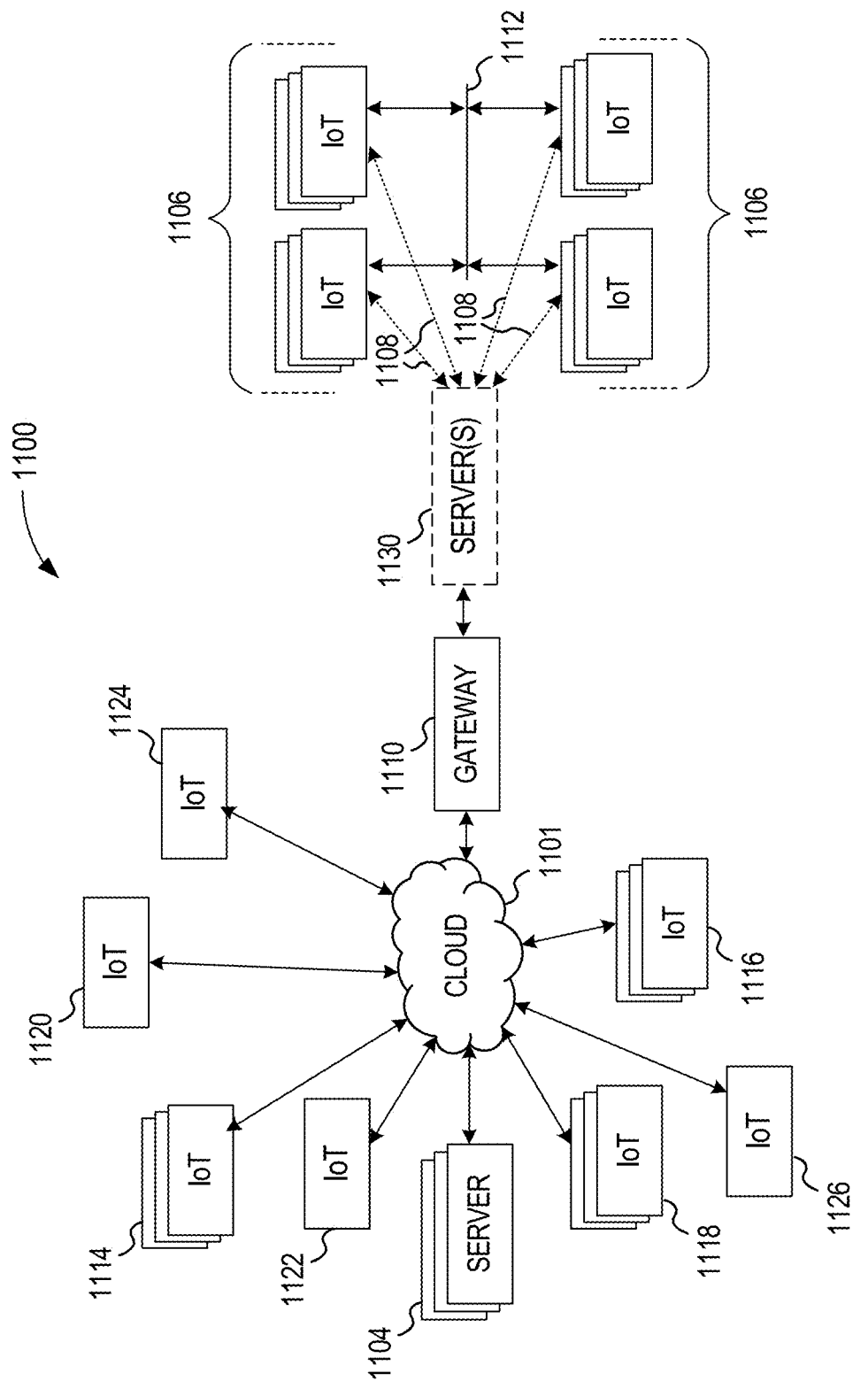
FIG. 11 illustrates an example cloud computing network or cloud in communication with a number of IoT devices, in accordance with various embodiments.

FIG. 11 illustrates an arrangement 1100 of example cloud computing network, or cloud 1101, in communication with a number of Internet of Things (IoT) devices, in accordance with various embodiments. The cloud 1101 may represent the Internet, one or more cellular networks, a local area network (LAN) or a wide area network (WAN) including proprietary and/or enterprise networks for a company or organization, or combinations thereof. Cloud 1101 may correspond to cloud 801 of FIG. 8. Components used for such communications system can depend at least in part upon the type of network and/or environment selected. Protocols and components for communicating via such networks are well known and will not be discussed herein in detail. However, it should be appreciated that cloud 1101 may be associated with network operator who owns or controls equipment and other elements necessary to provide network-related services, such as one or more base stations or access points, and one or more servers for routing digital data or telephone calls (for example, a core network or backbone network).

The IoT devices in FIG. 11 may be the same or similar to the IoT devices 904 discussed with regard to FIGS. 9-10. In particular, the IoT devices in FIG. 11 may correspond with the EMS appliances, physical nodes, relay controllers, etc., discussed previously with regard to FIGS. 1-6. The IoT devices may include any number of different types of devices, grouped in various combinations, such as IoT group 1106 that may include IoT devices that provide one or more services for a particular user, customer, organizations, etc. A service provider may deploy the IoT devices in the IoT group 1106 to a particular area (e.g., a geolocation, building, etc.) in order to provide the one or more services. In one example, the IoT group 306 may be a traffic control group where the IoT devices in the IoT group 1106 may include stoplights, traffic flow monitors, cameras, weather sensors, and the like, to provide traffic control and traffic analytics services for a particular municipality or other like entity. Similar to FIGS. 9-10, in embodiments, one or more of IoT devices 1114-1124, GW 1110, and so forth, may be incorporated with the various embodiments described herein, in particular, with references to FIGS. 1-6. For example, in some embodiments, the IoT group 1106, or any of the IoT groups discussed herein, may include the components, devices, systems discussed with regard to FIGS. 1-6.

The IoT group 1106, or other subgroups, may be in communication with the cloud 1101 through wireless links 1108, such as LPWA links, and the like. Further, a wired or wireless sub-network 1112 may allow the IoT devices to communicate with each other, such as through a local area network, a wireless local area network, and the like. The IoT devices may use another device, such as a GW 1110 to communicate with the cloud 1101. Other groups of IoT devices may include remote weather stations 1114, local information terminals 1116, alarm systems 1118, automated teller machines 1120, alarm panels 1122, or moving vehicles, such as emergency vehicles 1124 or other vehicles 1126, among many others. Each of these IoT devices may be in communication with other IoT devices, with servers 1104, or both. In some embodiments, the servers 1104 correspond with the remote server(s) 260 discussed previously, and any of the aforementioned vehicles may correspond with objects 64 discussed previously.

As can be seen from FIG. 11, a large number of IoT devices may be communicating through the cloud 1101. This may allow different IoT devices to request or provide information to other devices autonomously. For example, the IoT group 1106 may request a current weather forecast from a group of remote weather stations 1114, which may provide the forecast without human intervention. Further, an emergency vehicle 1124 may be alerted by an automated teller machine 1120 that a burglary is in progress. As the emergency vehicle 1124 proceeds towards the automated teller machine 1120, it may access the traffic control group 1106 to request clearance to the location, for example, by lights turning red to block cross traffic at an intersection in sufficient time for the emergency vehicle 1124 to have unimpeded access to the intersection.

In another example, the IoT group 1106 may be an industrial control group (also referred to as a "connected factory", an "industry 4.0" group, and the like) where the IoT devices in the IoT group 1106 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 1106 may communicate with the servers 1104 via GW 1110, server(s) 1130, and cloud 1101 to provide captured data, which may be used to provide performance monitoring and analytics to the manufacturer or factory operator. Additionally, where the GW 1110 or one or more of the server(s) 1130 is or includes an EMS 100/300 (or is an EMS appliance 900 of FIG. 9), the IoT group 1106 may communicate with the GW 1110 and/or one or more of the server(s) 1130 for energy and electricity consumption optimizations according to the various embodiments discussed herein. Furthermore, the IoT devices in the IoT group 1106 may communicate among each other, and/or with other IoT devices of other IoT groups, to make decisions on their own and to perform their tasks as autonomously as possible.

Clusters of IoT devices, such as the IoT groups depicted by FIG. 11, may be equipped to communicate with other IoT devices as well as with the cloud 1101. This may allow the IoT devices to form an ad-hoc network between the devices, allowing them to function as a single device, which may be termed a fog device. This is discussed further with respect to FIG. 12.

Figure 12:
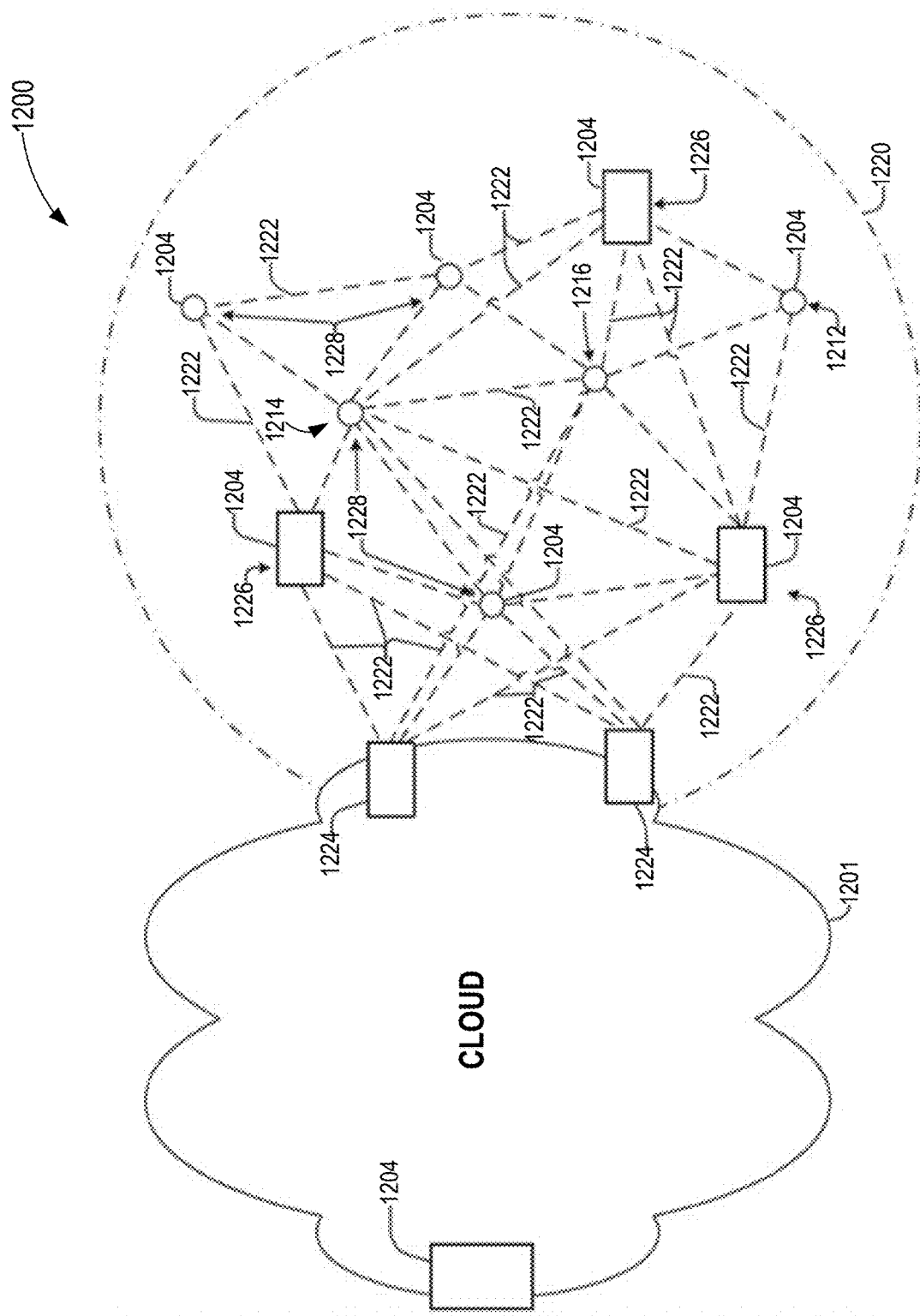
FIG. 12 illustrates an arrangement of a cloud computing network or cloud in communication with a mesh network of IoT devices or IoT fog, in accordance with various embodiments.

FIG. 12 illustrates an arrangement 1200 of a cloud computing network, or cloud 1201, in communication with a mesh network of IoT devices, which may be termed a fog device 1220 or fog 1220, operating at the edge of the cloud 1201, in accordance with various embodiments. Cloud 1201 may be the same or similar to cloud 801 of FIG. 8 and cloud 1101 of FIG. 11. In this example, the fog 1220 is a group of IoT devices at an intersection (e.g., and may include one or more IoT groups 1106 of FIG. 11). The fog 1220 may be established in accordance with specifications released by the OpenFog Consortium (OFC), the Open Connectivity Foundation™ (OCF), among others. In some embodiments, the fog 1220 may be a tangle as defined by the IOTA foundation. Additionally, each of the IoT devices in the fog 1220 may correspond with the EMS appliances, physical nodes, relay controllers, etc., discussed previously with regard to FIGS. 1-6.

In embodiments, fog computing systems, such as fog 1220, may be mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from Cloud 1201 to Things (e.g., IoT devices 1204).

Fog computing systems may be used to perform low-latency computation/aggregation on the data while routing it to an edge cloud computing service (e.g., MEC host 257 in FIG. 2) and/or a central cloud computing service (e.g., server(s) 260 in FIG. 2) for performing heavy computations or computationally burdensome tasks. On the other hand, edge cloud computing consolidates human-operated, voluntary resources, as a cloud. These voluntary resource may include, inter-alia, vUE systems 201, desktop PCs, tablets, smartphones, nano data centers, and the like. In various implementations, resources in the edge cloud may be in one to two-hop proximity to the IoT devices 1204 (or vehicles 64 in FIGS. 1-2), which may result in reducing overhead related to processing data and may reduce network delay.

In some embodiments, the fog 1220 may be a consolidation of IoT devices 1204 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks offloaded by edge resources.

In embodiments, the fog 1220 may operate at the edge of the cloud 1201. The fog 1220 operating at the edge of the cloud 1201 may overlap or be subsumed into an edge network of the cloud 1201. The edge network of the cloud 1201 may overlap with the fog 1220, or become a part of the fog 1220. Furthermore, the fog 1220 may be an edge-fog network that includes an edge layer and a fog layer. The edge layer of the edge-fog network includes a collection of loosely coupled, voluntary and human-operated resources (e.g., the aforementioned edge devices). The Fog layer resides on top of the edge layer and is a consolidation of networking devices such as the vehicles 64 of FIGS. 1-2.

Data may be captured, stored/recorded, and communicated among the IoT devices 1204 (or, for example, among the vehicles 64 that have direct links 253 with one another as shown by FIG. 2). Analysis of the traffic flow and control schemes may be implemented by aggregators 1226 that are in communication with the IoT devices 1204 (or vehicles 64) and each other through a mesh network. The aggregators 1226 may be a type of IoT device 1204 and/or network appliance. In the example of FIG. 2, the aggregators may be stationary infrastructure equipment 61, the (R)AN 256, or one or more designated vehicles 64. Data may be uploaded to the cloud 1201 (e.g., server(s) 260 in FIG. 2) via the aggregator, and commands can be received from the cloud 1201 through GWs 1224 that are in communication with the IoT devices 1204 and the aggregators 1226 through the mesh network. Unlike the traditional cloud computing model, in some implementations, the cloud 1201 may have little or no computational capabilities and only serves as a repository for archiving data recorded and processed by the fog 1220. In these implementations, the cloud 1201 centralized data storage system and provides reliability and access to data by the computing resources in the fog 1220 and/or edge devices. Being at the core of the architecture, the Data Store of the cloud 1201 is accessible by both Edge and Fog layers of the aforementioned edge-fog network.

Similar to FIGS. 9-11, in embodiments, one or more of IoT devices 1204, aggregators 1226, and so forth, may be incorporated with the various embodiments described herein, in particular, with references to FIGS. 1-6. For example, and with reference to FIG. 2, the links 253 that are enabled by use of the communication technology 250 may allow the vehicles 64 to form a cloud network or fog 1220 for collaborating. Examples of vehicle 64 collaboration include infrastructure analysis, traffic management, and platooning. Clusters of the vehicles 64 are equipped to communicate with one another, as well as with stationary infrastructure equipment 61a, 61b, to form ad-hoc networks allowing the vehicles 64 to function as a fog 1220.

Any number of communications links may be used in the fog 1220. Shorter-range links 1222, for example, compatible with IEEE 802.12.4 may provide local communications between IoT devices that are proximate to one another or other devices. Longer-range links 1222, for example, compatible with LPWA standards, may provide communications between the IoT devices and the GWs 1224. To simplify the diagram, not every communications link 1222 is labeled with a reference number.

The fog 1220 may be considered to be a massively interconnected network wherein a number of IoT devices are in communications with each other, for example, by the communication links 1222. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 1224. In these networks, the number of interconnections may provide substantial redundancy, allowing communications to be maintained, even with the loss of a number of IoT devices.

Not all of the IoT devices may be permanent members of the fog 1220. In the example of FIG. 12, three transient IoT devices have joined the fog 1220, a first mobile device 1212, a second mobile device 1214, and a third mobile device 1216. The fog 1220 may be presented to clients in the cloud 1201, such as the server 1234, as a single device located at the edge of the cloud 1201. In this example, the control communications to specific resources in the fog 1220 may occur without identifying any specific IoT device 1204 within the fog 1220. Accordingly, if any IoT device 1204 fails, other IoT devices 1204 may be able to discover and control a resource. For example, the IoT devices 1204 may be wired so as to allow any one of the IoT devices 1204 to control measurements, inputs, outputs, etc., for the other IoT devices 1204. The aggregators 1226 may also provide redundancy in the control of the IoT devices 1204 and other functions of the fog 1220.

In some examples, the IoT devices may be configured using an imperative programming style, e.g., with each IoT device having a specific function and communication partners. However, the IoT devices forming the fog 1220 may be configured in a declarative programming style, allowing the IoT devices to reconfigure their operations and communications, such as to determine needed resources in response to conditions, queries, and device failures. This may be performed as transient IoT devices, such as the mobile devices 1212, 1214, 1216, join the fog 1220. As transient or mobile IoT devices enter or leave the fog 1220, the fog 1220 may reconfigure itself to include those devices. This may be performed by forming a temporary group of the mobile devices 1212 and 1214 and the third mobile device 1216 to control or otherwise communicate with the IoT devices 1204. If one or both of the devices 1212, 1214 are autonomous, the temporary group may provide instructions to the devices 1212, 1214. As the transient devices 1212, 1214, and 1216, leave the vicinity of the fog 1220, it may reconfigure itself to eliminate those IoT devices 1204 from the network. The fog 1220 may also divide itself into functional units, such as the IoT devices 1204 and other IoT devices proximate to a particular area or geographic feature, or other IoT devices that perform a particular function. This type of combination may enable the formation of larger IoT constructs using resources from the fog 1220.

As illustrated by the fog 1220, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" is one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code. As used herein, a "database object", "data object", or the like may refer to any representation of information in a database that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" may refer to a resource hosted by a remote entity (e.g., a cloud computing service) and accessible over a network. The term "on-device resource" may refer to a resource hosted inside a device and enabling access to the device, and thus, to the related physical entity.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices for the purpose of transmitting and receiving information.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. As used herein, the term "architecture" may refer to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

IV. EXAMPLES

Illustrative examples of the devices, systems, and methods disclosed herein are provided below. An embodiment of the devices, systems, and methods may include any one or more, and any combination of, the examples described below.

Example 1 includes an apparatus for providing infrastructure service, the apparatus comprising: map processing (MP) circuitry coupled with interface circuitry of an infrastructure equipment hosting the apparatus, wherein the interface circuitry is arranged to communicatively couple the infrastructure equipment with a fixed sensor array having individual sensors, the individual sensors covering respective sectors of a physical coverage area, and the interface circuitry obtaining first sensor data from the individual sensors, and the first sensor data being representative of the respective sectors covered by the individual sensors and objects within the respective sectors; and wherein the MP circuitry is arranged to, based on the first sensor data, determine at least one occlusion in the observation area, and identify at least one object located at or moving towards the at least one occlusion; and encoding circuitry coupled with the MP circuitry, the encoding circuitry arranged to encode a message to be broadcast or multicast to all objects in the physical coverage area, wherein the message includes a request for second sensor data to be collected by the at least one object when the at least one object is located at or near the at least one occlusion.

Example 2 includes the apparatus of example 1 and/or some other example(s) herein, wherein the message is a first message, and wherein the MP circuitry is communicatively coupled with wireless communication circuitry via the interface circuitry, the wireless communication circuitry is arranged to broadcast or multicast the first message, and receive respective second messages from some or all of the objects in the physical coverage area including a second message from the at least one object, wherein the second message from the at least one object includes the second sensor data.

Example 3 includes the apparatus of example 2 and/or some other example(s) herein, wherein the apparatus further comprises: decoding circuitry coupled with the MP circuitry, the decoding circuitry arranged to decode a second message from the at least one object to obtain the second sensor data, wherein at least a portion of the second sensor data is representative of a physical area corresponding to the at least one occlusion.

Example 4 includes the apparatus of example 3 and/or some other example(s) herein, wherein the MP circuitry is arranged to detect objects in the physical coverage area based on the first sensor data, and assign a unique identifier to each detected object.

Example 5 includes the apparatus of example 4 and/or some other example(s) herein, wherein, to encode the first message, the encoding circuitry is arranged to: generate the first message to include a plurality of records, wherein each record of the plurality of records corresponds to an individual object of each detected object, each record comprises a plurality of data elements (DEs), and the plurality of DEs includes a sensor request DE; insert a first value into the sensor request DE of a record for the at least one object, wherein the first value indicates that the at least one object is to report the second sensor data; and insert a second value into the sensor request DE of records for other detected objects, wherein the second value indicates that the other detected objects are not to report the second sensor data.

Example 6 includes the apparatus of example 5 and/or some other example(s) herein, wherein the plurality of DEs includes a position request DE, and to encode the first message, the encoding circuitry is arranged to: insert a third value into the position request DE of records of one or more detected objects that are to report a current position; and insert a fourth value into the position request DE of records of one or more detected object that are not to report the current position.

Example 7 includes the apparatus of examples 4-6 and/or some other example(s) herein, wherein the wireless communication circuitry is arranged to: transmit a third message to the at least one object prior to broadcast or multicast of the first message, wherein the third message includes a request for capabilities of the at least one object; receive a fourth message from the at least one object, wherein the fourth message indicates the capabilities of the at least one object; and transmit a fifth message to the at least one object based on the fourth message, wherein the fifth message includes the unique identifier assigned to the at least one object.

Example 8 includes the apparatus of examples 3-7 and/or some other example(s) herein, wherein the MP circuitry is arranged to: fuse the second sensor data with the first sensor data to obtain a combined sensor data set, generate an environmental map based on the combined sensor data set, and divide the environmental map into two or more map segments; and the wireless communication circuitry is arranged to broadcast or multicast the two or more map segments to the detected objects.

Example 9 includes the apparatus of examples 3-8 and/or some other example(s) herein, wherein the apparatus is an integrated circuit and further comprises the interface circuitry.

Example A10 includes the apparatus of examples 3-9 and/or some other example(s) herein, wherein the infrastructure equipment is a road side unit (RSU) and the monitored objects are vehicles traveling within the physical coverage area, and wherein the first message is a Cooperative Awareness Message (CAM), and the second message is a CAM or a Decentralized Environmental Notification Message (DENM).

Example 11 includes a chipset in an electronic system, the chipset comprising: interface circuitry arranged to obtain a first message from a remote infrastructure system via a wireless communication subsystem, and arranged to provide a second message to the communication subsystem for transmission to the remote infrastructure system; processor circuitry coupled with the interface circuitry, the processor circuitry arranged to: identify a section within the first message designated for the electronic system, and obtain sensor data from one or more sensors communicatively coupled to the electronic system when the section within the first message indicates to provide sensor data to the remote infrastructure system; and encoding circuitry coupled with the processor circuitry, the encoding circuitry arranged to encode the second message including the sensor data for transmission to the remote infrastructure system.

Example 12 includes the chipset of example 11 and/or some other example(s) herein, wherein the first message includes a plurality of sections, wherein each section of the plurality of sections corresponds to an individual electronic system, each section comprises a plurality of data elements (DEs), and the plurality of DEs includes a sensor request DE, and wherein the processing circuitry is arranged to: obtain the sensor data for the second message when the sensor request DE within the section of the first message designated for the electronic system includes a first value, wherein the first value indicates that the electronic system is to report sensor data; and not obtain the sensor data for the second message when the sensor request DE within the section of the first message designated for the electronic system includes a second value, wherein the second value indicates that the electronic system is to not report the sensor data.

Example 13 includes the chipset of example 12 and/or some other example(s) herein, wherein the plurality of DEs includes an acknowledgement (ACK) DE, and wherein the encoding circuitry is arranged to: encode an ACK message when the ACK DE within the section of the first message designated for the electronic system includes a third value, wherein the third value indicates that the electronic system is to send an ACK message to the remote infrastructure system; and not encode the ACK message when the ACK DE within the section of the first message designated for the electronic system includes a fourth value, wherein the fourth value indicates that the electronic system is to not send an ACK message to the remote infrastructure system.

Example 14 includes the chipset of examples 12-13 and/or some other example(s) herein, wherein the plurality of DEs includes a position request DE, and wherein the encoding circuitry is arranged to: encode the second message including the sensor data and a current position of the electronic system when the position request DE within the section of the first message designated for the electronic system includes a fifth value, wherein the fifth value indicates that the electronic system is to report the current position to the remote infrastructure system; and encode the second message including the sensor data and not the current position when the position request DE within the section of the first message designated for the electronic system includes a sixth value, wherein the sixth value indicates that the electronic system is to not report the current position to the remote infrastructure system.

Example 15 includes the chipset of examples 11-14 and/or some other example(s) herein, wherein, to identify the section within the first message designated for the electronic system, the processing circuitry is to: search the first message for an object identifier (ID) assigned to the electronic system during a handshake procedure performed with the remote infrastructure system.

Example 16 includes the chipset of example 15 and/or some other example(s) herein, wherein the interface circuitry is arranged to: obtain a third message from the remote infrastructure system via the wireless communication subsystem prior to receipt of the first message, wherein the third message includes a request for capabilities of the electronic system; provide a fourth message to the communication subsystem for transmission to the remote infrastructure system, wherein the fourth message indicates the capabilities of the electronic system; and obtain a fifth message from the remote infrastructure system via the wireless communication subsystem based on the fourth message, wherein the fifth message includes the object ID assigned to the electronic system.

Example 17 includes the chipset of examples 11-16 and/or some other example(s) herein, wherein: the interface circuitry arranged is to obtain a sixth message from the remote infrastructure system via a wireless communication subsystem, wherein the sixth message includes at least one segment of an environmental map generated based on the sensor data; and the processor circuitry is arranged to combine the at least one segment with at least one other segment of the environmental map to obtain a complete environmental map.

Example 18 includes the chipset of examples 11-17 and/or some other example(s) herein, wherein the remote infrastructure system is a road side unit (RSU), the electronic system is implemented in a vehicle traveling within a physical coverage area of the RSU, and wherein the first message is a Cooperative Awareness Message (CAM), and the second message is a CAM or a Decentralized Environmental Notification Message (DENM).

Example 19 includes a wireless sensor network (WSN) comprising: a plurality of objects, wherein one or more objects of the plurality of objects comprise wireless communication circuitry and sensor circuitry embedded in or mounted on the individual objects; and infrastructure equipment communicatively coupled with a fixed sensor array having individual sensors, the individual sensors covering respective sectors of a physical coverage area, and the infrastructure equipment is arranged to: obtain first sensor data from the individual sensors, the first sensor data being representative of the respective sectors covered by the individual sensors and individual objects of the plurality of objects within or traveling through the respective sectors; determine, based on the first sensor data, at least one occlusion in the observation area; identify individual objects of the plurality of objects located at or moving towards the at least one occlusion; and encode a message to be broadcast or multicast to the identified objects in the physical coverage area, wherein the message includes a request for second sensor data to be collected by the sensor circuitry of the identified objects when the identified objects are located at or near the at least one occlusion.

Example 20 includes the WSN of example 19 and/or some other example(s) herein, wherein the message is a first message, and wherein the infrastructure equipment is arranged to: broadcast or multicast the first message; receive respective second messages from some or all of the objects in the physical coverage area including second messages from the identified objects, wherein the second messages from the identified objects include the second sensor data collected by respective sensor circuitry of the identified objects; and decode the second message from the identified objects to obtain the second sensor data, wherein at least a portion of the second sensor data is representative of a physical area corresponding to the at least one occlusion.

Example 21 includes the WSN of example 20 and/or some other example(s) herein, wherein the infrastructure equipment is arranged to detect the plurality of objects in the physical coverage area based on the first sensor data, and assign a unique identifier to each detected object.

Example 22 includes the WSN of example 21 and/or some other example(s) herein, wherein the infrastructure equipment is arranged to: generate the first message to include a plurality of records, wherein each record of the plurality of records corresponds to an individual object of each detected object, each record comprises a plurality of data elements (DEs) including a sensor request DE, and a position data DE; insert a value of "TRUE" into the sensor request DE of records for the identified objects; insert a value of "TRUE" into the position request DE of records for the identified objects; insert a value of "FALSE" into the sensor request DE of records for other detected objects; and insert a value of "FALSE" into the position request DE of records for the other detected objects.

Example 23 includes the WSN of example 22 and/or some other example(s) herein, wherein the plurality of DEs includes an acknowledgement (ACK) DE, and the infrastructure equipment is arranged to: insert a value of "TRUE" into the ACK DE for detected objects determined to enter or arrive at a randomly selected portion of the coverage area at a randomly selected time.

Example 24 includes the WSN of examples 22-23 and/or some other example(s) herein, wherein the infrastructure equipment is arranged to: transmit a third message to each detected object as each object enters the physical coverage area, wherein the third message includes a request for capabilities of each detected object; receive respective fourth messages from the each detected object, wherein the respective fourth messages indicate one or more of wireless communication capabilities of each detected object, positioning capabilities of each detected object, and sensing capabilities of each detected object; and transmit respective fifth messages to each detected object based on the respective fourth messages, wherein the respective fifth messages include a unique identifier assigned to each detected object.

Example 25 includes the WSN of examples 20-24, and/or some other example(s) herein wherein the infrastructure equipment is arranged to: fuse the second sensor data with the first sensor data to obtain a combined sensor data set, generate an environmental map based on the combined sensor data set; divide the environmental map into two or more map segments; and broadcast or multicast the two or more map segments to each detected object.

Example 26 includes a method for providing infrastructure service, the method comprising: obtaining, by a computing system of infrastructure equipment, first sensor data from individual sensors of a fixed sensor array, the individual sensors covering respective sectors of a physical coverage area, and the first sensor data is representative of the respective sectors covered by the individual sensors and objects within the respective sectors; determining, by the computing system based on the first sensor data, at least one occlusion in the observation area; identifying, by the computing system, at least one object located at or moving towards the at least one occlusion; and encoding, by the computing system, a message to be broadcast or multicast to all objects in the physical coverage area, the message including a request for second sensor data to be collected by the at least one object when the at least one object is located at or near the at least one occlusion.

Example 27 includes the method of example 26 and/or some other example(s) herein, wherein the message is a first message, and the method comprises: causing to broadcast or multicast, by the computing system, the first message; and receiving, by the computing device, respective second messages from some or all of the objects in the physical coverage area including a second message from the at least one object, wherein the second message from the at least one object includes the second sensor data.

Example 28 includes the method of example 27 and/or some other example(s) herein, wherein the method further comprises: decoding, by the computing device, a second message from the at least one object to obtain the second sensor data, wherein at least a portion of the second sensor data is representative of a physical area corresponding to the at least one occlusion.

Example 29 includes the method of example 28 and/or some other example(s) herein, wherein the MP circuitry is arranged to detect objects in the physical coverage area based on the first sensor data, and assign a unique identifier to each detected object.

Example 30 includes the method of example 29 and/or some other example(s) herein, wherein encoding the first message comprises: generating, by the computing device, the first message to include a plurality of records, wherein each record of the plurality of records corresponds to an individual object of each detected object, each record comprises a plurality of data elements (DEs), and the plurality of DEs includes a sensor request DE; inserting, by the computing device, a first value into the sensor request DE of a record for the at least one object, wherein the first value indicates that the at least one object is to report the second sensor data; and inserting, by the computing device, a second value into the sensor request DE of records for other detected objects, wherein the second value indicates that the other detected objects are not to report the second sensor data.

Example 31 includes the method of example 30 and/or some other example(s) herein, wherein the plurality of DEs includes a position request DE, and encoding the first message comprises: inserting, by the computing device, a third value into the position request DE of records of one or more detected objects that are to report a current position; and inserting, by the computing device, a fourth value into the position request DE of records of one or more detected object that are not to report the current position.

Example 32 includes the method of examples 29-31 and/or some other example(s) herein, further comprising: transmitting, by the computing system, a third message to the at least one object prior to broadcast or multicast of the first message, wherein the third message includes a request for capabilities of the at least one object; receiving, by the computing system, a fourth message from the at least one object, wherein the fourth message indicates the capabilities of the at least one object; and transmitting, by the computing system, a fifth message to the at least one object based on the fourth message, wherein the fifth message includes the unique identifier assigned to the at least one object.

Example 33 includes the method of examples 28-32 and/or some other example(s) herein, further comprising: fusing, transmitting, by the computing system, the second sensor data with the first sensor data to obtain a combined sensor data set; generating transmitting, by the computing system, an environmental map based on the combined sensor data set; dividing transmitting, by the computing system, the environmental map into two or more map segments; and causing transmitting, by the computing system, broadcast or multicast of the two or more map segments to the detected objects.

Example 34 includes the method of examples 28-33 and/or some other example(s) herein, wherein the computing system is an integrated circuit and comprises interface circuitry to communicatively couple the computing system to the individual sensors of the fixed sensor array and communication circuitry to communicate with the objects.

Example 35 includes the method of examples 28-34 and/or some other example(s) herein, wherein the infrastructure equipment is a road side unit (RSU) and the monitored objects are vehicles traveling within the physical coverage area, and wherein the first message is a Cooperative Awareness Message (CAM), and the second message is a CAM or a Decentralized Environmental Notification Message (DENM).

Example 36 includes a method comprising: obtaining, by an electronic system, a first message from a remote infrastructure system via a wireless communication subsystem; identifying, by the electronic system, a section within the first message designated for the electronic system; obtaining, by the electronic system, sensor data from one or more sensors communicatively coupled to the electronic system when the section within the first message indicates to provide sensor data to the remote infrastructure system; encoding, by the electronic system, a second message including the sensor data for transmission to the remote infrastructure system; and providing, by the electronic system, the second message to the communication subsystem for transmission to the remote infrastructure system.

Example 37 includes the method of example 36 and/or some other example(s) herein, wherein the first message includes a plurality of sections, wherein each section of the plurality of sections corresponds to an individual electronic system, each section comprises a plurality of data elements (DEs), and the plurality of DEs includes a sensor request DE, and the method comprises: obtaining, by the electronic system, the sensor data for the second message when the sensor request DE within the section of the first message designated for the electronic system includes a first value, wherein the first value indicates that the electronic system is to report sensor data; and not obtaining, by the electronic system, the sensor data for the second message when the sensor request DE within the section of the first message designated for the electronic system includes a second value, wherein the second value indicates that the electronic system is to not report the sensor data.

Example 38 includes the method of example 37 and/or some other example(s) herein, wherein the plurality of DEs includes an acknowledgement (ACK) DE, and the method comprises: encoding, by the electronic system, an ACK message when the ACK DE within the section of the first message designated for the electronic system includes a third value, wherein the third value indicates that the electronic system is to send an ACK message to the remote infrastructure system; and not encoding, by the electronic system, the ACK message when the ACK DE within the section of the first message designated for the electronic system includes a fourth value, wherein the fourth value indicates that the electronic system is to not send an ACK message to the remote infrastructure system.

Example 39 includes the method of examples 37-38 and/or some other example(s) herein, wherein the plurality of DEs includes a position request DE, and the method comprises: encoding, by the electronic system, the second message including the sensor data and a current position of the electronic system when the position request DE within the section of the first message designated for the electronic system includes a fifth value, wherein the fifth value indicates that the electronic system is to report the current position to the remote infrastructure system; and encoding, by the electronic system, the second message including the sensor data and not the current position when the position request DE within the section of the first message designated for the electronic system includes a sixth value, wherein the sixth value indicates that the electronic system is to not report the current position to the remote infrastructure system.

Example 40 includes the method of examples 36-39 and/or some other example(s) herein, wherein identifying the section within the first message designated for the electronic system comprises: searching, by the electronic system, the first message for an object identifier (ID) assigned to the electronic system during a handshake procedure performed with the remote infrastructure system.

Example 41 includes the method of example 40 and/or some other example(s) herein, further comprising: obtaining, by the electronic system, a third message from the remote infrastructure system via the wireless communication subsystem prior to receipt of the first message, wherein the third message includes a request for capabilities of the electronic system; providing, by the electronic system, a fourth message to the communication subsystem for transmission to the remote infrastructure system, wherein the fourth message indicates the capabilities of the electronic system; and obtaining, by the electronic system, a fifth message from the remote infrastructure system via the wireless communication subsystem based on the fourth message, wherein the fifth message includes the object ID assigned to the electronic system.

Example 42 includes the method of examples 36-41 and/or some other example(s) herein, further comprising: obtaining, by the electronic system, a sixth message from the remote infrastructure system via a wireless communication subsystem, wherein the sixth message includes at least one segment of an environmental map generated based on the sensor data; and combining, by the electronic system, the at least one segment with at least one other segment of the environmental map to obtain a complete environmental map.

Example 43 includes the method of examples 36-42 and/or some other example(s) herein, wherein the remote infrastructure system is a road side unit (RSU), the electronic system is implemented in a vehicle traveling within a physical coverage area of the RSU, and wherein the first message is a Cooperative Awareness Message (CAM), and the second message is a CAM or a Decentralized Environmental Notification Message (DENM).

Example 44 includes a method for providing a wireless sensor network (WSN), the WSN including a plurality of objects and infrastructure equipment communicatively coupled with a fixed sensor array having individual sensors, wherein one or more objects of the plurality of objects comprise wireless communication circuitry and sensor circuitry embedded in or mounted on the individual objects, and the individual sensors cover respective sectors of a physical coverage area, and wherein the method comprises: obtaining, by the infrastructure equipment, first sensor data from the individual sensors, the first sensor data being representative of the respective sectors covered by the individual sensors and individual objects of the plurality of objects within or traveling through the respective sectors; determining, by the infrastructure equipment based on the first sensor data, at least one occlusion in the observation area; identifying, by the infrastructure equipment, individual objects of the plurality of objects located at or moving towards the at least one occlusion; and encoding, by the infrastructure equipment, a message to be broadcast or multicast to the identified objects in the physical coverage area, wherein the message includes a request for second sensor data to be collected by the sensor circuitry of the identified objects when the identified objects are located at or near the at least one occlusion.

Example 45 includes the method of example 44 and/or some other example(s) herein, wherein the message is a first message, and the method comprises: broadcasting or multicasting, by the infrastructure equipment, the first message; receiving, by the infrastructure equipment, respective second messages from some or all of the objects in the physical coverage area including second messages from the identified objects, wherein the second messages from the identified objects include the second sensor data collected by respective sensor circuitry of the identified objects; and decoding, by the infrastructure equipment, the second message from the identified objects to obtain the second sensor data, wherein at least a portion of the second sensor data is representative of a physical area corresponding to the at least one occlusion.

Example 46 includes the method of example 45 and/or some other example(s) herein, wherein the method comprises: detecting, by the infrastructure equipment, the plurality of objects in the physical coverage area based on the first sensor data; and assigning, by the infrastructure equipment, a unique identifier to each detected object.

Example 47 includes the method of example 46 and/or some other example(s) herein, wherein the method comprises: generating, by the infrastructure equipment, the first message to include a plurality of records, wherein each record of the plurality of records corresponds to an individual object of each detected object, each record comprises a plurality of data elements (DEs) including a sensor request DE, and a position data DE; inserting, by the infrastructure equipment, a value of "TRUE" into the sensor request DE of records for the identified objects; inserting, by the infrastructure equipment, a value of "TRUE" into the position request DE of records for the identified objects; inserting, by the infrastructure equipment, a value of "FALSE" into the sensor request DE of records for other detected objects; and inserting, by the infrastructure equipment, a value of "FALSE" into the position request DE of records for the other detected objects Example 48 includes the method of example 47 and/or some other example(s) herein, wherein the plurality of DEs includes an acknowledgement (ACK) DE, and the method comprises: inserting, by the infrastructure equipment, a value of "TRUE" into the ACK DE for detected objects determined to enter or arrive at a randomly selected portion of the coverage area at a randomly selected time.

Example 49 includes the method of examples 47-48 and/or some other example(s) herein, wherein the method comprises: transmitting, by the infrastructure equipment, a third message to each detected object as each object enters the physical coverage area, wherein the third message includes a request for capabilities of each detected object; receiving, by the infrastructure equipment, respective fourth messages from the each detected object, wherein the respective fourth messages indicate one or more of wireless communication capabilities of each detected object, positioning capabilities of each detected object, and sensing capabilities of each detected object; and transmitting, by the infrastructure equipment, respective fifth messages to each detected object based on the respective fourth messages, wherein the respective fifth messages include a unique identifier assigned to each detected object.

Example 50 includes the method of examples 45-49 and/or some other example(s) herein, wherein the method comprises: fusing, by the infrastructure equipment, the second sensor data with the first sensor data to obtain a combined sensor data set; generating, by the infrastructure equipment, an environmental map based on the combined sensor data set; dividing, by the infrastructure equipment, the environmental map into two or more map segments; and broadcasting or multicasting, by the infrastructure equipment, the two or more map segments to each detected object.

Example 51 may include an apparatus comprising means to perform one or more elements of a method described in or related to any of examples 1-50, or any other method or process described herein.

Example 52 may include one or more non-transitory computer-readable media comprising instructions to cause an electronic device, upon execution of the instructions by one or more processors of the electronic device, to perform one or more elements of a method described in or related to any of examples 1-50, or any other method or process described herein.

Example 53 may include an apparatus comprising logic, modules, or circuitry to perform one or more elements of a method described in or related to any of examples 1-50, or any other method or process described herein.

Example 54 may include a method, technique, or process as described in or related to any of examples 1-50, or portions or parts thereof.

Example 55 may include an apparatus comprising: one or more processors and one or more computer-readable media comprising instructions that, when executed by the one or more processors, cause the one or more processors to perform the method, techniques, or process as described in or related to any of examples 1-50, or portions thereof.

Example 56 may include a signal as described in or related to any of examples 1-50, or portions or parts thereof.

Example 57 may include a signal in a wireless network as shown and described herein.

Example 58 may include a method of communicating in a wireless network as shown and described herein.

Example 59 may include a system for providing wireless communication as shown and described herein.

Example 60 may include a device for providing wireless communication as shown and described herein.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that each block of the flowchart illustrations and/or block diagrams, and combinations of blocks in the flowchart illustrations and/or block diagrams, may be implemented in hardware, firmware, software, or any combination thereof. The disclosed embodiments may be implemented as a computer process, a computing system, or as an article of manufacture such as a computer program product of computer readable media. The computer program product may include one or more transitory or non-transitory machine-readable (e.g., computer-readable) media comprising encoded computer program instructions for executing the computer process, which is readable and/or executable by one or more processors of a computer system. The machine-readable storage medium may be embodied as any storage device, mechanism, or other physical structure for storing or transmitting information in a form readable by a machine (e.g., a volatile or non-volatile memory, a media disc, or other media device). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" is one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code. As used herein, a "database object", "data object", or the like may refer to any representation of information in a database that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" may refer to a resource hosted by a remote entity (e.g., a cloud computing service) and accessible over a network. The term "on-device resource" may refer to a resource hosted inside a device and enabling access to the device, and thus, to the related physical entity.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices for the purpose of transmitting and receiving information.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. As used herein, the term "architecture" may refer to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiments were chosen and described in order to best explain the principles of the disclosure and the practical application, and to enable others of ordinary skill in the art to understand the disclosure for embodiments with various modifications as are suited to the particular use contemplated.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

What is claimed is:

1. An apparatus for providing infrastructure service, the apparatus comprising:
   map processing (MP) circuitry coupled with interface circuitry of an infrastructure equipment hosting the apparatus, wherein the interface circuitry is arranged to communicatively couple the infrastructure equipment with a fixed sensor array having individual sensors, the individual sensors covering respective sectors of a physical coverage area, and the interface circuitry obtaining first sensor data from the individual sensors, and the first sensor data being representative of the respective sectors covered by the individual sensors and objects within the respective sectors; and wherein:
   the MP circuitry is arranged to, based on the first sensor data, determine at least one occlusion in the coverage area, and identify at least one object located at or moving towards the at least one occlusion, wherein the MP circuitry is arranged to:
      fuse second sensor data collected by the at least one object with the first sensor data to obtain a combined sensor data set,
      generate an environmental map based on the combined sensor data set, and
      divide the environmental map into two or more map segments;
   encoding circuitry coupled with the MP circuitry, the encoding circuitry arranged to encode a first message to be broadcast or multicast to all objects in the physical coverage area, wherein the first message includes a request for second sensor data to be collected by the at least one object when the at least one object is located at or near the at least one occlusion;
   decoding circuitry coupled with the MP circuitry, the decoding circuitry arranged to decode a second message from the at least one object to obtain the second sensor data, wherein at least a portion of the second sensor data is representative of a physical area corresponding to the at least one occlusion; and
   wireless communication circuitry communicatively coupled with the MP circuitry via the interface circuitry, the wireless communication circuitry is arranged to:
      broadcast or multicast the first message,
      receive respective second messages from some or all of the objects in the physical coverage area including a second message from the at least one object, wherein the second message from the at least one object includes the second sensor data, and
      broadcast or multicast the two or more map segments to one or more detected objects in the coverage area.

2. The apparatus of claim 1, wherein the MP circuitry is arranged to detect objects in the physical coverage area based on the first sensor data, and assign a unique identifier to each detected object.

3. The apparatus of claim 2, wherein the wireless communication circuitry is arranged to:
   transmit a third message to the at least one object prior to broadcast or multicast of the first message, wherein the third message includes a request for capabilities of the at least one object;
   receive a fourth message from the at least one object, wherein the fourth message indicates the capabilities of the at least one object; and
   transmit a fifth message to the at least one object based on the fourth message, wherein the fifth message includes the unique identifier assigned to the at least one object.

4. The apparatus of claim 2, wherein, to encode the first message, the encoding circuitry is arranged to:
   generate the first message to include a plurality of records, wherein each record of the plurality of records corresponds to an individual object of each detected object, each record comprises a plurality of data elements (DEs), and the plurality of DEs includes a sensor request DE and a position request DE;
   insert a first value into the sensor request DE of a record for the at least one object, wherein the first value indicates that the at least one object is to report the second sensor data; and
   insert a second value into the sensor request DE of records for other detected objects, wherein the second value indicates that the other detected objects are not to report the second sensor data, insert a third value into the position request DE of records of one or more detected objects that are to report a current position; and insert a fourth value into the position request DE of records of one or more detected objects that are not to report the current position.

5. The apparatus of claim 1, wherein the apparatus is an integrated circuit and further comprises the interface circuitry.

6. The apparatus of claim 1, wherein the infrastructure equipment is a road side unit (RSU) and the objects are vehicles traveling within the physical coverage area, and wherein the first message is a Cooperative Awareness Message (CAM), and the second message is a CAM or a Decentralized Environmental Notification Message (DENM).

7. An apparatus for providing infrastructure service hosted by an infrastructure equipment, the apparatus comprising:

interface circuitry arranged to communicatively couple the infrastructure equipment with a fixed sensor array having individual sensors, the individual sensors covering respective sectors of a physical coverage area, and the interface circuitry obtaining first sensor data from the individual sensors, the first sensor data being representative of the respective sectors covered by the individual sensors and objects within the respective sectors;

map processing (MP) circuitry coupled with the interface circuitry, the MP circuitry is arranged to:
  determine at least one occlusion in the coverage area based on the first sensor data,
  detect objects in the physical coverage area based on the first sensor data,
  assign a unique identifier to each detected object, and
  identify at least one object located at or moving towards the at least one occlusion based on the first sensor data;

encoding circuitry coupled with the MP circuitry, the encoding circuitry arranged to encode a first message to include a request for second sensor data to be collected by the at least one object when the at least one object is located at or near the at least one occlusion, wherein, to encode the first message, the encoding circuitry is arranged to:
  generate the first message to include a plurality of records, wherein each record of the plurality of records corresponds to an individual object of each detected object, each record comprises a plurality of data elements (DEs), and the plurality of DEs includes a sensor request DE;
  insert a first value into the sensor request DE of a record for the at least one object, wherein the first value indicates that the at least one object is to report the second sensor data; and
  insert a second value into the sensor request DE of records for other detected objects, wherein the second value indicates that the other detected objects are not to report the second sensor data;

wireless communication circuitry communicatively coupled with the MP circuitry via the interface circuitry, the wireless communication circuitry is arranged to:
  broadcast or multicast the first message to all objects in the physical coverage area, and
  receive respective second messages from some or all of the objects in the physical coverage area including a second message from the at least one object, the second message from the at least one object includes the second sensor data; and decoding circuitry coupled with the MP circuitry, the decoding circuitry arranged to decode the respective second messages including a second message from the at least one object to obtain the second sensor data, wherein at least a portion of the second sensor data is representative of a physical area corresponding to the at least one occlusion.

8. The apparatus of claim 7, wherein the plurality of DEs includes a position request DE, and to encode the first message, the encoding circuitry is arranged to:

insert a third value into the position request DE of records of one or more detected objects that are to report a current position; and insert a fourth value into the position request DE of records of one or more detected object that are not to report the current position.

9. One or more non-transitory computer-readable media (NTCRM) comprising instructions, wherein execution of the instructions by one or more processors of an electronic system disposed in a vehicle is to cause the electronic system to:

obtain a first message from a remote infrastructure system, the first message including a plurality of sections, each section of the plurality of sections corresponds to an individual electronic system, each section including a plurality of data elements (DEs), and the plurality of DEs includes a sensor request DE;

identify a section of a plurality of sections within the first message designated for the electronic system, wherein other sections of the plurality of sections are designated for other electronic systems;

obtain sensor data from one or more sensors communicatively coupled to the electronic system when the sensor request DE within the section of the first message designated for the electronic system includes a first value, the first value indicating that the electronic system is to provide sensor data to the remote infrastructure system;

not obtain the sensor data when the sensor request DE within the section of the first message designated for the electronic system includes a second value, the second value indicating that the electronic system is to not report the sensor data;

encode a second message to include the obtained sensor data for transmission to the remote infrastructure system; and send the second message to the remote infrastructure system.

10. The one or more NTCRM of claim 9, wherein the plurality of DEs includes an acknowledgement (ACK) DE, and execution of the instructions is to cause the electronic system to:

encode an ACK message when the ACK DE within the section of the first message designated for the electronic system includes a third value, the third value indicating that the electronic system is to send an ACK message to the remote infrastructure system; and not encode the ACK message when the ACK DE within the section of the first message designated for the electronic system includes a fourth value, the fourth value indicating that the electronic system is to not send an ACK message to the remote infrastructure system.

11. The one or more NTCRM of claim 9, wherein the plurality of DEs includes a position request DE, and execution of the instructions is to cause the electronic system to:
encode the second message to include the sensor data and a current position of the electronic system when the position request DE within the section of the first message designated for the electronic system includes a fifth value, the fifth value indicating that the electronic system is to report the current position to the remote infrastructure system; and
encode the second message to include the sensor data and not include the current position when the position request DE within the section of the first message designated for the electronic system includes a sixth value, the sixth value indicating that the electronic system is to not report the current position to the remote infrastructure system.

12. The one or more NTCRM of claim 9, wherein, to identify the section within the first message designated for the electronic system, execution of the instructions is to cause the electronic system to:
search the first message for an object identifier (ID) assigned to the electronic system during a handshake procedure performed with the remote infrastructure system.

13. The one or more NTCRM of claim 12, wherein execution of the instructions is to cause the electronic system to:
obtain a third message from the remote infrastructure system via a wireless communication subsystem prior to receipt of the first message, wherein the third message includes a request for capabilities of the electronic system;
provide a fourth message to the communication subsystem for transmission to the remote infrastructure system, wherein the fourth message indicates the capabilities of the electronic system; and
obtain a fifth message from the remote infrastructure system via the wireless communication subsystem based on the fourth message, wherein the fifth message includes the object ID assigned to the electronic system.

14. The one or more NTCRM of claim 9, wherein execution of the instructions is to cause the electronic system to:
obtain another message from the remote infrastructure system via a wireless communication subsystem, the other message includes at least one segment of an environmental map generated based on the sensor data; and
combine the at least one segment with at least one other segment of the environmental map to obtain a complete environmental map.

15. The one or more NTCRM of claim 9, wherein the remote infrastructure system is a road side unit (RSU), the first message is a Cooperative Awareness Message (CAM), and the second message is a CAM or a Decentralized Environmental Notification Message (DENM).

16. Infrastructure equipment for providing infrastructure service, the infrastructure equipment comprising:
interface circuitry arranged to communicatively couple the infrastructure equipment with a fixed sensor array having individual sensors, the individual sensors covering respective sectors of a physical coverage area; and
processor circuitry coupled with the interface circuitry, the processor circuitry arranged to:
obtain first sensor data from the individual sensors, the first sensor data being representative of the respective sectors covered by the individual sensors and individual vehicles of a plurality of vehicles within or traveling through the respective sectors;
determine at least one gap in the coverage area based on the first sensor data;
identify individual vehicles located at or moving towards the at least one gap;
fuse second sensor data received from the identified vehicles with the first sensor data to produce a combined sensor data set, wherein at least a portion of the second sensor data is representative of a physical area corresponding to the at least one gap;
generate an environmental map based on the combined sensor data set; and
divide the environmental map into two or more map segments for broadcast or multicast of the two or more map segments to each vehicle detected of the plurality of vehicles in the coverage area.

17. The infrastructure equipment of claim 16, wherein the processor circuitry is arranged to:
encode a first message to be broadcast or multicast to the identified vehicles in the physical coverage area, wherein the first message includes a request for the second sensor data to be collected by the identified vehicles when the identified vehicles are located at or near the at least one gap;
decode respective second messages obtained from the identified vehicles to obtain the second sensor data collected by the identified vehicles.

18. The infrastructure equipment of claim 17, wherein the infrastructure equipment further comprises communication circuitry arranged to:
broadcast or multicast the first message; and
receive respective second messages from some or all of the vehicles in the physical coverage area including the second messages obtained from the identified vehicles, wherein the second messages from the identified objects include the second sensor data collected by the identified vehicles.

19. The infrastructure equipment of claim 18, wherein the processor circuitry is arranged to:
detect the plurality of vehicles in the physical coverage area based on the first sensor data; and
assign a unique identifier to each detected object, wherein the unique identifiers of the identified vehicles are to allocate the request for the second sensor data to the identified vehicles.

20. The infrastructure equipment of claim 19, wherein the processor circuitry is arranged to:
generate the first message to include a plurality of records, each record of the plurality of records corresponds to an individual object of each detected object, each record comprises a plurality of data elements (DEs) including a sensor request DE, and a position data DE;
insert a value of "TRUE" into the sensor request DE of records for the identified vehicles;
insert a value of "TRUE" into the position request DE of records for the identified vehicles;
insert a value of "FALSE" into the sensor request DE of records for other detected vehicles; and
insert a value of "FALSE" into the position request DE of records for the other detected vehicles.

21. The infrastructure equipment of claim 20, wherein the plurality of DEs includes an acknowledgement (ACK) DE, and the processor circuitry is arranged to:

insert a value of "TRUE" into the ACK DE for detected vehicles determined to enter or arrive at a randomly selected portion of the coverage area at a randomly selected time.

22. The infrastructure equipment of claim 20, wherein the communication circuitry is arranged to:
- transmit a third message to each detected object as each object enters the physical coverage area, wherein the third message includes a request for capabilities of each detected object;
- receive respective fourth messages from the each detected object, wherein the respective fourth messages indicate one or more of wireless communication capabilities of each detected object, positioning capabilities of each detected object, and sensing capabilities of each detected object; and
- transmit respective fifth messages to each detected object based on the respective fourth messages, wherein the respective fifth messages include a unique identifier assigned to each detected object.

23. One or more non-transitory computer-readable media (NTCRM) comprising instructions, wherein execution of the instructions is to cause an electronic system to:
- obtain a first message from a remote infrastructure system, the first message includes a plurality of sections, each section of the plurality of sections corresponds to an individual electronic system, each section comprises a plurality of data elements (DEs), and the plurality of DEs includes a sensor request DE;
- identify a section within the first message designated for the electronic system;
- obtain sensor data from one or more sensors communicatively coupled to the electronic system for when the sensor request DE within the section of the first message designated for the electronic system includes a first value, the first value indicating that the electronic system is to report sensor data to the remote infrastructure system;
- not obtain the sensor data when the sensor request DE within the section of the first message designated for the electronic system includes a second value, the second value indicating that the electronic system is to not report the sensor data;
- encode a second message including the sensor data for transmission to the remote infrastructure system when the sensor request DE within the section designated for the electronic system includes the first value; and
- send the second message to the remote infrastructure system.

24. The one or more NTCRM of claim 23, wherein the plurality of DEs includes an acknowledgement (ACK) DE, and execution of the instructions is to cause the electronic system to:
- encode an ACK message when the ACK DE within the section of the first message designated for the electronic system includes a third value, the third value indicating that the electronic system is to send an ACK message to the remote infrastructure system; and
- not encode the ACK message when the ACK DE within the section of the first message designated for the electronic system includes a fourth value, the fourth value indicating that the electronic system is to not send an ACK message to the remote infrastructure system.

25. The one or more NTCRM of claim 24, wherein the plurality of DEs includes a position request DE, and execution of the instructions is to cause the electronic system to:
- encode the second message to include the sensor data and a current position of the electronic system when the position request DE within the section of the first message designated for the electronic system includes a fifth value, the fifth value indicating that the electronic system is to report the current position to the remote infrastructure system; and
- encode the second message to include the sensor data and not include the current position when the position request DE within the section of the first message designated for the electronic system includes a sixth value, the sixth value indicating that the electronic system is to not report the current position to the remote infrastructure system.

26. The one or more NTCRM of claim 23, wherein, to identify the section within the first message designated for the electronic system, execution of the instructions is to cause the electronic system to:
- search the first message for an object identifier (ID) assigned to the electronic system during a handshake procedure performed with the remote infrastructure system.

27. The one or more NTCRM of claim 26, wherein execution of the instructions is to cause the electronic system to:
- obtain a third message from the remote infrastructure system via a wireless communication subsystem prior to receipt of the first message, wherein the third message includes a request for capabilities of the electronic system;
- provide a fourth message to the communication subsystem for transmission to the remote infrastructure system, wherein the fourth message indicates the capabilities of the electronic system; and
- obtain a fifth message from the remote infrastructure system via the wireless communication subsystem based on the fourth message, wherein the fifth message includes the object ID assigned to the electronic system.

28. The one or more NTCRM of claim 23, wherein execution of the instructions is to cause the electronic system to:
- obtain another message from the remote infrastructure system via a wireless communication subsystem, the other message includes at least one segment of an environmental map generated based on the sensor data; and
- combine the at least one segment with at least one other segment of the environmental map to obtain a complete environmental map.

29. The one or more NTCRM of claim 23, wherein the remote infrastructure system is a road side unit (RSU), the electronic system is implemented in a vehicle traveling within a physical coverage area of the RSU, and wherein the first message is a Cooperative Awareness Message (CAM), and the second message is a CAM or a Decentralized Environmental Notification Message (DENM).

* * * * *

UNITED STATES PATENT AND TRADEMARK OFFICE
CERTIFICATE OF CORRECTION

PATENT NO. : 11,153,721 B2
APPLICATION NO. : 16/234260
DATED : October 19, 2021
INVENTOR(S) : Ralf Graefe et al.

Page 1 of 1

It is certified that error appears in the above-identified patent and that said Letters Patent is hereby corrected as shown below:

In the Claims

Column 86
Lines 39-40, "...the identified objects..." should read – "...the identified vehicles..."

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*